US012801274B2

(12) United States Patent
Cranfill et al.

(10) Patent No.: US 12,801,274 B2
(45) Date of Patent: Nov. 17, 2026

(54) USER INTERFACES FOR DISPLAYING, TRANSMITTING, AND RECEIVING COMMUNICATIONS

(71) Applicant: Apple Inc., Cupertino, CA (US)

(72) Inventors: Elizabeth C. Cranfill, San Francisco, CA (US); Ryan D. Shelby, Mountain View, CA (US); Russell E. Snediker, Aptos, CA (US); Ronald K. Huang, San Jose, CA (US); Brent M. Ledvina, San Francisco, CA (US); Gillian T. Verga, Los Gatos, CA (US); Grant R. Paul, San Francisco, CA (US); Christopher D. Lauritzen, San Francisco, CA (US); Heather E. Daniel, San Jose, CA (US); Richard B. Warren, Redwood City, CA (US); Daniel P. Shepard, San Jose, CA (US); Ping-Ko Chiu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 18/659,717

(22) Filed: May 9, 2024

(65) Prior Publication Data

US 2024/0411441 A1 Dec. 12, 2024

Related U.S. Application Data

(60) Provisional application No. 63/505,785, filed on Jun. 2, 2023, provisional application No. 63/500,987, filed on May 9, 2023.

(51) Int. Cl.
*G06F 3/04847* (2022.01)
*G06F 3/04886* (2022.01)

(52) U.S. Cl.
CPC ...... *G06F 3/04847* (2013.01); *G06F 3/04886* (2013.01)

(58) Field of Classification Search
CPC ......................... G06F 3/04847; G06F 3/04886
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |

(Continued)

FOREIGN PATENT DOCUMENTS

| | | | |
|---|---|---|---|
| WO | 2013169849 | A2 | 11/2013 |
| WO | 2014105276 | A1 | 7/2014 |

OTHER PUBLICATIONS

International Search Report received for PCT Patent Application No. PCT/US2024/028648, mailed on Jul. 11, 2024, 6 pages.

(Continued)

*Primary Examiner* — Mahelet Shiberou
(74) *Attorney, Agent, or Firm* — Kubota & Basol LLP

(57) ABSTRACT

Some embodiments described in this disclosure are directed to one or more electronic devices that display a plurality of user interfaces corresponding to communication regarding a check in interaction. Some embodiments described in this disclosure are directed to initiating a communication. Some embodiments described in this disclosure are directed towards receiving a communication.

62 Claims, 41 Drawing Sheets

(56) References Cited

U.S. PATENT DOCUMENTS

| | | | |
|---|---|---|---|
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2015/0350130 | A1 | 12/2015 | Yang et al. |
| 2015/0350140 | A1* | 12/2015 | Garcia .................. H04L 51/222 715/753 |
| 2016/0073223 | A1 | 3/2016 | Woolsey et al. |
| 2016/0192315 | A1* | 6/2016 | Paek ..................... H04W 4/029 455/456.1 |
| 2017/0048686 | A1 | 2/2017 | Chang et al. |
| 2019/0207895 | A1 | 7/2019 | Trussel et al. |
| 2020/0409537 | A1* | 12/2020 | Story ...................... H04L 67/52 |

OTHER PUBLICATIONS

Noonlight, “Ushering in a New Era of Safety”, Noonlight: Leading Safety Products and Technologies, Available online at: https://www.noonlight.com, [retrieved on Jun. 3, 2023], 5 pages.

* cited by examiner

900

USER INTERFACES FOR DISPLAYING, TRANSMITTING, AND RECEIVING COMMUNICATIONS

CROSS-REFERENCE TO RELATED APPLICATIONS

This application claims the benefit of U.S. Provisional Application No. 63/500,987, filed May 9, 2023, and U.S. Provisional Application No. 63/505,785, filed Jun. 2, 2023, the contents of which are herein incorporated by reference in their entireties for all purposes.

FIELD OF THE DISCLOSURE

This disclosure relates generally to user interfaces associated with displaying, transmitting, and receiving communications with an electronic device.

BACKGROUND OF THE DISCLOSURE

User interaction with electronic devices has increased significantly in recent years. These devices can be devices such as computers, tablet computers, televisions, multimedia devices, or mobile devices. In some circumstances, users may wish to use such devices to send and/or receive communications. Enhancing the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that display a plurality of user interfaces corresponding to communication regarding a check in interaction. Some embodiments described in this disclosure are directed to initiating a check in interaction. Some embodiments described in this disclosure are directed towards receiving a check in interaction. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
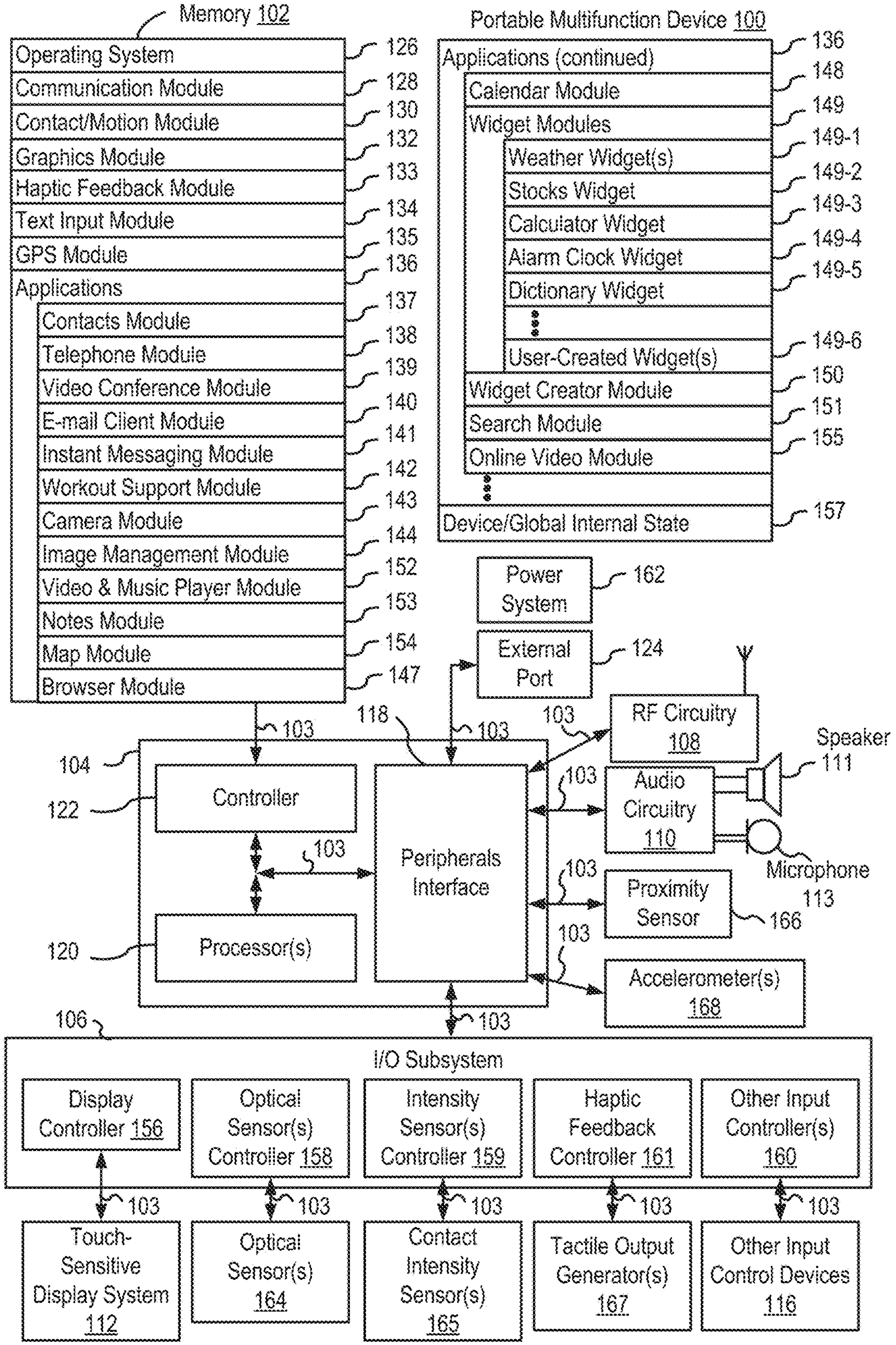
FIG. 1A is a block diagram illustrating a portable multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices to receive communications in various user interfaces of applications. There is also a need for electronic devices to transmit communications in various user interfaces of applications. In some embodiments, an electronic device initiates a check in interaction with a second user account in a first user interface. In some embodiments, the electronic device receives a first termination condition of the check in interaction. In some embodiments, the electronic device transmits the check in interaction to the second user account. Such techniques allow important information to be bundled and transmitted quickly and efficiently without the need for additional inputs, and also provide feedback to the second user account that further communication from the first user account may be initiated in the future, thereby reducing erroneous interactions with the devices.

In some embodiments, an electronic device receives an indication of a check in interaction from a second user account. In some embodiments, in response to receiving the indication of the check in interaction, the electronic device displays a visual indication of the check in interaction including a visual indication of the first termination condition. Displaying an indication for a check in interaction from a second user account provides quick and efficient access to relevant content regarding the second user account and/or the check in interaction without the need for additional inputs and thereby reduces erroneous inputs to the electronic device.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
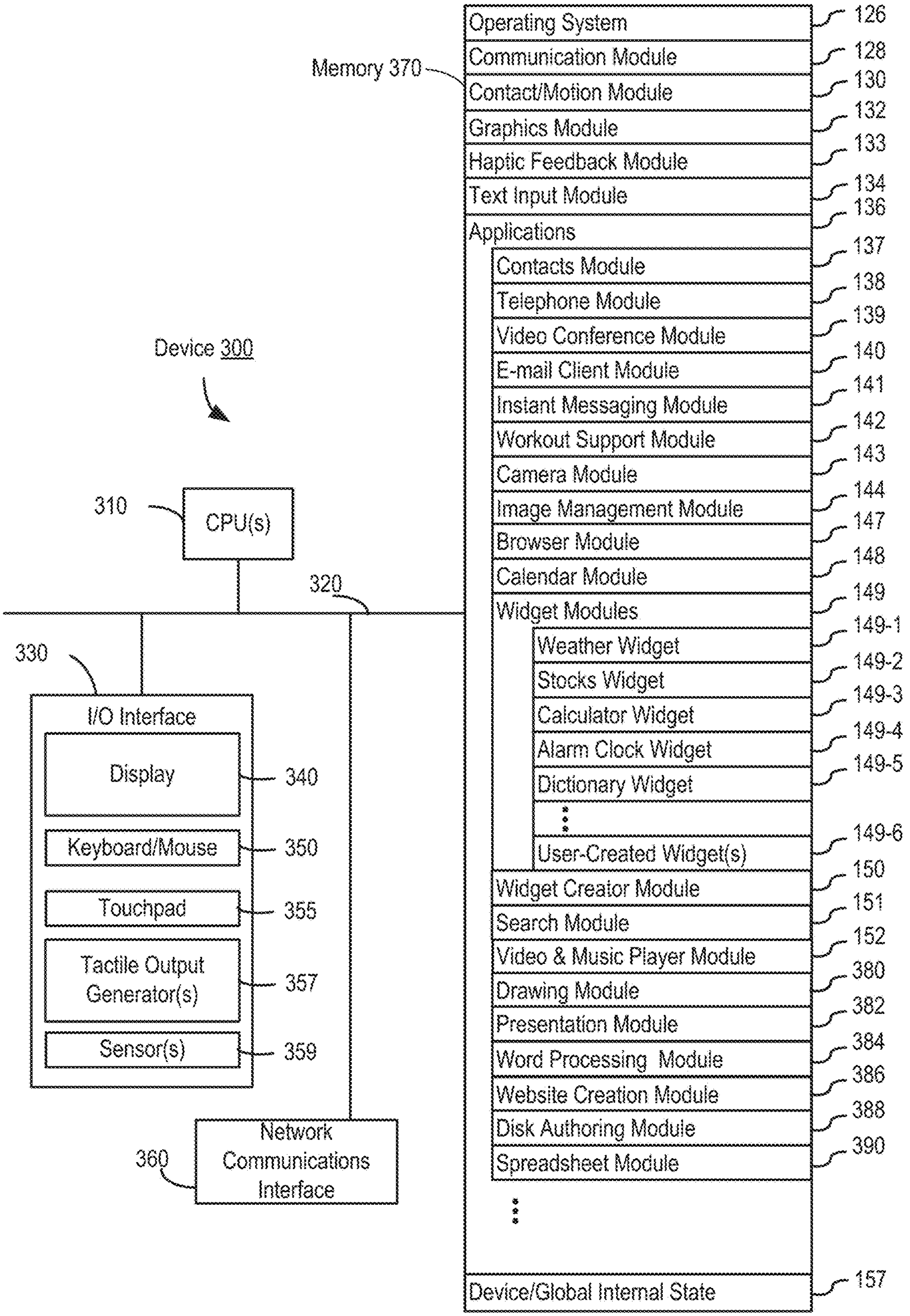
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
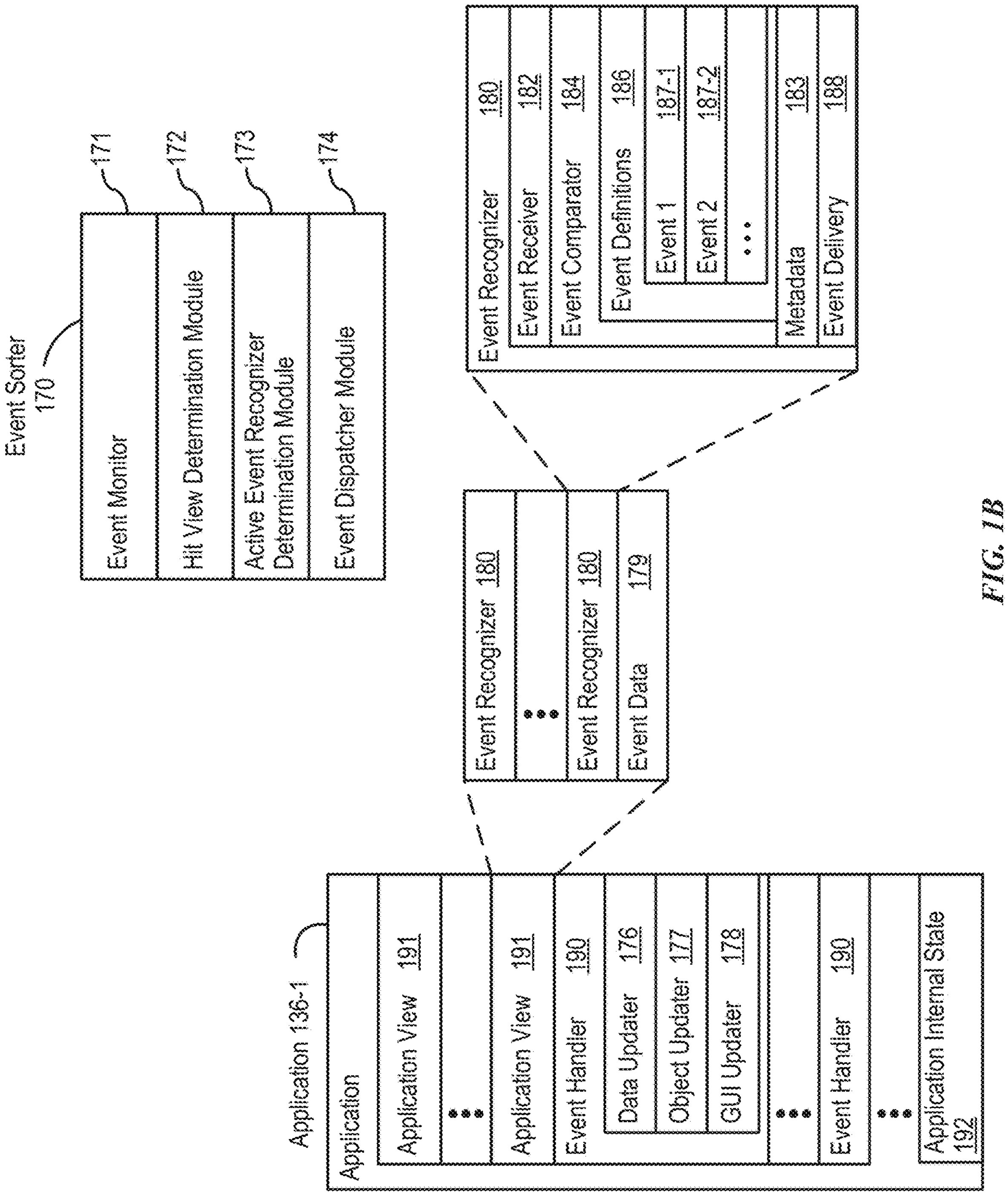
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
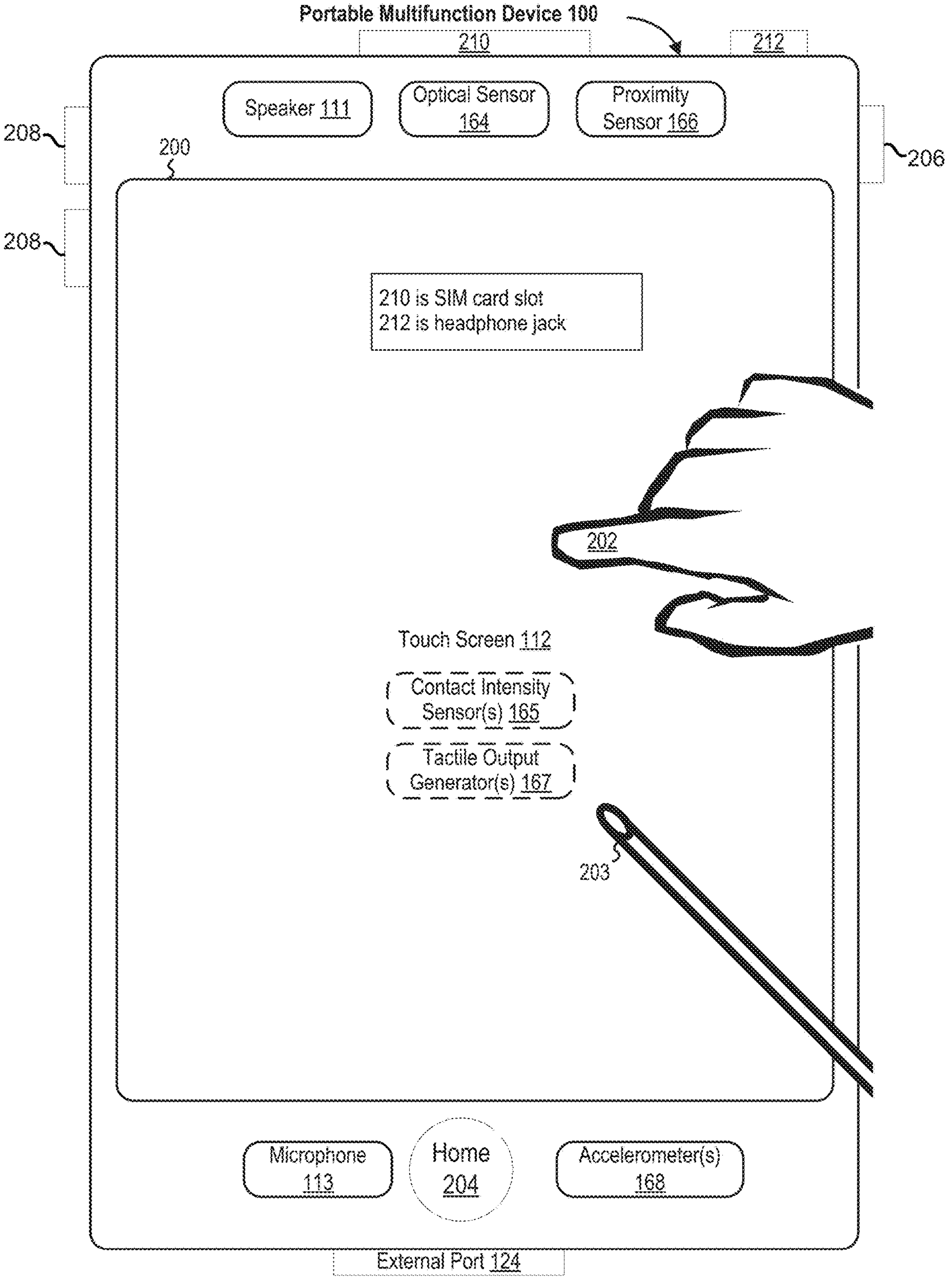
FIG. 2 illustrates a portable multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
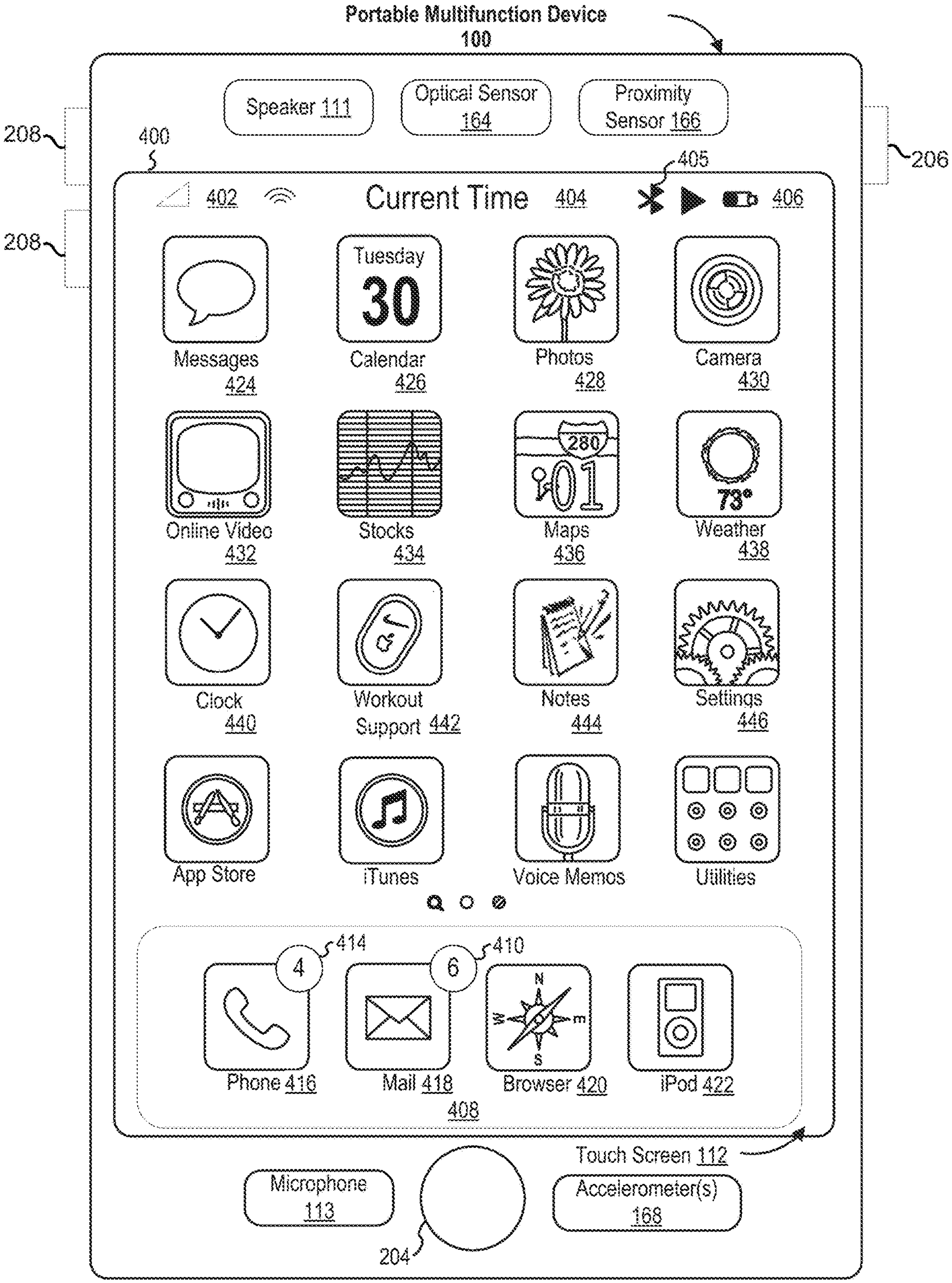
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
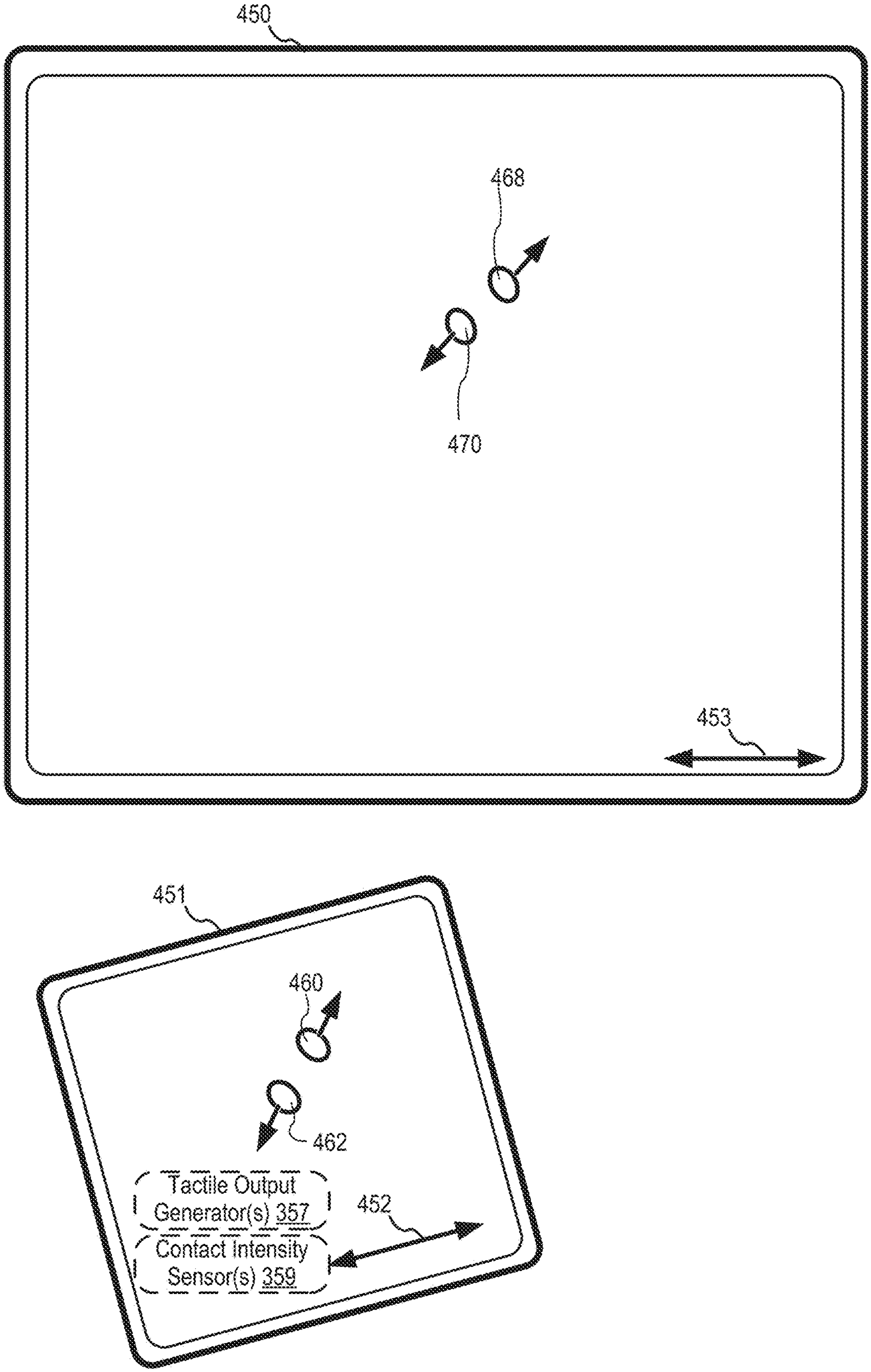
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
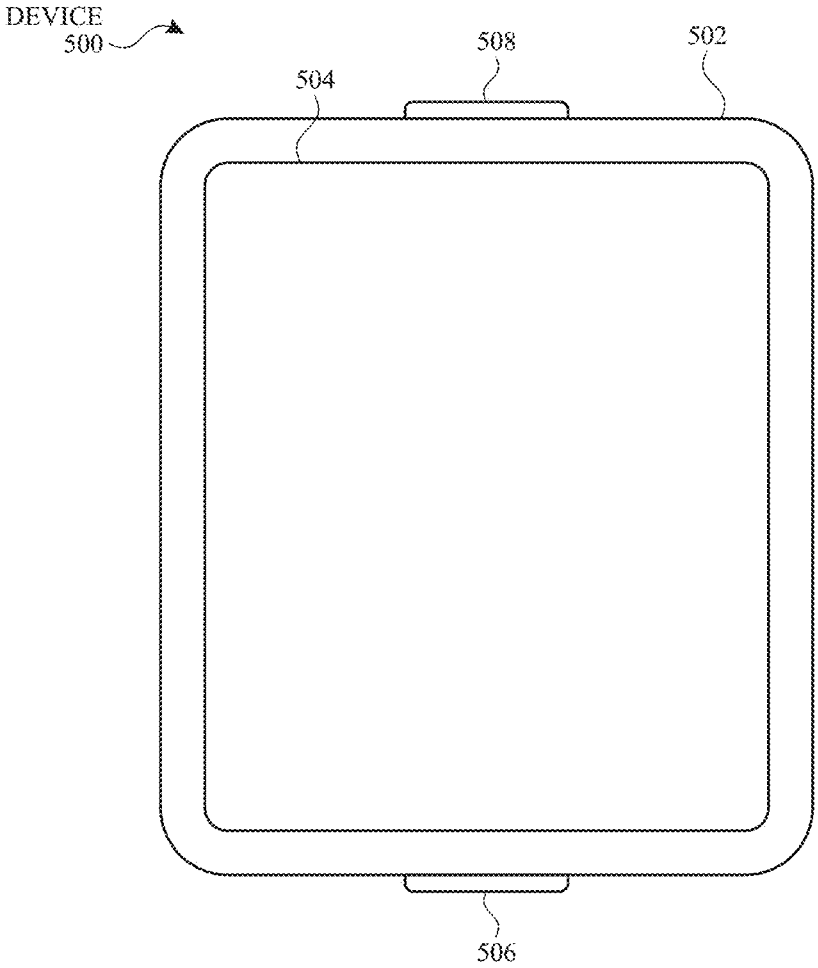
FIG. 5A illustrates a personal electronic device in accordance with some embodiments.
Figure 5B:
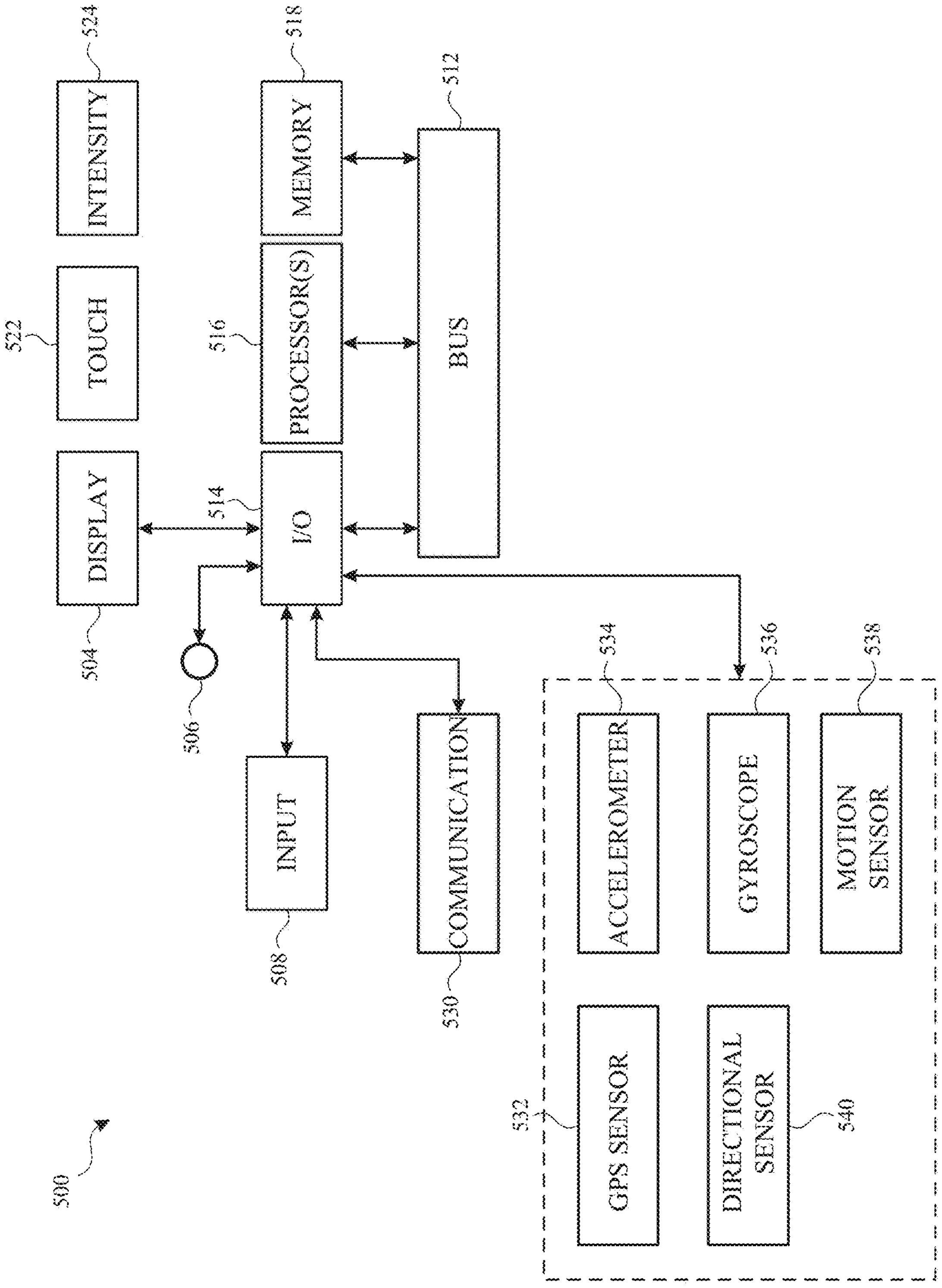
FIG. 5B is a block diagram illustrating a personal electronic device in accordance with some embodiments.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700 and/or 900). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
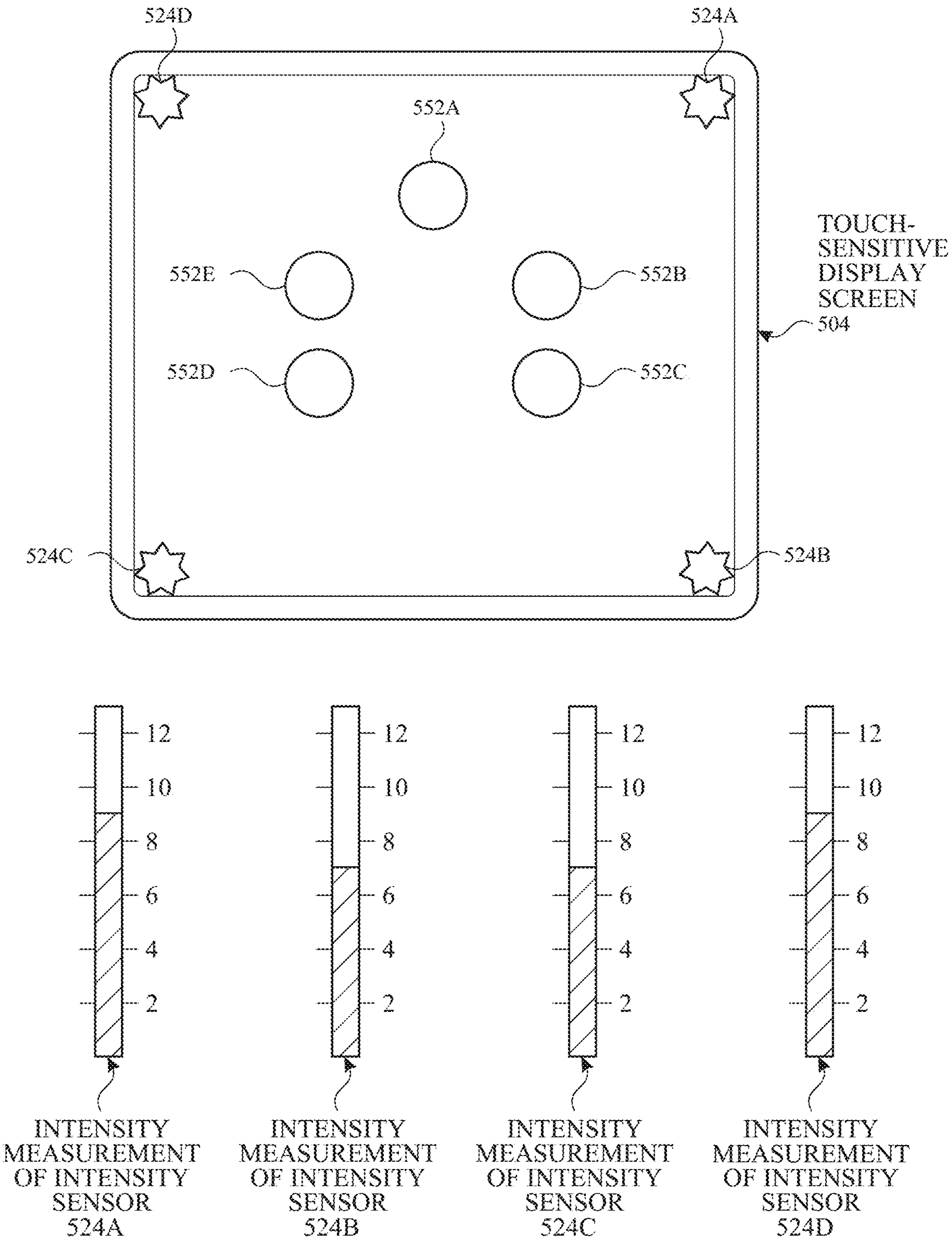
FIGS. 5C-5D illustrate exemplary components of a personal electronic device having a touch-sensitive display and intensity sensors in accordance with some embodiments.
Figure 5D:
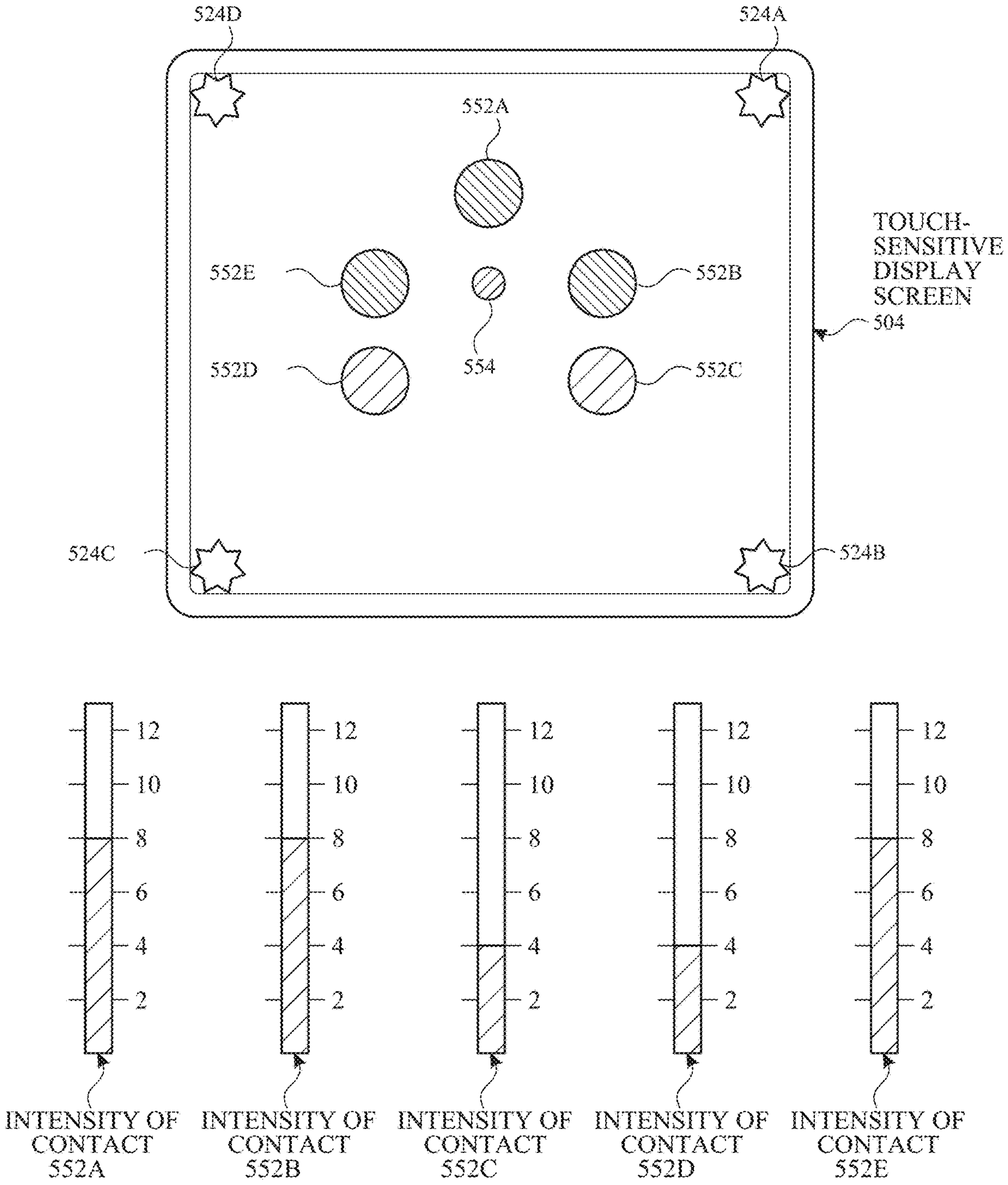

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
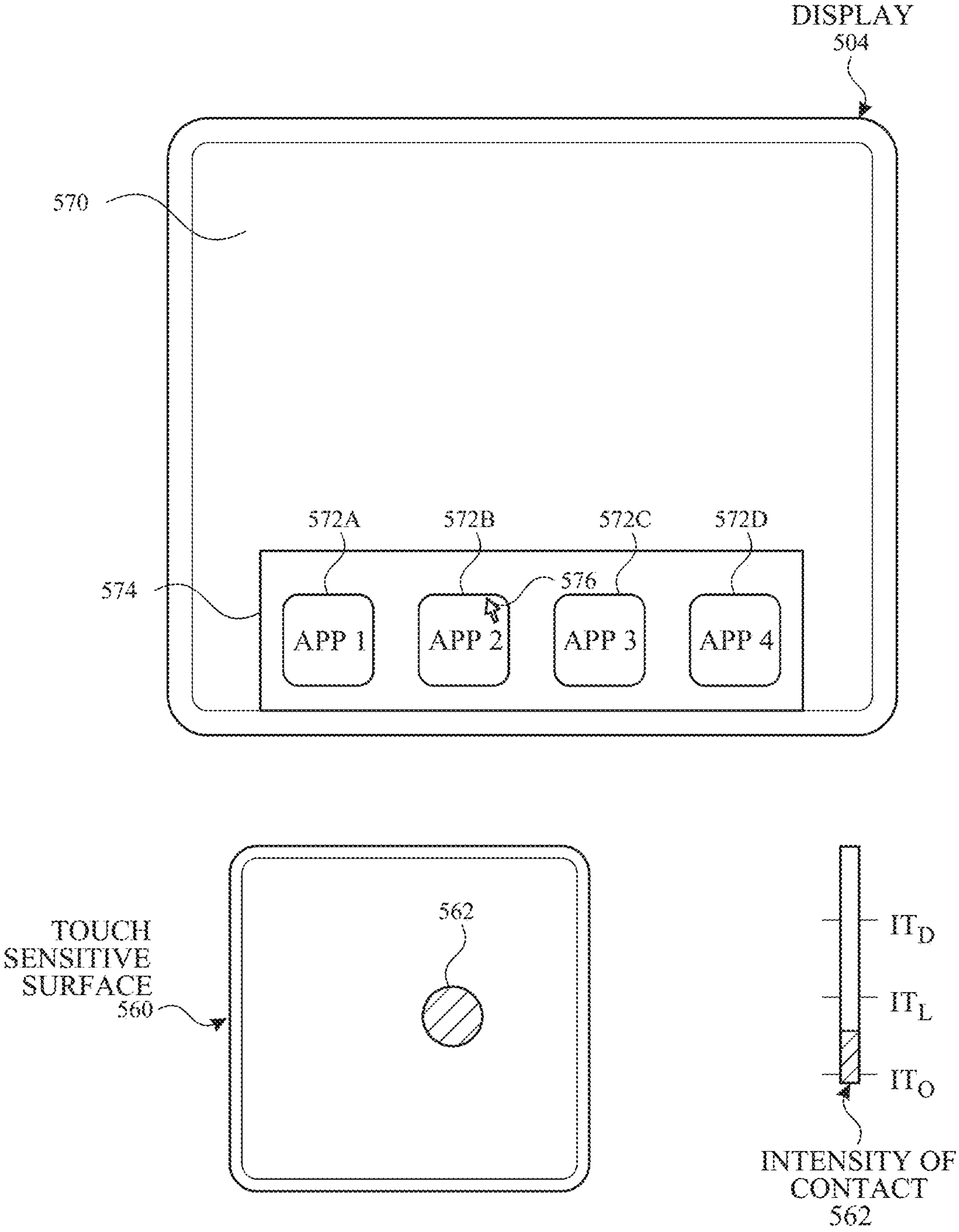
FIGS. 5E-5H illustrate exemplary components and user interfaces of a personal electronic device in accordance with some embodiments.
Figure 5F:
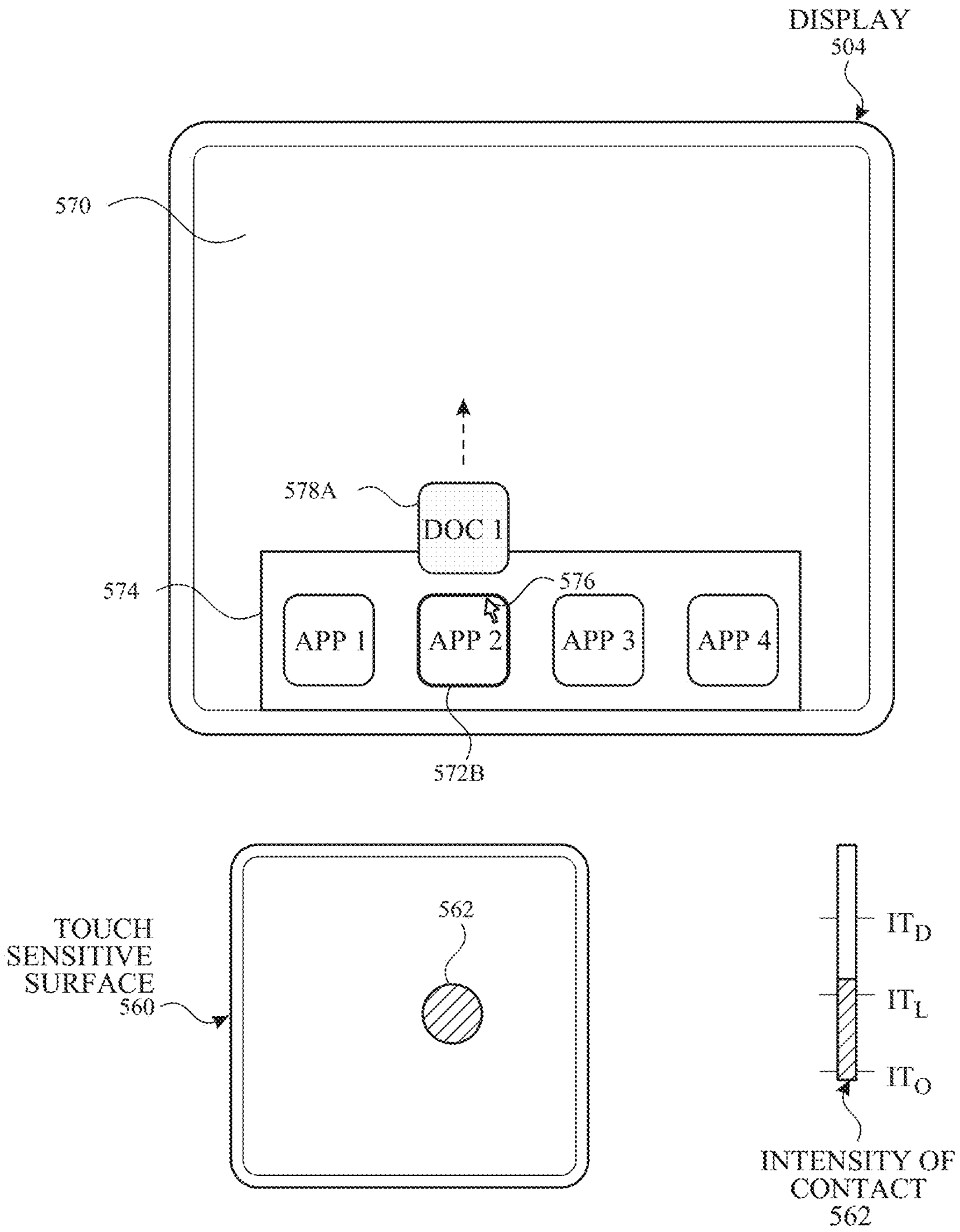
Figure 5G:
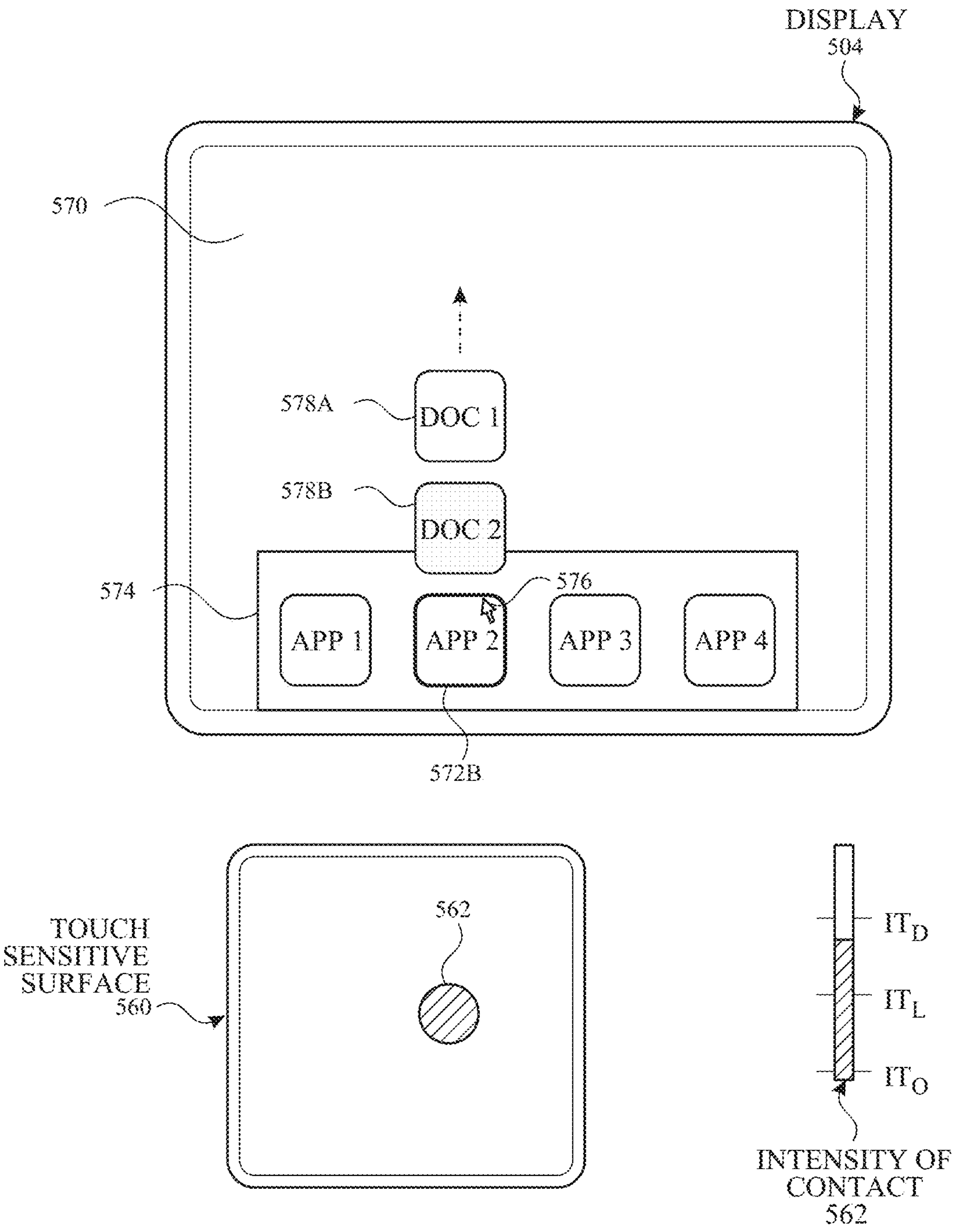
Figure 5H:
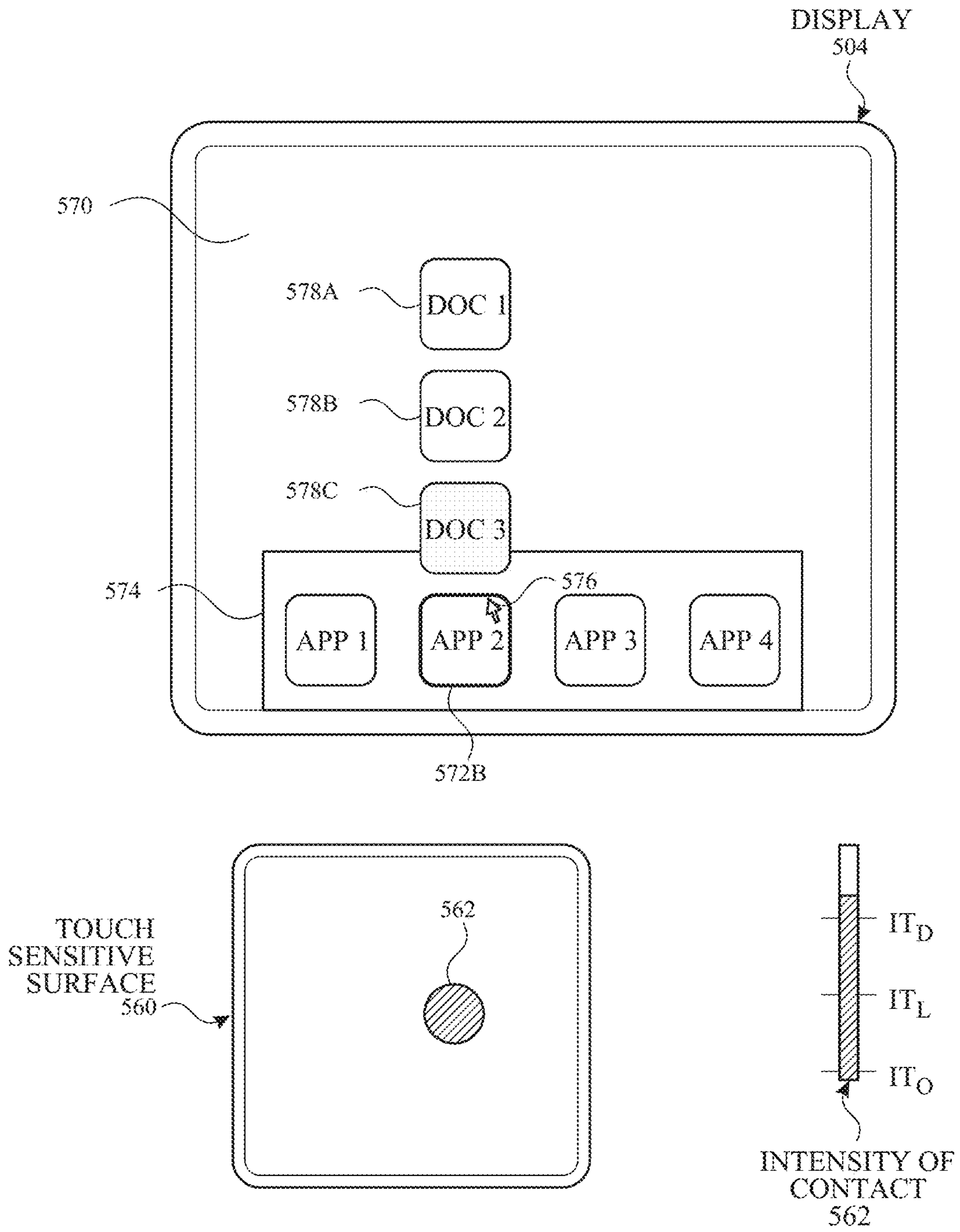

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

Displaying and Transmitting a Communication

Users interact with electronic devices in many different manners. In some embodiments, an electronic device initiates a communication, such as a check in interaction, with a second electronic device. The embodiments described below provide ways in which an electronic device displays and transmits a communication to a second electronic device. Transmitting important information in a quick and efficient manner reduces the amount of erroneous inputs to the electronic device, and thus reduces the power usage of the device and increases battery life for battery-powered devices. It is understood that people use devices. When a person uses a device, that person is optionally referred to as a user of the device.

Figure 6C:
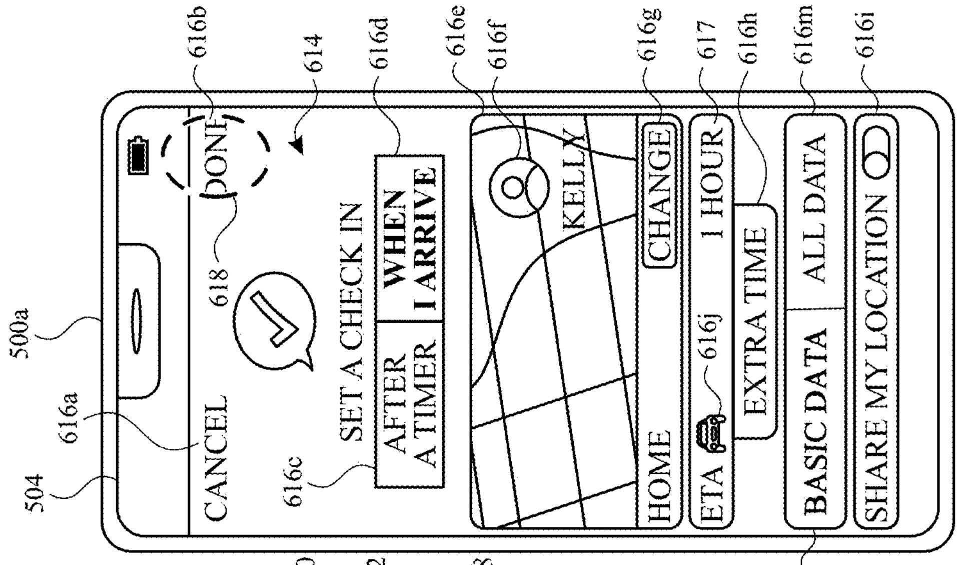
FIGS. 6A-6P illustrate examples of an electronic device displaying and transmitting a check in interaction communication in accordance with some embodiments of the disclosure.
Figure 6B:
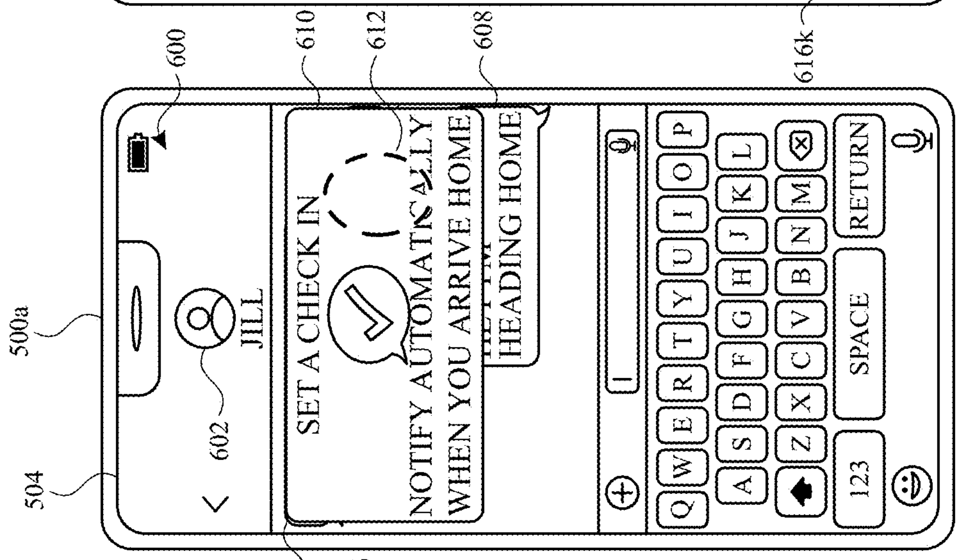
Figure 6A:
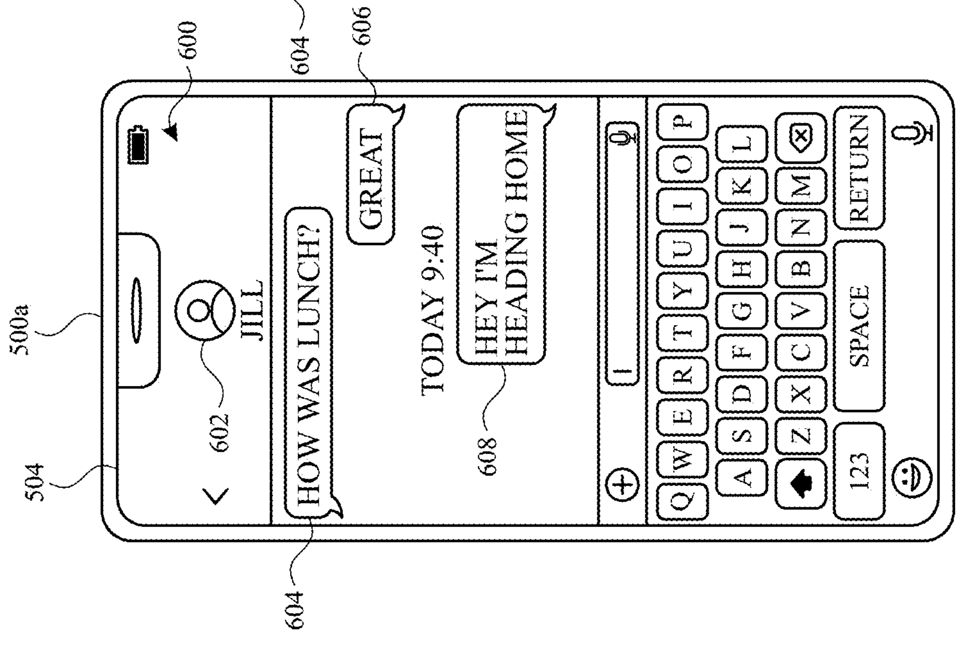
Figures 6D, 6E, 6F:
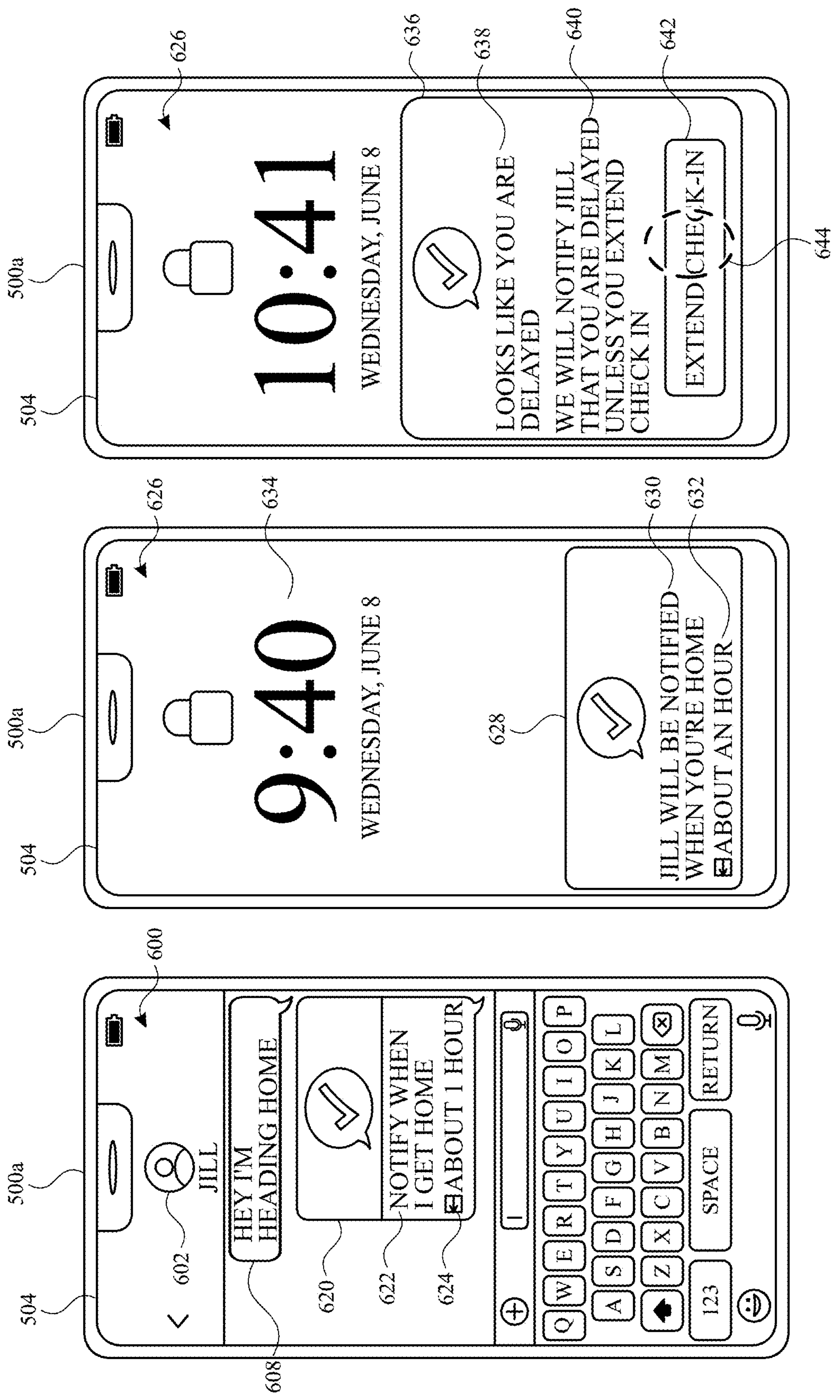
Figure 6I:
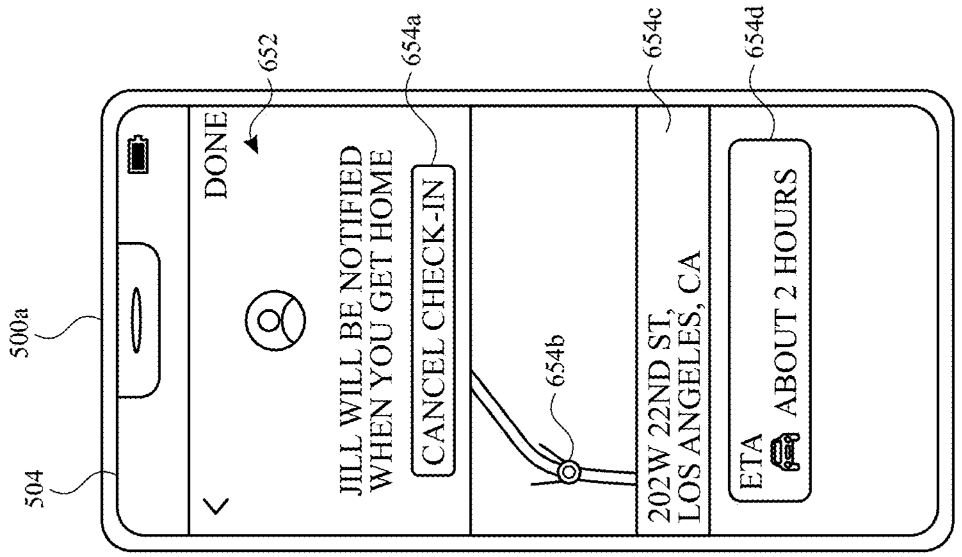
Figure 6H:
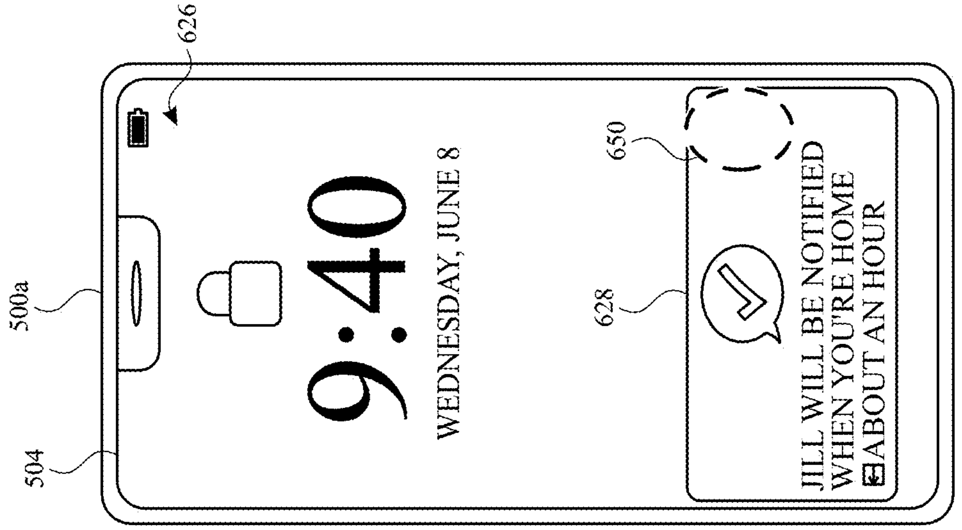
Figure 6G:
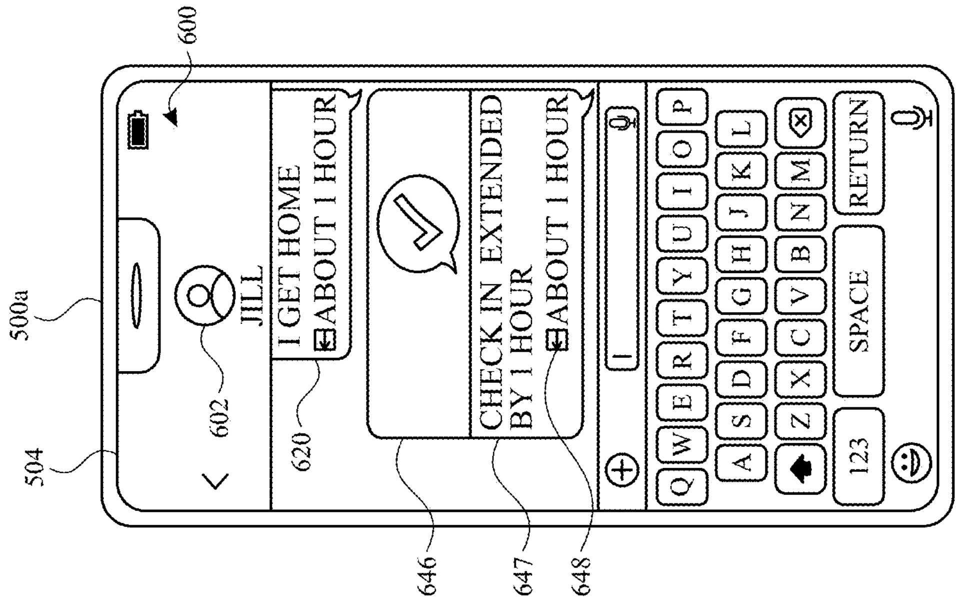
Figure 6J:
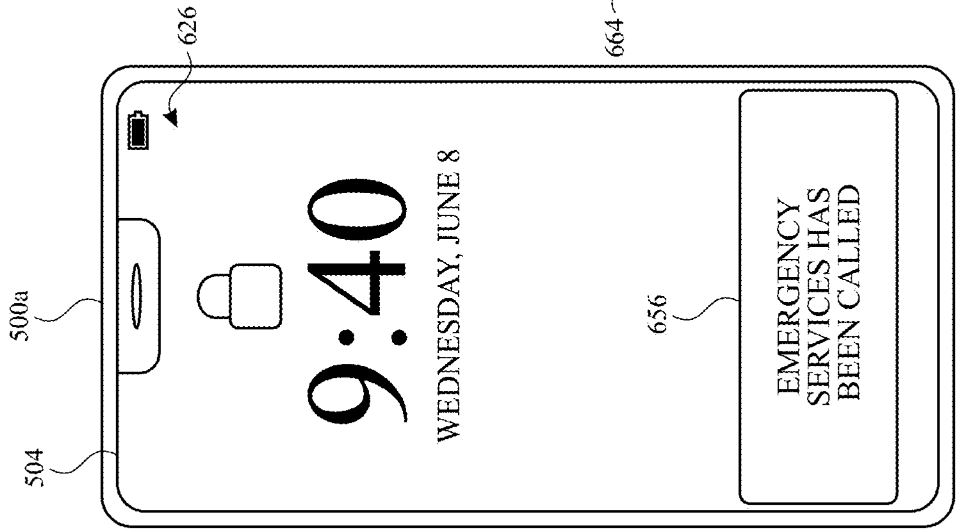
Figure 6K:
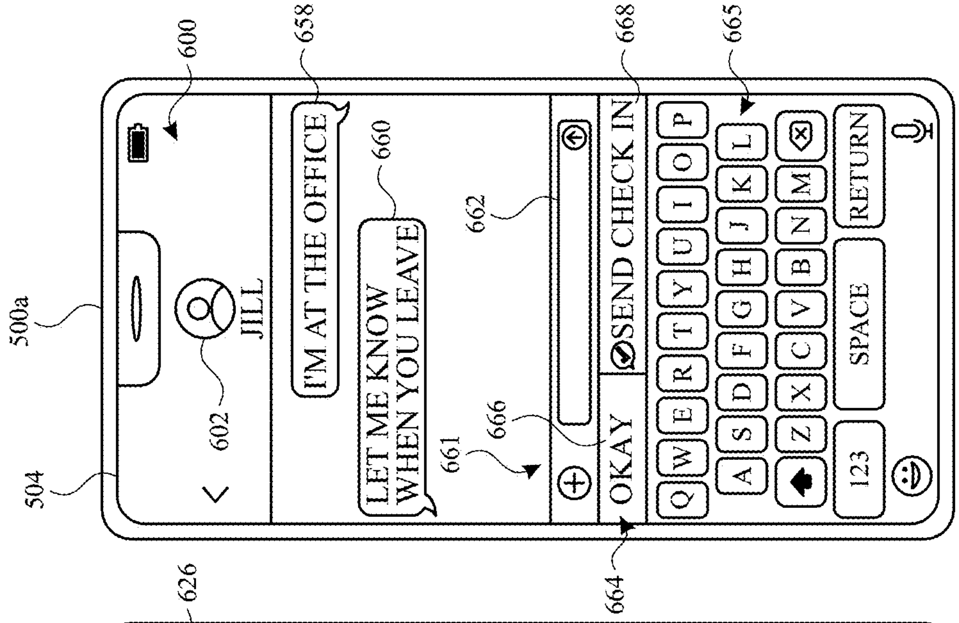
Figure 6L:
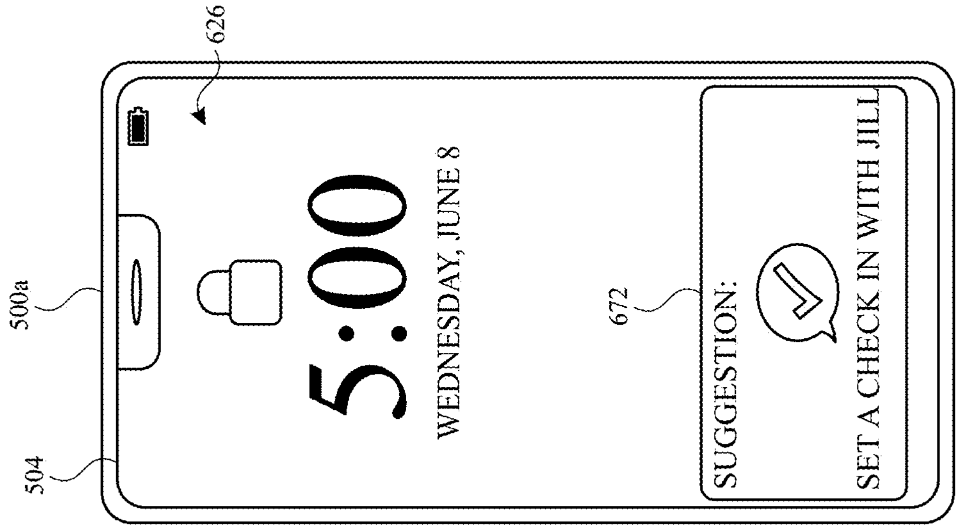
Figure 6M:
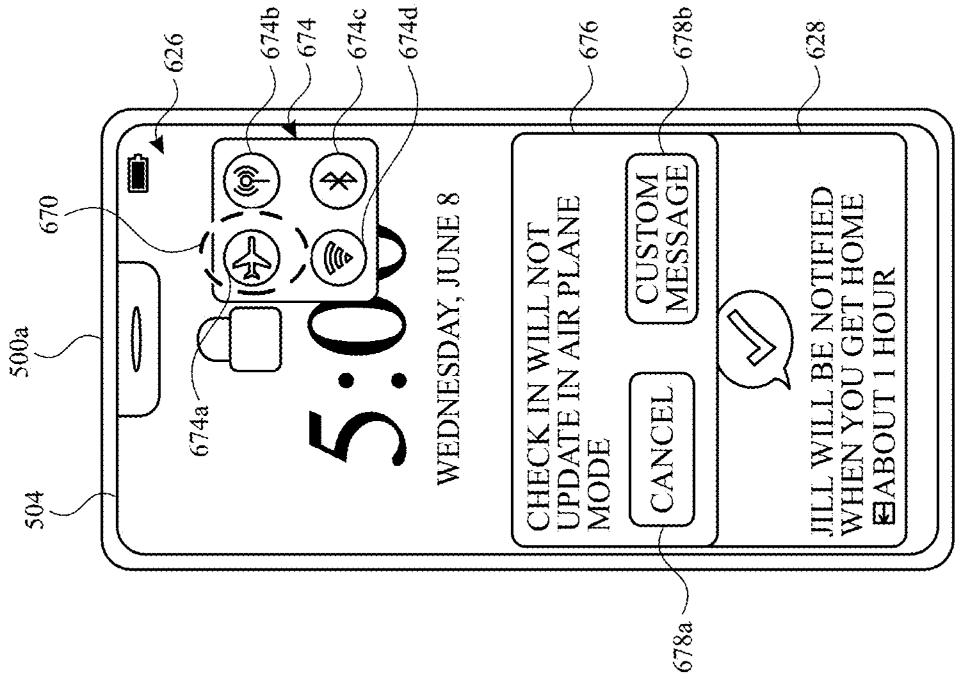
Figure 6N:
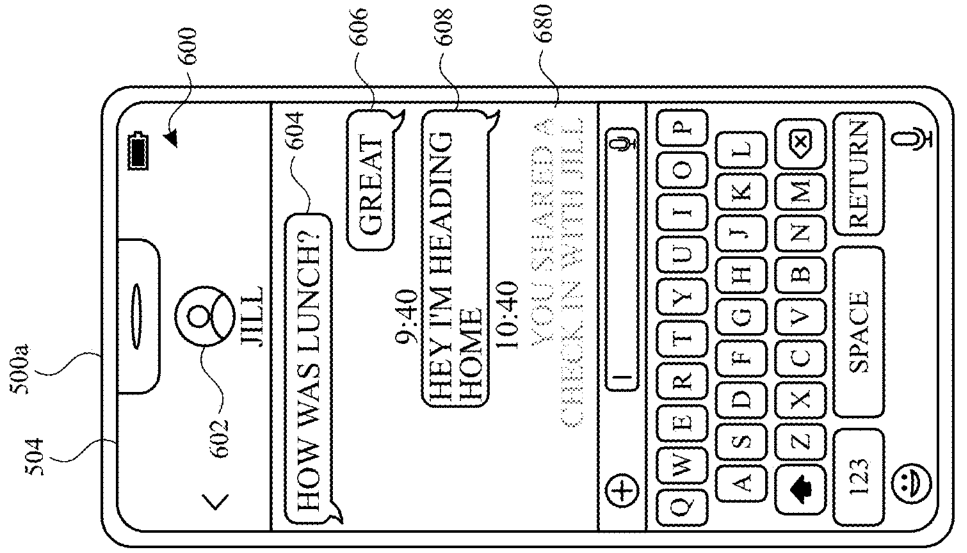
Figure 6O:
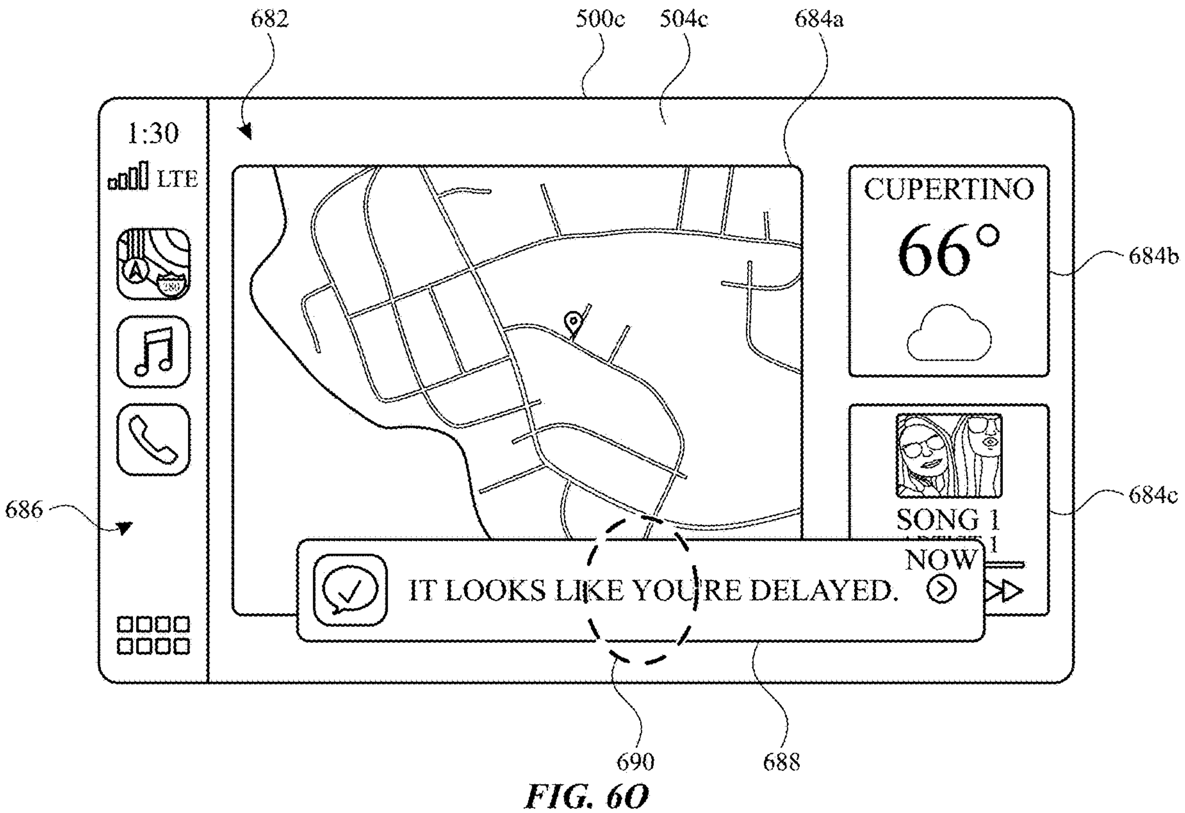
Figure 6P:
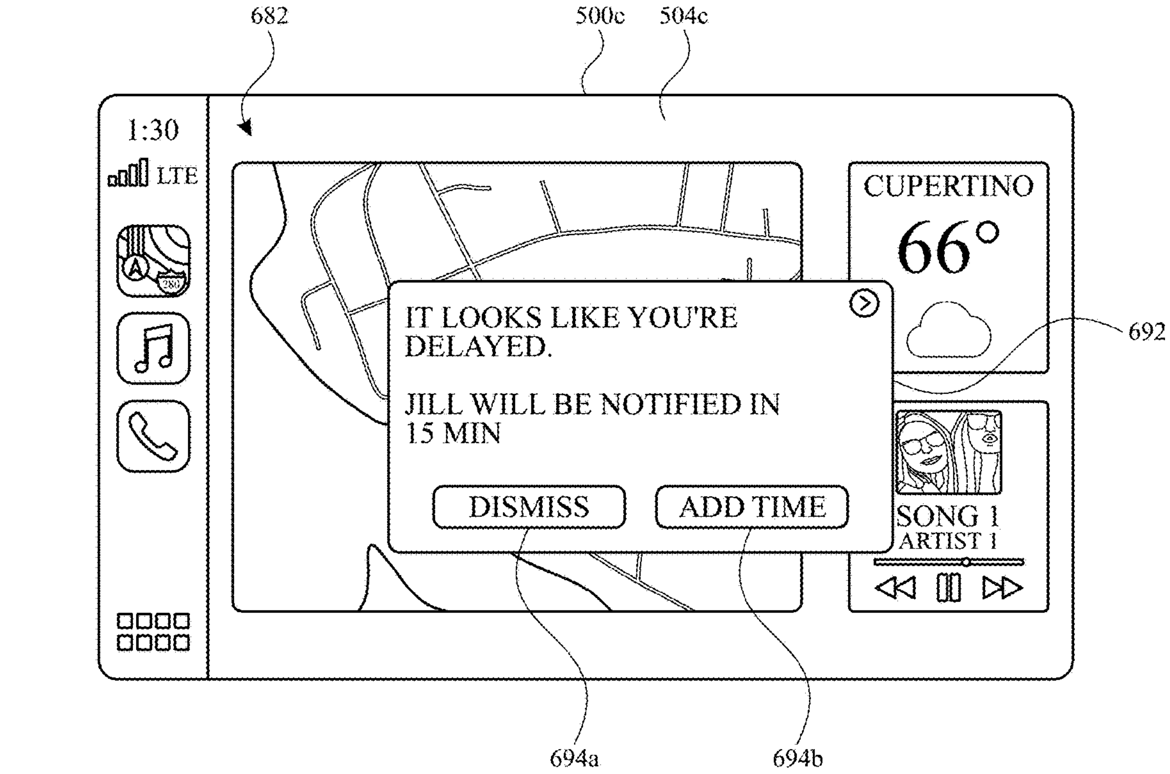

FIGS. 6A-6P illustrate various ways an electronic device displays and transmits a communication in accordance with some embodiments of the disclosure. The embodiments in these figures are used to illustrate the processes described below, including the processes described with reference to FIGS. 7A-7J.

FIG. 6A illustrates an exemplary device 500*a* that includes a touchscreen 504. In FIG. 6A, the electronic device 500*a* is presenting a messaging user interface 600 that includes a messaging conversation between a user Kelly (the user associated with device 500*a*) and a contact named Jill (indicated by the representation 602 of Jill). The messaging user interface 600 includes a first user interface object 604 (or representation) of a first message that was added to the messaging conversation from a device associated with Jill (e.g., device 500*b*), a second user interface object 606 (or representation) of a second message that was added to the messaging conversation from a device associated with Kelly, and a third user interface object 608 (or representation) of a third message that was also added to the messaging conversation from the device associated with Kelly. In some embodiments, the device 500*a* displays the first user interface object 604, in messaging user interface 600, in response to device 500*a* receiving an indication that the device associated with Jill has added the first message to the messaging conversation, which included the text "How was lunch?". In some embodiments, the device 500*a* displays the second user interface object 606, in messaging user interface 600, in response to device 500*a* receiving an indication that the device associated with Kelly has added the second message, which included the text "Great", to the messaging conversation. In some embodiments, the device 500*a* displays the third user interface object 608, in messaging user interface 600, in response to device 500*a* receiving an indication that the device associated with Kelly has added the third message to the messaging conversation, which included the text "Hey, I'm heading home".

In some embodiments, device 500*a* suggests and transmits a check in interaction to a receiving device 500*b*, which is discussed in further detail below and in method 700. In some embodiments, the check in interaction appears in various user interfaces of device 500*a* such as the lock screen user interface or the messaging user interface 600 to inform the user(s) of device 500*a* and/or device 500*b* of a status of device 500*a*. In some embodiments, the status of device 500*a* includes whether a termination condition of the check in interaction, as described in method 700 and below, is satisfied.

In some embodiments, the device 500*a* displays a second user interface, such as a check in user interface 610, as shown in FIG. 6B, in response to receiving the third message which included the text "Hey, I'm heading home". In some embodiments, and with reference to method 700, the check in user interface 610 appears while in a messaging conversation with certain contacts, as described in further detail in method 700, and/or while device 500*a* is displaying a user interface of the messaging conversation. Alternatively, and in some embodiments, the check in user interface 610 is displayed when the device 500*a* detects a keyword in a messaging conversation indicating that the user is leaving a current location or about to travel. For example, "going home", "going to work", or "leaving" are example keywords that cause device 500 to display a check in user interface 610. In some embodiments, the keywords indicate that the user of device 500*a* and/or the device 500*a* is going to a different location. For example, the keywords indicate actions words that indicate that device 500*a* is moving locations, as described in method 700.

In some embodiments, and referencing FIG. 6B, the check in user interface 610 suggests a check in location (e.g., home) as the termination condition for the completion of the check in, as described in method 700. In some embodiments, the termination condition indicates the condition(s) to satisfy the check in interaction. In some embodiments, when the termination condition is satisfied, device 500*a* concludes the check in interaction, such as described with reference to method 700. In some embodiments, and as described with reference to method 700, the check in user interface 610 is set up with pre-defined criteria that can be changed in a check in user interface 614. In some embodiments, in response to an input from touch contact 612 selecting user interface 610 in FIG. 6B, a check in setting user interface 614 is displayed by device 500*a*, such as shown in FIG. 6C. In some embodiments, the check in settings user interface 614 includes a plurality of user interface objects 616*a-m* for customizing the check in interaction corresponding to user interface 610. In some embodiments, user interface object 616*a* corresponds to an option that when selected cancels the check in request and/or closes the check in settings user interface 614 without saving any changed settings. In some embodiments, user interface object 616*b* corresponds to an option that when selected transmits and/or initiates the check in request with updated settings, as will be described below. In some embodiments, user interface object 616*c* and user interface object 616*d* correspond to options, that when selected change the termination condition of the check in request. User interface object 616*c* corresponds to a timer-based termination condition, as discussed in method 700. In some embodiments, the timer-based termination condition is a condition that is satisfied when a count-down is complete. User interface object 616*d* corresponds to a location-based termination condition, as discussed in method 700. In some embodiments, the location-based termination condition is satisfied when device 500*a* arrives at a destination location. In some embodiments, the selected termination condition is highlighted and/or bolded to indicate selection. In some embodiments, user interface object 616*e* is a visual representation of a map, wherein the current location of the initiator of the check in interaction (e.g., device 500*a*) is shown (indicated by the object 616*f* on map 616*e*, and includes a visual representation of Kelly). In some embodiments, selectable object 616*g* is selectable to change a destination location for the check in interaction (e.g., to change the location-based termination condition for the check in interaction). In some embodiments, a user inputs an address and/or a label (e.g., "home", "work", or "Mom's house") for an address to change the destination location. In some embodiments, object 616*g* is selectable to adjust a geofence around the destination location, discussed in further detail in method 700. For example, after selecting object 616*g*, an adjustable circle optionally appears around a destination location, which is adjustable by an input from a touch contact (e.g., select and drag) to expand or condense the geofence area in which successful satisfaction of the location-based termination condition will be triggered. In some embodiments, a user inputs the desired radius of the geofence in response to selecting object 616*g*. In some embodiments, object 616*j* is selectable to change the mode of transportation of the check in interaction. For example, the mode of transportation includes walking, biking, public transit, or driving. In some embodiments, an estimated time of arrival at the destination location is determined based on the mode of transportation and the destination location. The estimated time of arrival is shown as text 617 in FIG. 6C. In some embodiments, object 616*h* is selectable to add extra time to the estimated time of arrival. For example, in response to selecting object 616*h*, additional selectable options are shown to extend the estimated time of arrival by a given time (e.g., 15 min, 30 min, 45 min, or 1 hour). In some embodiments, the estimated time of arrival includes additional time to account for a delayed start (e.g., the device 500*a* leaves for the destination location in 1 hour). In some embodiments, extending the estimated time of arrival extends the time at which a delayed check in response, as discussed below, is initiated. In some embodiments, object 616*i* is toggleable to always share the current location of device 500*a* with second device 500*b*, as described in FIGS. 8A-8J. In FIG. 6C, the object 616*i* is not active. In some embodiments, while the object 616*i* is not active, the device 500*a* only shares its current location with second device 500*b* in accordance with a determination that the satisfaction of one or more criteria (e.g., termination condition) will be delayed, as described in method 700. In some embodiments, when object 616*i* is not present (e.g., is not an option), objects 616*k*-616*m* control the sharing of information (e.g., location information). In some embodiments, object 616*k* is selectable to share basic information, as described with reference to method 700 with the second device 500*b*. In some embodiments, basic information is shared for the duration of the check in interaction and ends when the check in interaction is terminated. In some embodiments, object 616*m* is selectable to share all information with the second device 500*b*, as described with reference to method 700. In some embodiments, all information is shared for the duration of the check in interaction and ends when the check in interaction is terminated.

In some embodiments, basic information sharing includes sharing with device 500*b* a current location, battery level, network connectivity, and/or recent usage of device 500*a*, but not additional information that is only shared with device 500*b* in the all information sharing mode. In some embodiments, basic information sharing also includes sharing with device 500*b* battery level, network connectivity, and/or recent usage of other devices associated with the user of the device 500*a* (e.g., a first user account as described in method 700). In some embodiments, all information sharing includes sharing the basic information and further includes sharing with device 500*b* a visual indication of a full route traveled by the device 500*a*, a location of the last place device 500*a* was used, and/or a location of the last activity of other devices associated with the user of device 500*a* (e.g., the removal of a watch), shown in FIG. 8F.

In some embodiments, in response to a touch input at an option to send the check in interaction, the device 500*a* transmits the check in interaction and/or initiates the check in interaction with the receiving device 500*b*, as shown in FIG. 6D. In some embodiments, with reference to FIG. 6C, an input from touch contact 618 on selectable object 616*b* transmits the check in interaction to and/or initiates the check in interaction with a receiving device 500*b* (e.g., Jill's device), as discussed in FIGS. 8A-8J and method 900. FIG. 6D shows the messaging user interface 600 with a fourth user interface object 620 (or representation) of a fourth message added to the messaging conversation from device 500*a*, associated with Kelly. In some embodiments, the device 500*a* displays the fourth user interface object 620, in the messaging user interface 600 as part of the messaging conversation, in response to device 500*a* receiving an input to initiate and/or transmit the check in interaction corresponding to the fourth user interface object 620. In some embodiments, the fourth user interface object 620 is visible to both devices (e.g., device 500*a* and device 500*b*) that are part of the messaging conversation. In some embodiments, the fourth user interface object 620 includes text 622 ("Notify when I get home") indicating the termination condition of the check in interaction. In some embodiments, the fourth user interface object also includes text 624 ("about an hour") indicating an estimated time of arrival to the destination location. In some embodiments, for a timer-based termination condition, the fourth user interface object 620 includes text indicating the time duration (e.g., "Notify in 2 hours") of the check in interaction. In some embodiments, the time duration in the fourth user interface object 620 updates dynamically as time passes to indicate an updated estimated time of arrival and/or time of termination of the check in interaction.

FIG. 6E shows a lock screen user interface 626 of device 500*a* with a user interface object 628 representing the check in interaction. In some embodiments, in response to initiating the check in interaction, user interface object 628 is displayed by device 500*a* on the lock screen user interface 626. In some embodiments, user interface object 628 remains on the lock screen user interface 626 for the duration of the check in interaction. In some embodiments, user interface object 628 has one or more characteristics of fourth user interface object 620. For example, user interface object 628 in FIG. 6E includes text 630 that indicates the termination condition of the check in interaction, and text 632 that indicates the estimated time of arrival at the destination location. In some embodiments, user interface object 628 indicates the recipient of the check in interaction (e.g., Jill). In some embodiments, user interface object 628 displays text similar to or the same as fourth user interface object 620 for a timer-based termination condition. In some embodiments, the lock screen user interface 626 also displays text 634 ("9:40") indicating the current time at device 500*a*.

FIG. 6F shows a lock screen user interface 626 with a user interface object 636 representing an updated check in interaction in the case of a detected delay in achieving termination of the check in interaction. In some embodiments, and as discussed in method 700, if the device 500*a* does not arrive at the destination location within a threshold time of the estimated time of arrival, a user interface object 636 with a selectable option 642 to extend the check in interaction is displayed by device 500*a*. In some embodiments, the user interface object 636 includes text 638 ("Looks like you are delayed") to indicate a delay in the check in interaction, and text 640 ("We will notify Jill that you are delayed unless you extend the check in") to indicate that an indication of a delay will be transmitted to the receiving device and/or user of the check in interaction. In some embodiments, device 500*a* starts sharing a current location of device 500*a* with a receiving device 500*b* if the selectable option 642 to extend check in is not selected. In some embodiments, in the case of a timer-based termination condition, device 500*a* starts sharing a current location of device 500*a* with a receiving device 500*b* if a selectable option, selectable to terminate the check in interaction, is not selected within a threshold amount of time (e.g., 10 minutes, 15 minutes, or 30 minutes). In some embodiments, selectable option 642 extends the check in interaction by a predetermined amount of time (e.g., 1 hour, 2 hours, or 30 minutes). In some embodiments, extending the check in updates the criteria of the check in interaction to reflect the additional time, as described in method 700, and as shown in FIG. 6G. In some embodiments, the amount of time that the check in interaction is extended is modifiable via user input. In some embodiments, a similar user interface object and selectable option are displayed on the lock screen user interface 626 if an input is not detected to transmit an indication of termination at the expiration of the timer. For example, the device 500*a* displays a selectable option to extend the timer by a predetermined amount of time.

In some embodiments, device 500*a* receives a touch input from contact 644 on selectable option 642 to extend the check in interaction, as shown in FIG. 6F. As shown in FIG. 6G, as a result of the input in FIG. 6F, device 500*a* displays a fifth user interface object 646 (or representation) of a fifth message added to the messaging conversion from device 500*a* in the messaging user interface 600 in response to device 500*a* receiving an input to extend a check in interaction. In some embodiments, the fifth user interface object 646 includes text 647 ("check in extended by 1 hour") indicating the extension of the check in interaction and text 648 ("about 1 hour") indicating the estimated time of arrival at the destination location. In some embodiments, the fifth user interface object 646 replaces the fourth user interface object 620 in the messaging conversation. In some embodiments, the fifth user interface object 646 indicates a change in status of the check in interaction, as described in method 700. In some embodiments, a similar user interface object and text is presented for an extended timer-based check in interaction. In some embodiments, the user interface object on the lock screen user interface 626 is also updated to indicate the extended check in interaction and the updated time of arrival/updated timer.

FIG. 6H shows the lock screen user interface 626 with user interface object 628 like in FIG. 6E. A touch input is received on the user interface object 628 from contact 650. In response to the touch input, a check in settings user interface 652 is displayed, as shown in FIG. 6I. Check in settings user interface 652 and check in setting user interface 614 in FIG. 6C are optionally different embodiments of check in settings user interfaces. In some embodiments, check in settings user interface 652 is shown while the check in interaction is active. In some embodiments, check in settings user interface 652 is shown during the setup of the check in interaction as described in FIG. 6C. In some embodiments, the check in settings user interface 652 includes a plurality of user interface objects 654*a-d*. In some embodiments, object 654*a* is a selectable object that when selected, terminates the check in interaction. With reference to method 700, in response to selecting object 654*a*, the device 500*a* determines whether the receiving device 500*b* receives an indication of the cancellation. In some embodiments, object 654*b* is a visual indication of the current location of device 500*a* displayed on a representation of a map that includes the current location of device 500*a*. In some embodiments, object 654*c* indicates the destination location of the check in interaction and is a selectable object that when selected, allows the user of device 500*a* to change the destination location of the check in interaction. In some embodiments, object 645*d* shows the estimated time of arrival to the destination location, and when selected, allows the user of device 500 to modify the estimated time of arrival.

FIG. 6J illustrates the lock screen user interface 626 including a user interface object 656 displayed including the text "Emergency services has been called". In some embodiments, while the check in interaction is active, the device 500*a* or a user of the device 500*a* detects an emergency, as discussed in method 700. In response to detecting an emergency, the device 500*a* displays user interface object 656. In response to detecting an emergency, device 500*a* additionally or alternatively optionally transmits an indication of an emergency to receiving device 500*b* and optionally begins sharing a current location of device 500*a* with the receiving device 500*b*. In some embodiments, an emergency is detected by a sensor in device 500*a*, such as an accelerometer. For example, the device 500*a* optionally detects a crash or a hard fall when there is a sudden change in acceleration. In some embodiments, device 500*a* displays user interface object 656 and calls emergency services if a user of device 500*a* does not cancel the emergency response within a threshold amount of time (e.g., 1 min, 30 seconds, or 15 seconds). In some embodiments, a user of the device 500*a* optionally activates the emergency response (e.g., via user input) and triggers the device 500*a* to call emergency services and transmit an indication of an emergency to the receiving device 500*b*.

FIG. 6K shows another embodiment of a messaging user interface 600 including a different messaging conversation between Kelly and a contact named Jill. The messaging user interface 600 includes a first user interface object 658 (or representation) of a first message that was added to the messaging conversation from a device associated with Kelly, and a second user interface object 660 (or representation) of a second message that was added to the messaging conversation from a device associated with Jill. In some embodiments, the device 500*a* displays the first user interface object 658, in messaging user interface 600, in response to device 500*a* receiving an indication that the device associated with Kelly has added the first message to the messaging conversation that includes the text "I'm at the office". In some embodiments, the device 500*a* displays the second user interface object 660, in messaging user interface 600, in response to device 500*a* receiving an indication that the device associated with Jill has added the second message that includes the text "Let me know when you leave" to the messaging conversation. In some embodiments, the device 500*a* displays a keyboard user interface including a text entry field 662, wherein the user of device 500*a* has typed out "I'm going home", a content suggestion user interface 664 with selectable options 666 and 668, shown in FIG. 6K, and a keyboard 665 with selectable keys, shown in FIG. 6K. In some embodiments, in response to the text in the text entry field 662, the device 500 displays selectable suggestions (e.g., selectable option 666) to correct/add text to the message. For example, the selection of selectable option 666 adds "tonight" to the text entry field 662, such that the text reads, "I'm going home tonight". In some embodiments, and as shown in FIG. 6K, selectable option 666 includes a suggestion to add "okay" to the text entry field 662 in response to the second message displayed on the second user interface object 660. In some embodiments, device 500 displays selectable options without the user typing in the text entry field 662. In some embodiments, the device 500 also displays a check in suggestion (e.g., selectable option 668) in response to the text in the text entry field 662. As shown in FIG. 6K, the device 500 displays a check in suggestion (e.g., selectable option 668) without text in the text entry field 662. In some embodiments, device 500 displays selectable option 668 as a suggestion in response to previous messages in the messaging conversation. For example, device 500 displays selectable option 668 as a suggestion based on the text "Let me know when you leave" shown in second user interface object 660. In some embodiments, in response to selecting selectable option 668, the device 500*a* displays the check in settings user interface 614, shown in FIG. 6C. In some embodiments, the device 500*a* displays selectable option 668 if the text in the text entry field 662 is relevant to a check in interaction (e.g., discusses going to a new location such as home, work, and/or gym) and/or the messaging conversation is with certain contacts, as discussed in method 700 and in FIG. 6A.

FIG. 6L is an embodiment of a check in suggestion displayed on the lock screen user interface 626 by device 500*a*. In some embodiments, during a particular time (e.g., 5:00 PM, 8:00 AM, or 12:00 PM), a user interface object 672 is displayed, with reference to method 700. In some embodiments, the particular time is a time where the device 500*a* commonly moves locations. For example, user interface object 672 is displayed by device 500*a* at 5:00 PM, which is optionally the time at which the device 500*a* leaves a location (e.g., work place), and returns to a home location. In some embodiments, user interface object 672 is a selectable option that is selectable to display the check in settings user interface 614, as shown in FIG. 6C. Additional details about what causes device 500*a* to display a suggestion to initiate a check in interaction are described with reference to method 700.

FIG. 6M illustrates the lock screen user interface 626 with user interface object 628, which is shown while a check in interaction is active, as described in FIG. 6E. Lock screen user interface 626 includes a menu 674 including selectable options 674*a-d*, which is optionally displayed in response to an input such as a swipe down input with contacts such as a finger or a stylus. Menu 674 is optionally a control center user interface for controlling one or more functionalities of device 500*a*. In some embodiments, selectable option 674*a* is an option that when selected toggles on or off airplane mode for device 500*a*. In some embodiments, airplane mode disables Bluetooth, Wi-Fi, cellular, and/or data connections on device 500*a*. In some embodiments, selectable option 674*b* is an option that when selected toggles on or off cellular data for device 500*a*. In some embodiments, selectable option 674*c* is an option that when selected toggles on or off Bluetooth for device 500*a*. In some embodiments, selectable option 674*d* is an option that when selected toggles on or off on Wi-Fi for device 500*a*. In some embodiments, device 500*a* detects an input using contact 670 on option 674*a* to turn on airplane mode. In response to the input, user interface object 676 is displayed by device 500*a* along with selectable options 678*a-b*. In some embodiments, user interface object 676 is displayed when device 500*a* determines that completion criteria for a check in interaction cannot or may not be able to be determined by device 500*a*, as discussed in method 700. For example, while in airplane mode, device 500*a* optionally cannot determine a current location of device 500*a* or initiate transmission of check in indications to device 500*b*. In some embodiments, user interface object 676 includes selectable option 678*a* that when selected cancels the check in interaction, and selectable option 678*b* that when selected allows the user of device 500*a* to send a custom message to device 500*b* and/or the recipient of the check in interaction. In some embodiments, the selection of option 678*b* causes device 500*a* to display the messaging user interface 600 or another user interface including a keyboard user interface to input and send a message to a recipient of the check in interaction.

FIG. 6N illustrates the messaging user interface 600 with a messaging conversation between Jill and Kelly including an indication of a completed check in interaction. In some embodiments, in response to the completion of a check in interaction, the fourth user interface object 620, described in FIG. 6D, is replaced with static text 680 which includes the text, "You shared a check in with Jill", at the completion of the check in, as discussed in method 700. More generally, in some embodiments, static text 680 indicates that a check in interaction occurred and/or was initiated between the devices (e.g., device 500*a* and device 500*b*) of the messaging conversation. In some embodiments, the static text 680 is not selectable. In some embodiments, after the completion of the check in interaction, device 500*a* no longer shares a current location of device 500*a* with device 500*b*.

In some embodiments, the device 500*a* is in communication with a device 500*c*. Device 500*c* optionally includes a display generation component 504*c*, as shown in FIG. 6O. In some embodiments, device 500*a* is connected to the device 500*c* wirelessly or with wires. For example, and as described in method 700, the device 500*a* is connected to device 500*c* using Bluetooth, USB-C, USB-A, or other forms of connection. In some embodiments, the device 500*c* is a vehicle infotainment device. In some embodiments, the display generation component 504*c* is a hardware components (e.g., including electrical components) capable of receiving display data and displaying a user interface. In some embodiments, examples of the display generation component 504*c* include a touch screen display, a monitor, a television, a projector, an integrated, discrete, or external display device, or any other suitable display device that is in communication with device 500*c*. In some embodiments, the display generation component 504*c* includes one or more of the features described with reference to method 700.

In some embodiments, device 500*a* transmits data relating to applications, user interfaces, and the check in interaction to be displayed on device 500*c*. As shown in FIG. 6O, the device 500*c* displays a user interface 682 that includes a plurality of user interface elements 684*a* through 684*c*. In some embodiments, user interface 682 is a home page user interface of device 500*c*. In some embodiments, the user interface 682 includes widgets of information provided from different applications (e.g., maps, music, weather, phone, or other applications) on the device 500*a*. In some embodiments, the plurality of user interface elements 684*a* through 684*c* include content provided from different applications installed on device 500*a*. For example, as shown in FIG. 6O, user interface element 684*a* includes a representation of a map, provided from the maps application on device 500*a*. For example, as shown in FIG. 6O, user interface element 684*b* includes a description of weather data (e.g., the temperature at a location such as a current location or a specified location and/or the weather at a location), provided from the weather application on device 500*a*. For example, as shown in FIG. 6O, user interface element 684*c* includes information about a currently playing content item, provided from a content application, such as a music application, on device 500*a*. User interface element 684*c* includes selectable options that when selected changes the playback of the content item (e.g., pause, play, fast forward, or rewind). For example, the song presently playing is "song 1", as shown in FIG. 6O. In some embodiments, in response to an input directed towards any of user interface elements 684*a* through 684*c*, the device 500*c* opens the respective application (e.g., displays the user interface of the corresponding application). For example, the device 500*c* opens the maps application in response to an input directed towards user interface element 642*a*. In some embodiments, user interface 682 also includes a navigation bar 686 that includes selectable options corresponding to various applications (e.g., phone application, maps application, or music application), that when selected, cause device 500*c* to display various user interfaces of various applications.

In some embodiments, in response to the device 500*a* detecting an update to the check in interaction (e.g., a delay, emergency, or termination), described in further detail in method 700, the device 500*c* displays an indication 688 of an update. In some embodiments, the indication 688 is displayed overlaid on user interface 682, as shown in FIG. 6O. In some embodiments, the indication 688 is displayed over any user interface of any application on device 500*c*. In some embodiments, the indication 688 includes text describing the update to the check in interaction ("It looks like you're delayed").

In some embodiments, device 500*c* detects a user input (e.g., contact 690 directed to indication 688 in FIG. 6O) corresponding to a request to expand the indication, shown in FIG. 6P. In response to the user input directed to select indication 688 in FIG. 6O, the device 500*c* displays an expanded indication 692, shown in FIG. 6P.

In some embodiments, the expanded indication 692, shown in FIG. 6P, provides more details about the update to the check in interaction. In some embodiments, the expanded indication includes text indicating that the receiver of the check in interaction (e.g., device 500*b* and/or second user account) will be notified in a given amount of time if no action is taken, as described in method 700. In some embodiments, the text ("It looks like you're delayed. Jill will be notified in 15 min") is presented by an audio output device (e.g., a speaker) on or connected to device 500*c*. In some embodiments, while the device 500*c* displays indication 688 and/or expanded indication 692, device 500*a* displays user interface object 636, as described in FIG. 6F. In some embodiments, expanded indication 692 includes a first selectable option 694*a*, which when selected, dismisses the expanded indication 692, and a second selectable option 694*b*, which when selected extends the check in interaction by a predetermined amount of time (e.g., 1 hour, 2 hours, or 30 minutes). In some embodiments, a user of device 500*a* and/or device 500*c* selects the amount of time to extend the check in interaction.

FIGS. 7A-7J illustrates a flow diagram of a method in which an electronic device displays and transmits a communication in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways in which an electronic device displays and transmits a communication in accordance with some embodiments of the disclosure. Displaying and transmitting a communication that bundles important information quickly and efficiently without the need for additional inputs, and also provides feedback to the second user account that further communication from the first user account may be initiated in the future, thereby reducing erroneous interactions with the devices.

In some embodiments, the method 700 is performed at a first electronic device (e.g., device 500*a* shown in FIG. 6A) in communication with a display generation component and one or more input devices, wherein the first electronic device is associated with a first user account (e.g., the first user account is associated with Kelly, as described in FIG. 6A). For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, method 700 is performed at or by an automobile (e.g., at an infotainment system of an automobile having or in communication with one or more display generation components and/or input devices). In some embodiments, the first user account is associated with a first user. In some embodiments, the first electronic device is associated with the first user account (e.g., that is established with a secure and/or trusted entity such as one or more servers configured to verify cryptographic information associated with the first user account) that has designated the first user as the owner of the first electronic device, thereby defining an association between the first user and the first user account.

In some embodiments, the first electronic device (e.g., device 500*a* shown in FIG. 6A) displays (702*a*), via the display generation component, a first user interface (e.g., a check in user interface) for initiating a check in interaction with a second user account (e.g., that is associated with a second user), different from the first user account, such as check in user interface 610 in FIG. 6B. In some embodiments, the second user account is associated with a second electronic device. The second electronic device optionally has one or more characteristics of the first electronic device. In some embodiments, the second user account is related to the first user account. For example, the second user associated with the second user account is saved as a contact on the first electronic device. In some embodiments, the first user interface includes information regarding the location and/or transit time to a second location of the first electronic device. In some embodiments, the first user interface is an overlay user interface that is displayed over a messaging user interface, discussed in further detail below. In some embodiments, the first user interface is accessible through a third user interface (e.g., a car application, a voice assistant application, or a messaging application). In some embodiments, the messaging user interface including a selectable option to display a menu with a plurality of selectable options, including an option to display the first user interface to initiate a check in interaction. In some embodiments, the check in interaction is a persistent interaction and/or relationship that is established between the first user account and the second user account for a duration of the check in interaction that ends when the termination condition, described below, is satisfied. In some embodiment, the check in interaction is an interaction and/or relationship for which the first user account and/or the second user account receive an indication of initiation, and for which the first user account and/or the second user account receive an indication of termination, as described in more detail below.

In some embodiments, while displaying the first user interface, the first electronic device receives (702*b*), via the one or more input devices, an input corresponding to a request to initiate the check in interaction with the second user account, such as with contact 618 on object 616*b* in FIG. 6C, including initiating the check in interaction with a first termination condition for the check-in interaction, such as user interface objects 616*c-m* in FIG. 6C (e.g., when the first electronic device arrives at the second location and/or when a second input is received when a preset timer expires), wherein the first termination condition defines one or more criteria that, when satisfied, cause a first indication of a termination of the check in interaction to be transmitted to the second user account. In some embodiments, the first electronic device initiates the check in with one or more user accounts (e.g., with two or more different user accounts) concurrently (e.g., two or more user accounts are optionally the recipient of the same check in). In such embodiments, interactions between and/or operations performed by the two or more participants optionally have one or more of the characteristics of such interactions and/or operations described with reference to the check in operations described with reference to methods 700 and/or 900. In some embodiments, receiving the input includes interaction with one or more user interface elements in the first user interface (e.g., buttons). For example, the electronic device detects a tap (e.g., with an index finger of a hand) at a location on a touch sensitive display. In some embodiments, if the first termination condition and/or the one or more criteria is not met, a third indication of non-termination is transmitted to the second user account. For example, if the first electronic device does not arrive at the second location or if the second input is not received when a preset timer expires, the third indication of non-termination is transmitted to the second user account. The second input optionally includes characteristics of the input described above.

In some embodiments, in response to receiving the input and before the one or more criteria are satisfied, the first electronic device initiates (702*c*) a process to transmit to the second user account (and/or the second electronic device), a second indication of initiation of the check in interaction, such as corresponding to the fourth user interface object 620 shown in FIG. 6D. In some embodiments, the second indication of initiation of the check in interaction is transmitted to the second user account and/or the second electronic device from the first electronic device and/or from a server in communication with both electronic devices. In some embodiments, the second indication of initiation includes an indication of the electronic device that transmitted the second indication of initiation (e.g., an indication of the first electronic device and/or an indication of the first user account). In some embodiments, the second indication of initiation includes an indication of a termination condition (e.g., the first termination condition) that will cause the check in interaction to end. In some embodiments, in response to receiving the second indication of initiation of the check in interaction, the second electronic device displays a visual indication of the initiation of the check in interaction (e.g., as described with reference to method 900). Transmitting a first user interface for initiating a check in interaction with a second user account allows important information to be bundled and transmitted quickly and efficiently without the need for additional inputs, and also provides feedback to the second user account that further communication from the first user account may be initiated in the future, thereby reducing erroneous interactions with the devices.

In some embodiments, displaying the first user interface (704*a*) includes displaying the first user interface within a messaging user interface of a messaging application on the first electronic device (704*b*), such as messaging user interface 600 shown in FIG. 6A. In some embodiments, the messaging user interface includes representations of messages between a user of the first electronic device and one or more other users. For example, the messaging user interface optionally corresponds to a messaging conversation between the first user and the second user. In some embodiments, the first electronic device is able to transmit and/or receive messages from and/or display messages in the messaging conversation from the second electronic device, and vice versa. In some embodiments, the first user interface is displayed over the messaging user interface such that at least one or the representation of messages are visible outside of the first user interface. Displaying the first user interface via a messaging user interface facilitates the transmission of the check in interaction between two devices, thereby improving interaction between the user and the electronic device, which reduces power usage and improves battery life of the electronic device.

In some embodiments, the first electronic device displays (706*a*) the first user interface in accordance with a determination that the first electronic device displays (706*b*) a messaging user interface of a messaging application, the messaging user interface corresponding to a messaging conversation that includes a first contact (e.g., the second user account), such as a contact named Jill, indicated by the representation 602 of Jill in FIG. 6A, the first electronic device displays the first user interface within the messaging user interface, such as check in user interface 610 shown in FIG. 6A. In some embodiments, the first contact is associated with and/or corresponds to the second user account. In some embodiments, the first contact is a frequent contact of the first user account. For example, the first contact is optionally a close friend, a parent, or a significant other.

In some embodiments, in accordance with a determination that the first electronic device is displaying a messaging user interface of the messaging application, the messaging user interface corresponding to a messaging conversation that includes a second contact (e.g., different from the second user account), different from the first contact, the first electronic device forgoes displaying (706*c*) the first user interface within the messaging user interface, such as if the messaging conversation in messaging user interface 600 shown in FIG. 6A was with a different contact (e.g., Joe). In some embodiments, the second contact is not a contact whose information is stored on the first electronic device. In some embodiments, the second contact is an infrequent contact of the first user account. In some embodiments, the first electronic device and/or the first user account choose for which contacts the first user interface is displayed. In some embodiments, the second contact is not associated with and/or does not correspond to the second user account. Displaying the first user interface only with certain contacts avoids erroneous inputs related to initiating a check in interaction with incorrect contacts, which reduces power usage and improves battery life of the electronic device.

In some embodiments, the first user interface is displayed (708) while one or more second criteria are satisfied, including a criterion that is satisfied based on a current time of day at the first electronic device, such as shown by user interface object 672 in FIG. 6L. In some embodiments, the first electronic device displays the first user interface during a particular time of day. For example, the first user interface is displayed at 5 PM (e.g., at the end of a work day) and/or at 8 AM (e.g., before the start of a work day). In some embodiments, the first user interface is displayed via a suggestion from the first electronic device at a particular time of day. In some embodiments, while the first user interface is not displayed, detecting that the one or more second criteria are satisfied and in response to detecting that the one or more second criteria are satisfied, displaying the first user interface. Alternatively or additionally, and in some embodiments, while displaying the first user interface, detecting that the one or more second criteria are not satisfied, and in response to detecting that the one or more criteria are not satisfied, cease displaying the first user interface. Displaying the first user interface at certain times of day reduces the need for manual inputs to display the first user interface, which reduces power usage and improves battery life of the electronic device.

In some embodiments, the first user interface is displayed (710) while one or more second criteria are satisfied, including a criterion that is satisfied before an expected navigation session has been initiated and when a start of the expected navigation session is within a time threshold (e.g., 1 min, 5 mins, 30 mins, or 1 hour) of a current time at the first electronic device, such as if user interface object 672 in FIG. 6L was displayed before the first electronic device leaves for a home destination. In some embodiments, the expected navigation session is a navigation session normally initiated at a certain time from a current location of the first electronic device, using the maps application. In some embodiments, the first electronic device classifies a navigation session as an expected navigation session after a user has repeatedly set (e.g., after 1 time, after 3 times, after 10 times) the navigation session as a certain time from a certain current location. In some embodiments, the first electronic device displays the first user interface based on activity patterns of the first electronic. For example, the first user interface is optionally displayed when the first electronic device is connected (e.g., wirelessly such as with Bluetooth, or wired such as with USB-C or USB-A) to a car. The first user interface is optionally displayed when the first electronic device leaves a known location (e.g., home location, workplace location, and/or gym location). In some embodiments, the first user interface is displayed via a suggestion from the first electronic device. In some embodiments, while the first user interface is not displayed, detecting that the one or more second criteria are satisfied and in response to detecting that the one or more second criteria are satisfied, displaying the first user interface. Alternatively or additionally, and in some embodiments, while displaying the first user interface, detecting that the one or more second criteria are not satisfied, and in response to detecting that the one or more criteria are not satisfied, cease displaying the first user interface. Displaying the first user interface before an expected navigation session reduces the need for manual inputs to display the first user interface, which reduces power usage and improves battery life of the electronic device.

In some embodiments, the first electronic device displays (712*a*) a keyboard user interface, such as keyboard 665 in FIG. 6K. In some embodiments, the keyboard user interface is displayed within another user interface such as a messaging user interface, email user interface, and/or web browsing user interface into which content from the keyboard user interface is entered based on input detected at the keyboard user interface.

In some embodiments, while displaying the keyboard user interface, the first electronic device receives (712*b*), via the one or more input devices, a second input directed to the keyboard user interface, such as an input with a contact to type a message (e.g., "I'm going home"), shown in FIG. 6K. In some embodiments, the second input has one or more characteristics of the input described above. In some embodiments, the second input is directed at the selection of one or more keys of the keyboard user interface.

In some embodiments, in response to receiving the second input, the first electronic device displays (712*c*), via the display generation component, a keyboard suggestion user interface, such as content suggestion user interface 644 shown in FIG. 6K, including a first selectable suggestion corresponding to the second input that is selectable to enter content corresponding to the first selectable suggestion in a content entry field (712*d*), such as selectable option 666 in FIG. 6K, and the first user interface (712*e*), such as selectable option 668 in FIG. 6K. In some embodiments, the first selectable suggestion is an autocorrect suggestion corresponding to the second input. For example, the second input is optionally a typing input to type a message using the keyboard user interface in a messaging user interface, and the first selectable suggestion is optionally a suggestion to correct and/or add text to the message. For example, the message is "I'm going home" and a suggestion optionally includes "tonight" and/or "now". In some embodiments, the first user interface is a second selectable suggestion. In some embodiments, the keyboard suggestion user interface includes multiple selectable suggestions (e.g., one, two, three, or four). In some embodiments, the first selectable suggestion and the second selectable suggestion are displayed in a content suggestion user interface in the keyboard user interface. In some embodiments, the second selectable suggestion appears on the keyboard suggestion user interface without receiving a second input. For example, in response to displaying a messaging user interface with a first contact, as described above, the second selectable suggestion is displayed. Displaying the first user interface in response to an input onto a keyboard user interface reduces the need for manual inputs to display the first user interface thereby reducing the likelihood of erroneous inputs, which reduces power usage and improves battery life of the electronic device.

In some embodiments, initiating the check in interaction with the first termination condition for the check-in interaction includes initially defining the one or more criteria without user input defining the one or more criteria (714), such as shown by check in user interface 610 in FIG. 6B. In some embodiments, the first electronic device defines the one or more criteria using a predicted location. For example, and as discussed in above, the predicted location optionally includes a home location, a work location, and/or a gym location because one of the aforementioned locations is optionally the destination location of the first electronic device at a certain time and/or day. In some embodiments, the one or more criteria includes an estimated time of arrival at the predicted location using a predicted mode of transportation (e.g., car, walk, bike, or transit). In some embodiments, the predicted mode of transportation is the mode of transportation typically used to travel from a current location to a destination location, as discussed below. Initially defining the one or more criteria without user input reduces the need for manual inputs to define the one or more criteria thereby reducing the likelihood of erroneous inputs to the user interface, which reduces power usage and improves battery life of the electronic device.

In some embodiments, the one or more criteria include a criterion corresponding to a mode of transport (e.g., car, bike, walk, or transit) determined based on a pattern of a mode of transport used by the first user account (716), such as shown by user interface object 616*j* in FIG. 6C. In some embodiments, the first electronic device tracks a mode of transport the first user of the first user account frequently uses. For example, the first electronic device historically detects a wireless or wired connection to a car. For example, the first electronic device detects the speed at which it is moving, a route that it is moving on (e.g., a transit line, bike lane, and/or sidewalk), and determines a mode of transportation based on those factors. In some embodiments, the first electronic device recommends the most frequent mode of transportation to get to a location as the mode of transportation. In some embodiments, the mode of transportation is a mode of transportation historically selected in the maps application for navigation directions. Initially defining the one or more criteria corresponding to a mode of transport without user input reduces the need for manual inputs to define the one or more criteria thereby reducing the likelihood of erroneous inputs to the user interface, which reduces power usage and improves battery life of the electronic device.

In some embodiments, the first termination condition corresponds to an estimated time of arrival at a destination location (718*a*) (e.g., a predicted location such as a home location, a gym location, or a work location), such as corresponding to user interface object 616*g* in FIG. 6C, and in accordance with a determination that the check in interaction is associated with a first mode of transportation, the estimated time of arrival at the destination is a first estimated time of arrival (718*b*), such as shown by text 617 in FIG. 6C.

In some embodiments, in accordance with a determination that the check in interaction is associated with a second mode of transportation, different from the first mode of transportation, the estimated time of arrival at the destination is a second estimated time of arrival, different from the first estimated time of arrival (718*c*), such as if text 617 includes an estimated time of arrival for a different mode of transportation in FIG. 6C. In some embodiments, the estimated time of arrival is determined as a function of a predicted mode of transportation as discussed in above. In some embodiments, the estimated time of arrival is determined based on the route and/or speed of the mode of transportation. For example, an estimated time of arrival for a car is optionally quicker than the estimated time of arrival for public transit. Updating an estimated time of arrival based on a mode of transport without user input reduces the need for manual inputs to define the one or more criteria thereby reducing the likelihood of erroneous inputs to the user interface, which reduces power usage and improves battery life of the electronic device.

In some embodiments, while displaying the first user interface, the first electronic device receives (720*a*), via the one or more input devices, a second input corresponding to a request to customize the check in interaction, such as with contact 612 on check in user interface 610 in FIG. 6B. The second input has one or more characteristics of the input described above. For example, a user of the first electronic device optionally taps/selects the first user interface to display the check in settings user interface.

In some embodiments, in response to receiving the second input, the first electronic device displays (720*b*), via the display generation component, a check in settings user interface, wherein the check in settings user interface includes a plurality of selectable options for changing one or more settings of the check in interaction, such as check in settings user interface 614 in FIG. 6C. For example, the selectable options include an option to change the ETA (e.g., extend by 15 minutes, 30 minutes, or 60 minutes), an option to change the mode of transportation, an option to change a destination location, an option to change the termination condition (e.g., time based or location based), and/or an option to always share the current location of the first electronic device with the second user account or only when the check in is delayed. In some embodiments, the selectable options also include an option to share basic information or all information with the second electronic device/the second user account. For example, basic information includes a current location of the first electronic device, battery levels of the first electronic device and other devices associated with the first user account (e.g., a watch), network connectivity of the first electronic device and other devices associated with the first user account, and recent usage of the first electronic device and other devices associate with the first user account (e.g., a time and/or date of a recent usage). All information optionally includes all the information in the basic information as well as previous locations of the first electronic device (e.g., a full route traveled while the check in interaction is active), a location of the last unlock of the first electronic device, and a location of a last activity of other devices associated with the first user account (e.g., a location of a watch removal). In some embodiments, the basic or all information is shared throughout the duration of the check in interaction without a delay or emergency being detected. In some embodiments, the check in settings user interface includes graphics such as maps. For example, the map optionally presents a plurality of suggested locations for the check in interaction. In some embodiments, the suggested locations are frequently visited locations, such as predictive locations, discussed above. In some embodiments, a location becomes a suggested location after a threshold number of visits (e.g., 1, 3, 10, or 50 visits). Alternatively, or additionally, in some embodiments, the check in settings user interface includes a list of a plurality of suggested locations for the check in interaction. In some embodiments, a user of the first electronic device is able to set a size of a geofence (e.g., small, medium or large) around the destination location for the check in interaction and that triggers the termination condition for the check in interaction (e.g., indicating that the check in has been completed). For example, the user optionally sets the size of the geofence to be 100 m surrounding the destination location, so once the first electronic device arrives within 100 m of the destination location, the termination condition is satisfied. In some embodiments, the user may select and drag a visual indication of the geofence (e.g., a circle) to set the size of the geofence. Presenting a variety of settings in one user interface for the check in interaction simplifies the interaction between the user and the electronic device by reducing the number of inputs needed to change the settings of the check in interaction and avoids erroneous inputs related to changing one or more settings of the check in interaction, which reduces power usage and improves battery life of the electronic device.

In some embodiments, the check in setting user interface includes a first selectable option that is selectable to adjust whether a first set of data of the first electronic device will be shared with the second electronic device, or a second set of data of the first electronic device will be shared with the second electronic device in accordance with a determination that satisfaction of the one or more criteria will be delayed (722), such as shown by selectable object 616*k* and 616*m* in FIG. 6C. In some embodiments, delayed satisfaction of the one or more criteria (e.g., a time criterion) occurs if the time duration of the check in is reached/exceeded by a threshold time (e.g., 1 min, 15 mins, 30 mins, or 1 hour). In some embodiments, delayed satisfaction of the one or more criteria (e.g., a location criterion) occurs when the initial estimated time of arrival is reached/exceeded by a threshold time (e.g., 1 min, 15 mins, 30 mins, or 1 hour). For example, the first electronic device does not arrive to a destination location by the estimated time of arrival and exceeds the time by the threshold time. In some embodiments, delayed satisfaction of a timer criterion occurs when the timer has expired and a user of the first electronic device has not initiated a transmission of the first indication of termination within a threshold time (e.g., 1 min, 15 mins, 30 mins, or 1 hour). For example, the user of the first electronic device has not selected a selectable option to end the check in interaction. This optionally applies to one or more of all the embodiments described in methods 700 and/or 900 wherein delayed satisfaction of the one or more criteria is described. In some embodiments, the first electronic device shares a first set of data (e.g., basic information), as described above, when satisfaction of the one or more criteria will be delayed. Alternatively, in some embodiments, the first electronic device shares a second set of data (e.g., all information), as described above, when satisfaction of the one or more criteria will be delayed (e.g., the first electronic device has not arrived at a destination location by the estimated time of arrival, or a timer has expired without an additional input) or when an emergency is detected (e.g., a sudden change in acceleration such as a hard fall or a car crash). Providing an option to customize when the current location of the first electronic device is shared reduces the resources needed for the check in interaction thereby reducing power usage and improves battery life of the electronic device and improves privacy and/or security of the first electronic device.

In some embodiments, the one or more criteria includes a criterion that is satisfied when a current location of the first electronic device corresponds to a destination location (724), such as if selectable object 616*d* is selected in FIG. 6C. In some embodiments, the first indication of the termination of the check in interaction is transmitted to the second user account when the current location of the first electronic device corresponds to the destination location. In some embodiments, the maximum duration of the check in interaction is between 12-24 hours. As such, if the criterion is not satisfied once the maximum duration is reached, the check in interaction is terminated (e.g., canceled) and the first indication of termination is not transmitted. Satisfying a check in criteria using location based criteria reduces the number of inputs needed to transmit the indication of termination of the check in thereby reducing the likelihood of erroneous inputs from the user.

In some embodiments, the one or more criteria includes a criterion that is satisfied based on a time duration that is defined when the check in interaction is initiated (726), such as if selectable object 616*c* is selected in FIG. 6C. In some embodiments, the time duration criterion does not use location data of the first electronic device, such as a current location of the first electronic device (e.g., the check in interaction termination is not based on location of the device). In some embodiments, the first indication of the termination of the check in interaction is transmitted to the second user account when the time duration that was defined when the check in interaction was initiated expires and no additional inputs are received on the first electronic device. In some embodiments, when the time duration expires, a user interface is displayed with selectable options to notify the second electronic device of the first indication of the termination or to extend the time duration of the check in interaction (e.g., by 5 min, 15 min, or 1 hour). In some embodiments, a countdown timer of the remaining time duration is shown in an expanded user interface, as discussed in below. In some embodiments, the maximum duration of the check in interaction is between 12-24 hours. As such, if the criterion is not satisfied once the maximum duration is reached, the check in interaction is terminated (e.g., canceled) and the first indication of termination is not transmitted. Satisfying a criteria using a time based criteria reduces resources needed to satisfy the criteria, as location tracking is not activated, thereby reducing power usage and improving battery life of the electronic device, as well as improving privacy of the electronic device because location data is not transmitted to a server and/or other devices.

In some embodiments, while the check in interaction is active, in accordance with a determination that satisfaction of the one or more criteria will be delayed (e.g., a criterion as described above), the first electronic device displays (728), via the display generation component, a selectable option that is selectable to extend the check in interaction, such as selectable object 616*h* in FIG. 6C. In some embodiments, selecting the selectable option extends the check in interaction a predetermined amount of time (e.g., 1 hour, 2 hours, 15 minutes, or 30 minutes). In some embodiments, extending the check in interaction includes extending by the amount of time that the first electronic device will be delayed. For example, extending the check in interaction optionally includes extending by the added time a car accident causes, a detour causes, or the added time a delayed bus/train causes. For example, extending the check in interaction optionally includes extending by the current estimated time of arrival from a current location of the first electronic device to the destination location. In some embodiments, a user of the first electronic device selects the amount of time to extend the check in interaction (e.g., 1 hour, 2 hours, 15 minutes, or 30 minutes). In some embodiments, after extending the check in interaction, the criteria of the check in interaction is updated to reflect the current estimated time of arrival. In some embodiments, at the expiration of the updated estimated time of arrival, if the criteria is satisfied a first indication of termination is transmitted or if the criteria is not satisfied (e.g., the criteria is delayed), a selectable option to extend the check in interaction is displayed. Providing an option to extend the check in interaction reduces the resources needed for the check in interaction by decreasing erroneous inputs thereby reducing power usage and improves battery life of the electronic device.

In some embodiments, while the check in interaction is active, in accordance with a determination that the one or more criteria are satisfied (e.g., a criterion such as described above), the first electronic device displays (730), via the display generation component, a first selectable option that is selectable to extend the check in interaction, such as selectable option 642 in FIG. 6F, and a second selectable option that is selectable to initiate transmission of the first indication of the termination of the check in interaction to the second electronic device, such as if user interface object 636, shown in FIG. 6F, included a second selectable option to initiate the transmission of the first indication of the termination to complete the check in interaction. In some embodiments, selecting the first selectable option extends the check in interaction a predetermined amount of time (e.g., 1 hour, 2 hours, 15 minutes, or 30 minutes) without initiating transmission of the first indication to the second electronic device. In some embodiments, a user of the first electronic device selects the amount of time to extend the check in interaction (e.g., 1 hour, 2 hours, 15 minutes, or 30 minutes). In some embodiments, selecting the second selectable option that is selectable to initiate transmission of the first indication of termination of the check in interaction terminates the check in interaction as successfully completed. Providing an option to extend the check in interaction or terminate the check in interaction ensures that the check in interaction is only terminated and/or extended when appropriate, thereby reducing inputs needed to correct erroneous termination.

In some embodiments, in response to receiving the input and before the one or more criteria are satisfied, the first electronic device displays (732), in a messaging user interface including messaging activity between the first user account and the second user account, a visual indication of the initiation of the check in interaction, such as user interface object 620 in FIG. 6D. In some embodiments, the visual indication of the initiation of the check in interaction is displayed chronologically within the messaging activity (e.g., text messages). In some embodiments, the visual indication of the initiation of the check in interaction includes a textual description of the one or more criteria (such as described above) that, when satisfied, cause the first indication of the termination of the check in interaction to be transmitted. In some embodiments, the visual indication of the initiation of the check in interaction includes an estimated time of arrival or a count down timer of the remaining time duration of the check in interaction, as discussed in above. In some embodiments, as non-check in interaction messages (e.g., text messages) are added to the messaging activity, the visual indication of the initiation of the check in interaction remains at its chronological position within the messaging activity. Displaying the visual indication of the initiation of the check in interaction chronologically in the messaging activity instead of persistently in the messaging activity reduces the resources needed to display the visual indication of the check in interaction, thereby improving interaction between the user and the electronic device, which reduces power usage and improves battery life of the electronic device.

In some embodiments, while displaying the visual indication of the initiation of the check in interaction, such as user interface object 628 in FIG. 6H, the first electronic device receives (734*a*), via the one or more input devices, a second input corresponding to a selection of the visual indication of the initiation of the check in interaction, such as with contact 650 on user interface object 628 in FIG. 6H. In some embodiments, the second input has one or more characteristics of the input described above. In some embodiments, a user selects any portion of the visual indication of the initiation of the check in interaction using the second input (e.g., the visual indication is a selectable option). In some embodiments, the second input corresponds to a selection of a portion of the visual indication (e.g., such as selecting a selectable option on the visual indication).

In some embodiments, in response to receiving the second input, the first electronic device displays (734*b*), via the display generation component, an expanded first user interface, such as check in setting user interface 652 in FIG. 6I or check in settings user interface 614 in FIG. 6C, wherein the expanded first user interface includes a plurality of selectable options for changing one or more settings of the check in interaction, such as user interface objects 616*a*-616*m* in FIG. 6C or user interface objects 654*a-d* in FIG. 6I. The expanded first user interface has one or more characteristics of the check in settings user interface described above. In some embodiments, the expanded first user interface includes a map with a visual indication of a current location of the first electronic device, a visual indication of a destination location for the check in interaction, a visual indication of an estimated time of arrival at the destination location, a visual indication of the mode of transportation for the check in interaction, and/or a visual indication selectable to cancel the check in interaction. In some embodiments, the expanded first user interface also includes an option to choose to share basic information or all information with the second electronic device/the second user account. In some embodiments, all or some of the aforementioned visual indications are selectable to be changed. For example, the visual indication of the destination location is optionally selectable to change the destination location for the check in interaction. Presenting a variety of settings in one user interface for the check in interaction simplifies the interaction between the user and the electronic device by reducing the number of inputs needed to change the settings of the check in interaction and avoids erroneous inputs related to changing one or more settings of the check in interaction, which reduces power usage and improves battery life of the electronic device.

In some embodiments, in response to detecting that a status of the check in interaction has changed (e.g., termination status, delayed status, cancellation status, and/or emergency status), the first electronic device replaces (736), in the messaging user interface, the visual indication of the initiation of the check in interaction with a second visual indication associated with the changed status of the check in interaction, wherein the second visual indication does not change based on a change of the check in interaction, such as static text 680 in FIG. 6N. In some embodiments, both the visual indication and the second visual indication are displayed in the messaging user interface. In some embodiments, the second visual indication is displayed in response to the first indication of termination being transmitted. In some embodiments, the second visual indication includes a textual description of the first termination condition. For example, the textual description optionally says, "you have shared a check in", or "check in: you have arrived at your destination location". In some embodiments, the second visual indication has a second visual appearance different than a visual appearance of the first visual indication. For example, the visual appearance of the first visual indication is optionally similar to a visual appearance of the messaging conversation. The second visual appearance is optionally distinctly different than the visual appearance of the messaging conversation. For example, the second visual appearance optionally includes different fonts and/or colors than the visual appearance of the first visual indication. In some embodiments, the visual indication is no longer displayed in the messaging user interface in response to the change in status of the check in interaction. In some embodiments, the second visual indication replaces the visual indication in the messaging activity. In some embodiments, the chronological position of the second visual indication is the same chronological position as the visual indication that was replaced. Replacing the visual indication with a second visual indication in response to a changed status provides feedback about the check in interaction, thereby reducing the number of inputs needed to retrieve additional information relating to the check in interaction.

In some embodiments, in response to detecting that the status of the check in interaction has changed (e.g., delayed check in), and in accordance with a determination that after the status of the check in interaction has changed, the check in interaction remains active (738*a*), such as shown by the check in interaction remaining active after the display of fifth user interface object 646 in FIG. 6G (e.g., the first indication of termination has not been transmitted because the change in status was not completion of the check in interaction), the first electronic device displays (738*b*), in the messaging user interface, a third visual indication of the check in interaction associated with the changed status of the check in interaction, wherein the third visual indication of the check in interaction changes based on a change of the check in interaction, such as fifth user interface object 646 in FIG. 6G. In some embodiments, the third visual indication of the check in interaction has a third visual appearance similar to the visual appearance of the first visual indication. In some embodiments, the third visual indication has one or more characteristics of the visual indication described throughout. In some embodiments, the third visual indication is displayed in the messaging activity with a chronological order/location corresponding to when the status of the check in interaction has changed. In some embodiments, the third visual indication is including in the messaging activity concurrently with the second visual indication, described above. In some embodiments, the third visual indication includes a textual description of an updated estimated time of arrival and/or a reason for the change in the status of the check in interaction (e.g., there has been a delay). Updating the visual indication with third visual indication in response to a changed status provides feedback about the check in interaction, thereby reducing the number of inputs needed to retrieve additional information relating to the check in interaction.

In some embodiments, in response to receiving the input and before the one or more criteria are satisfied and while the check in interaction remains active, the first electronic device displays (740) a first visual indication of the check in interaction on a lock screen user interface of the first electronic device, such as user interface object 628 in FIG. 6H, (e.g., a user interface that is displayed while the phone is locked (e.g., user access to the electronic is being restricted), and requires user authentication (e.g., facial authentication, fingerprint authentication, other biometric authentication, password authentication, etc.) before moving away from the lock screen user interface), wherein the first visual indication remains displayed on the lock screen user interface for a duration of the check in interaction, such as if user interface object 628 remains on the lock screen user interface 626 in FIG. 6H for the duration of the check in interaction. In some embodiments, the first visual indication has one or more characteristics of the visual indication as described above. In some embodiments, the first visual indication includes textual descriptions of an estimated time of arrival of the first electronic device to a destination location, as described above, or a timer countdown of the remaining time duration, as described above. In some embodiments, at the termination of the check in interaction, the first visual indication is no longer displayed on the lock screen user interface. In some embodiments, non-check in indications (e.g., visual indications of new messages, alerts or notifications from mail, video, or other apps, or the like) are also displayed on the lock screen user interface. Displaying the first visual indication on the lock screen user interface for the duration of the check in interaction provides feedback about the check in interaction, thereby reducing the number of inputs needed to retrieve additional information relating to the check in interaction.

In some embodiments, the first electronic device displays (742*a*) the first visual indication in accordance with a determination that a status of the check in interaction is a first status. The first electronic device displays (742*b*) a visual indication of the first status in the first visual indication, such as user interface object 628 in FIG. 6H.

In some embodiments, in accordance with a determination that a status of the check in interaction is a second status, the first electronic device displays (742*c*) a visual indication of the second status in the first visual indication, such as user interface object 656 in FIG. 6J. In some embodiments, the status of the check in has one or more characteristics of the status described above. In some embodiments, the second status is not a status of the termination of the check in interaction. The second status is optionally a status indicating a delay in the check in. In some embodiments, the first status is an initiation status. In some embodiments, the second status is a termination status, a delayed status, a cancellation status, and/or a emergency status. In some embodiments, the first visual indication includes text describing an estimated time of arrival, whether the check in has been delayed, how long the check in has been delayed, the destination location of the check in interaction, an indication of the second user account that the check in interaction has been shared with, whether the check in interaction has been cancelled, and/or whether emergency services has been called. Displaying the visual indications of different statuses of the check in interaction on the lock screen user interface for the duration of the check in interaction provides feedback about the check in interaction, thereby reducing the number of inputs needed to retrieve additional information relating to the check in interaction.

In some embodiments, while displaying the first visual indication of the check in interaction on the lock screen user interface, the first electronic device receives (744*a*), via the one or more input devices, a second input corresponding to selection of the first visual indication, such as with contact 650 in FIG. 6H on user interface object 628. The second input has one or more characteristics of the input described above.

In some embodiments, in response to receiving the second input, the first electronic device displays (744*b*), via the display generation component, a check in settings user interface, wherein the check in settings user interface includes a plurality of selectable options for changing one or more settings of the check in interaction, such as check in setting user interface 652 in FIG. 6I or check in settings user interface 614 in FIG. 6C. In some embodiments, the check in settings user interface has one or more details as described above. Providing access to a variety of settings in one user interface for the check in interaction using the first visual indication simplifies the interaction between the user and the electronic device by reducing the number of inputs needed to view the settings of the check in interaction and avoids erroneous inputs related to changing one or more settings of the check in interaction, which reduces power usage and improves battery life of the electronic device.

In some embodiments, while the check in interaction is active, in accordance with a determination that satisfaction of the one or more criteria is delayed, the first electronic device displays (746), via the display generation component, a selectable option to extend the check in interaction, such as user interface object 642 in FIG. 6F (e.g., as described above), wherein extending the check in interaction comprises transmitting a third indication of extension of the check in interaction to the second user account, such as fifth user interface object 646 in FIG. 6G. In some embodiments, the third indication of extension of the check in interaction includes an indication of the updated estimated time of arrival and/or an updated time duration. In some embodiments, in response to receiving the third indication, the second electronic device optionally updates its indication of the check in interaction and/or displays a new visual indication of the check in interaction to reflect the extension of the check in interaction. In some embodiments, if no input is detected for the selectable option within a threshold time (e.g., 5 mins, 15 mins, 30 mins), the status of the check in interaction is updated to a delayed status, as described above. Alternatively, in some embodiments, if no input is detected for the selectable option within a threshold time (e.g., 5 mins, 15 mins, 30 mins), the check in interaction is terminated and the first indication of termination of the check in interaction is transmitted to the second electronic device. Providing an option to extend the check in interaction reduces the resources needed for the check in interaction by decreasing erroneous inputs thereby reducing power usage and improves battery life of the electronic device.

In some embodiments, while the check in interaction is active, the first electronic device receives (748*a*), via the one or more input devices, a second input corresponding to a request to cancel the check in interaction, such as if there is a contact on user interface object 654*a* in FIG. 6I. The second input optionally has one or more characteristics of the input described above. In some embodiments, the second input is directed towards a selectable option selectable to cancel the check in interaction (e.g., from the check in settings user interface). In some embodiments, the selectable option is located in the expanded first user interface, as discussed above.

In some embodiments, in response to receiving the second input, the first electronic device displays (748*b*), via the display generation component a first selectable option that is selectable to cancel the check in interaction and initiate transmission of a third indication of a cancellation of the check in interaction to the second user account (748*c*), such as if the first electronic device displays a user interface object that is selectable to initiate the transmission of the third indication of the cancellation of the check in interaction to the second user account after the selection of user interface object 654*a* in FIG. 6I. In some embodiments, the second electronic device displays a visual indication of the cancellation of the check in interaction in a messaging user interface with messaging activity between the first user account and the second user account. In some embodiments, the second electronic device displays a visual indication of the cancellation of the check in interaction in a lock screen user interface. In some embodiments, the visual indication of the cancellation of the check in interaction is also displayed in a messaging user interface (e.g., replacing the visual indication of the initiation of the check in interaction with the visual indication of the cancellation of the check in interaction).

In some embodiments, while the check in interaction is active, in response to receiving the second input corresponding to the request to cancel the check in interaction, such as a selection input with a contact on object 654*a* in FIG. 6I, the first electronic device displays a second selectable option that is selectable to cancel the check in interaction without initiating the transmission of the third indication of the cancellation of the check in interaction to the second user account (748*d*), such as if the first electronic device displays a user interface object that is selectable to not initiate the transmission of the third indication of the cancellation of the check in interaction to the second user account after the selection of user interface object 654*a* in FIG. 6I. In some embodiments, a user of the first electronic device chooses to not notify a user of the second electronic device of the cancellation of the check in interaction. In some embodiments, the second electronic device does not display a visual indication of the cancellation of the check in interaction in the messaging user interface and/or the lock screen user interface. In some embodiments, as a result of the cancellation of the check in interaction, the first electronic device discontinues location sharing of a current location with the second electronic device. Providing an option to initiate the transmission of the third indication of the cancellation while canceling the check in interaction improves privacy and/or security for the first electronic device.

In some embodiments, while the check in interaction is active, the first electronic device detects (750*a*) that the one or more criteria are satisfied (e.g., the first termination condition), such as if first electronic device 500*a* detects that it is at the destination location described in FIG. 6D.

In some embodiments, in response to detecting that the one or more criteria are satisfied, the first electronic device terminates (750*b*) the check in interaction and initiating a process to transmit, to the second user account, the first indication of the termination of the check in interaction, such as shown by static text 628, in FIG. 6N. In some embodiments, terminating the check in interaction includes terminating location sharing of the current location of the first electronic device with the second electronic device. In some embodiments, the first electronic device displays a visual indication of the termination of the check in interaction in response to detecting that the one or more criteria are satisfied. The visual indication optionally has one or more characteristics of the visual indication discussed above. In some embodiments, the first visual indication of the check in interaction, discussed above, ceases to be displayed in response to the termination of the check in interaction. In some embodiments, a visual indication of termination is displayed in the lock screen user interface in response to terminating the check in interaction. Terminating the check in interaction in response to detecting that the one or more criteria are satisfied without user input decreases erroneous inputs on the electronic device and reduces computing resources needed for detecting manual inputs to terminate the check in interaction.

In some embodiments, while the check in interaction is active, in accordance with a determination that satisfaction of the one or more criteria will not be determinable (e.g., the first electronic device will not have an internet connection, such as in airplane mode or in a tunnel), the first electronic device displays (752*a*), via the display generation component, a first selectable option that is selectable to cancel the check in interaction (752*b*), such as user interface object 678*a* in FIG. 6M (e.g., as described above). In some embodiments, the determination that satisfaction of the one or more criteria will not be determinable occurs when the first electronic device is moving towards an area with little to no cell coverage and/or the first electronic device receives an input to turn off internet access.

In some embodiments, while the check in interaction is active, in accordance with a determination that satisfaction of the one or more criteria will not be determinable (e.g., the first electronic device will not have an internet connection, such as in airplane mode or in a tunnel), the first electronic device, such as device 500*a* shown in FIG. 6M, displays (752*c*) a second selectable option that is selectable to transmit a message to the second user account, such as user interface object 678*b* in FIG. 6M. In some embodiments, the message transmitted to the second user account is transmitted before the first electronic device goes into airplane mode and/or loses internet connection. For example, the first selectable option and the second selectable option are displayed before the first electronic device is in a location without internet connection. In some embodiments, the message is viewable in a messaging user interface that includes messaging activity between the first user account and the second user account. In some embodiments, the message is predetermined by the first electronic device. The message is optionally editable by a user of the first electronic device. Providing an option to cancel the check in interaction or transmit a message to the second user account in response to the determination that satisfaction of the one or more criteria will not be determinable reduces the likelihood that the check in interaction will be erroneously determined to be delayed and/or avoids erroneous transmissions of completion of the check in interaction (e.g., in the case of a time-based check in).

In some embodiments, while the check in interaction is active, in accordance with a determination that an emergency is detected, the first electronic device updates (754) the check in interaction to indicate that the emergency has been detected, such as with user interface object 656 in FIG. 6J (e.g., initiating a process to transmit a third indication of the emergency to the second user account). In some embodiments, the first electronic device receives an input corresponding to a request to indicate that an emergency has occurred. In some embodiments, the emergency is an implied emergency determined by sensors in the first electronic device. For example, a sudden change in acceleration is detected by the accelerometer in the first electronic device or an earthquake (or other natural disaster) is reported at the current location of the first electronic device. In some embodiments, a user of the first electronic device cancels the emergency using a selectable option, and the check in interaction does not update to indicate that the emergency has been detected or the update to the check in interaction is reverted. In some embodiments, in response to the cancellation of the emergency, the third indication of the emergency is not transmitted to the second user account or a fourth indication is transmitted to the second user account and/or the second electronic device that indicates that the emergency did not occur. In some embodiments, the third indication of the emergency includes an indication of the type of emergency (e.g., car accident, fall, earthquake, or other natural disasters). Updating the check in interaction to indicate that an emergency has been detected in response to a changed status provides feedback about the check in interaction, thereby reducing the number of inputs needed to provide such additional information relating to the check in interaction.

In some embodiments, while the check in interaction is active, in response to detecting that a status of the check in interaction has changed (e.g., the status of the check in has one or more characteristics of the status of the check in as described above) and in accordance with a determination that the first electronic device is in communication with one or more output devices, such as device 500*c* as shown in FIG. 6O (e.g., a second display generation component, a vehicle infotainment device, or speaker), the first electronic device displays (755*a*), via the one or more output devices, a third user interface (e.g., user interface 682 in FIG. 6O) with a visual indication of the changed status of the check in interaction, such as indication 688 shown in FIG. 6O. In some embodiments, the third user interface includes user interface elements from different applications. For example, the third user interface includes user interface elements of a map application, a content application, a weather application, or other applications. In some embodiments, the third user interface is displayed with one or more output devices which receive data about the user interface elements from the first electronic device (e.g., using a wired or wireless connection). In some embodiments, the visual indication of the changed status of the check in interaction is overlayed over the user interface elements. In some embodiments, the visual indication includes a textual and/or visual description of the status of the check in interaction. In some embodiments, the visual indication is displayed in accordance with a determination that satisfaction of the one or more criteria is delayed, described in greater detail above. In some embodiments, the visual indication in selectable to display selectable options to dismiss the visual indication and/or extend the check in interaction. Extending the check in interaction optionally includes extending by a set amount of time (e.g., 15 min, 30 min, 45 min, 1 hour), as described above. In some embodiments, selecting the visual indication further includes presenting the changed status using audio from the one or more output devices.

In some embodiments, the one or more output devices are configured to present content, different from content presented on the first electronic device (755*b*), such as content shown in user interface elements 684*a* through 684*c* in FIG. 6O. In some embodiments, the content presented via the one or more output devices is presented for display on a touch screen of a second display generation component of a vehicle to which the first electronic device is connected (e.g., via a wired or wireless connection). For example, the first electronic device displays a first portion of the user interface of the mapping application and the second display generation component (e.g., a touch screen) of the vehicle displays a second portion of the user interface of the mapping application simultaneously/concurrently. In some embodiments, the first electronic device can display content and user interfaces of applications different than the content and user interface elements of applications displayed on the one or more output devices. For example, the first electronic device optionally displays a lock screen user interface, described with greater detail above, while the one or more output devices displays the third user interface with user interface elements from a content application (music user interface), and a map application (map user interface). Displaying a visual indication of the change in status in response on one or more output devices to receiving the third indication of change in status reduces the number of inputs needed to retrieve information about the check in interaction.

In some embodiments, while the check in interaction is active, in accordance with a determination that satisfaction of the one or more criteria will be delayed and in accordance with a determination that the first electronic device is in communication with one or more output devices, the first electronic device displays (756), via the one or more output devices, a selectable option that is selectable to extend the check in interaction, such as second selectable option 694*b* shown in FIG. 6P. In some embodiments, the selectable option that is selectable to extend the check in interaction has one or more characteristics of the selectable option to extend the check in interaction as described above. In some embodiments, the selectable option is displayed in response to selecting the visual indication of the changed status, as described above. Providing an option to extend the check in interaction reduces the resources needed for the check in interaction by decreasing erroneous inputs thereby reducing power usage and improves battery life of the electronic device.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7J. For example, the operation of the electronic device to display and transmit a communication described above with reference to method 700 optionally has one or more of the characteristics of the presentation of a communication feature with reference to other methods described herein (e.g., method 900). Additionally, the check in interaction described with reference to method 700 optionally has one or more characteristics of the check in interaction described with reference to method 900. For brevity, these details are not repeated here.

The operations in the information processing methods described above are, optionally, implemented by running one or more functional modules in an information processing apparatus such as general purpose processors (e.g., a as described with respect to FIG. 1A-1B, 3, 5A-5J) or application specific chips. Further, the operations described above with reference to FIGS. 7A-7J are, optionally, implemented by components depicted in FIGS. 1A-1B. For example, displaying operation 702*a*, receiving operation 702*b*, and initiating operation 702*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying a Communication Feature

Users interact with electronic devices in many different manners. In some embodiments, an electronic device displays a communication feature in a user interface in response to receiving an indication of a communication, such as receiving an indication of a check in interaction. The embodiments described below provide ways in which an electronic device facilitates interaction with the communication feature. Displaying the communication feature provides quick and efficient access to relevant content regarding a second user account and/or a check in communication without the need for additional inputs and thereby reduces erroneous inputs to the electronic device. It is understood that people use devices. When a person uses a device, that person is optionally referred to as a user of the device.

FIGS. 8A-8J illustrate various ways an electronic device displays a communication feature in accordance with some embodiments of the disclosure. The embodiments in these figures are used to illustrate the processes described below, including the processes described with reference to FIG. 9.

Figures 8A, 8B, 8C:
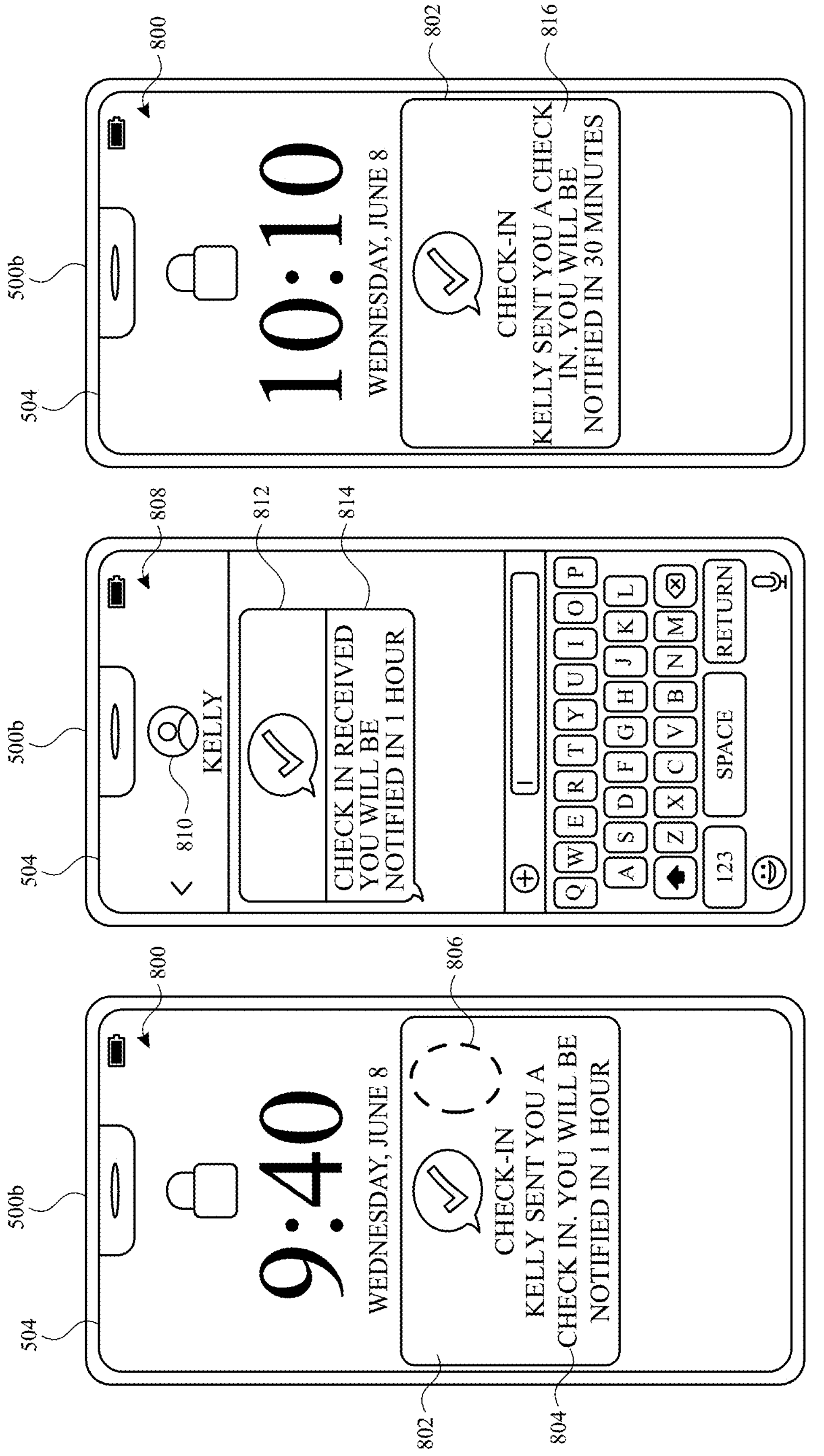
FIGS. 8A-8J illustrate examples of an electronic device displaying a check in interaction communication feature in accordance with some embodiments of the disclosure.

FIG. 8A illustrates an exemplary device 500*b* that includes a touch screen 504. In FIG. 8A, the electronic device 500*b* is presenting a lock screen user interface 800 that includes a user interface object 802 that represents a check in interaction of which device 500*b* is a part of. As discussed in FIGS. 6A-N and in method 700, a user of device 500*a* transmits an indication of a check in interaction to device 500*b*. User interface object 802 is a visual indication of the indication of such a check in interaction between Jill (user of device 500*b*) and Kelly (user of device 500*a*). In some embodiments, user interface object 802 includes text 804 ("Kelly sent you a check in. You'll be notified in 1 hour") indicating the sender of the check in interaction (e.g., Kelly) and an estimated time of completion of the check in interaction (e.g., 1 hour). In some embodiments, text 804 is displayed during a timer-based check in interaction. In some embodiments, during a location-based check in interaction, text 804 includes general information about the destination location (e.g., home, work, gym, Palo Alto, or Mom's house) of device 500*a* rather than an exact address, and an estimated time of completion of the check in interaction, as discussed in method 900. Additional information about how the check in interaction is initiated with device 500*b* using device 500*a* is provided in method 700 and in FIGS. 6A-6P.

In response to receiving an input with contact 806 on the user interface object 802, as shown in FIG. 8A, device 500*b* displays a messaging user interface 808 including a messaging conversation between a contact Kelly (the user associated with device 500*a*) and Jill (the user associated with device 500*b*), as shown in FIG. 8B. In some embodiments, device 500*b* displays the messaging conversation between Kelly and Jill because Kelly's device (device 500*a*) initiated the check in interaction. The contact is indicated by the representation 810 of Kelly. In some embodiments, the messaging user interface 808 includes a user interface object 812 of a message added to the messaging conversation from the device associated with Kelly as a result of device 500*a* initiating a check in interaction with device 500*b*. In some embodiments, user interface object 812 is shown following the messages shown in FIG. 6A. In some embodiments, the user interface object 812 includes text 814 similar to the text 804 displayed on the lock screen user interface 800. In some embodiments, text 814 indicates the sender of the check in interaction (e.g., Kelly) and an estimated time of completion of the check in interaction (e.g., 1 hour).

FIG. 8C illustrates the lock screen user interface 800 with the user interface object 802 including updated text 816 in response to time passing since the check in interaction was initiated. In some embodiments, the estimated time of completion text in user interface object 802 updates as time passes. For example, at 9:40 am, device 500*a* initiates a check in interaction with device 500*b* and user interface object 802 is displayed with an estimated time of completion of 1 hour, such as shown in FIG. 8A. At 10:10 am, the user interface object 802 is displayed with an estimated time of completion of 30 minutes, as 30 minutes has elapsed since the check in interaction was initiated, as shown in FIG. 8C. In some embodiments, similar updates to the estimated time of completion are shown in user interface object 812 in the messaging user interface 808.

Figure 8F:
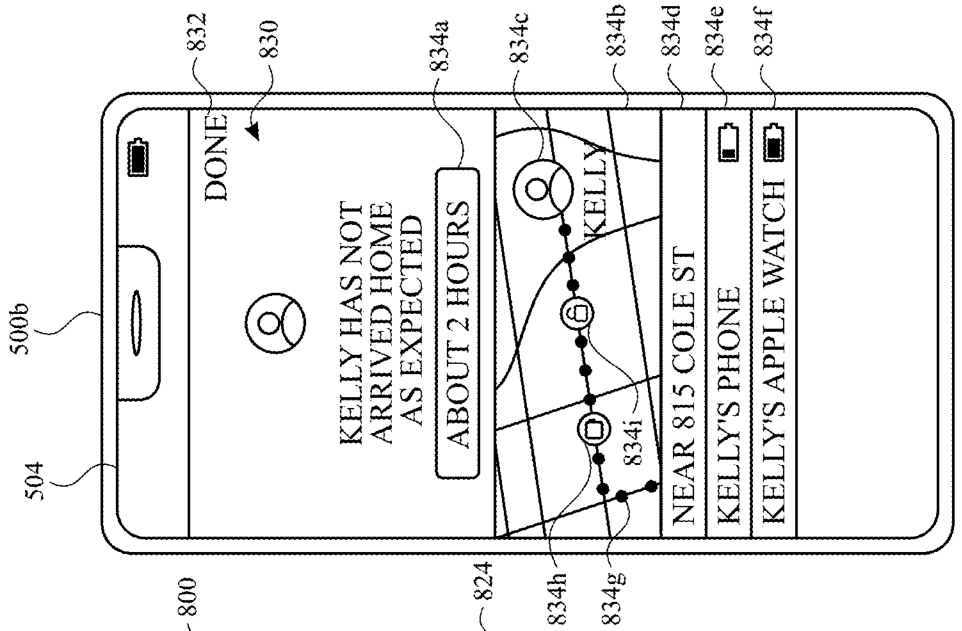
Figure 8E:
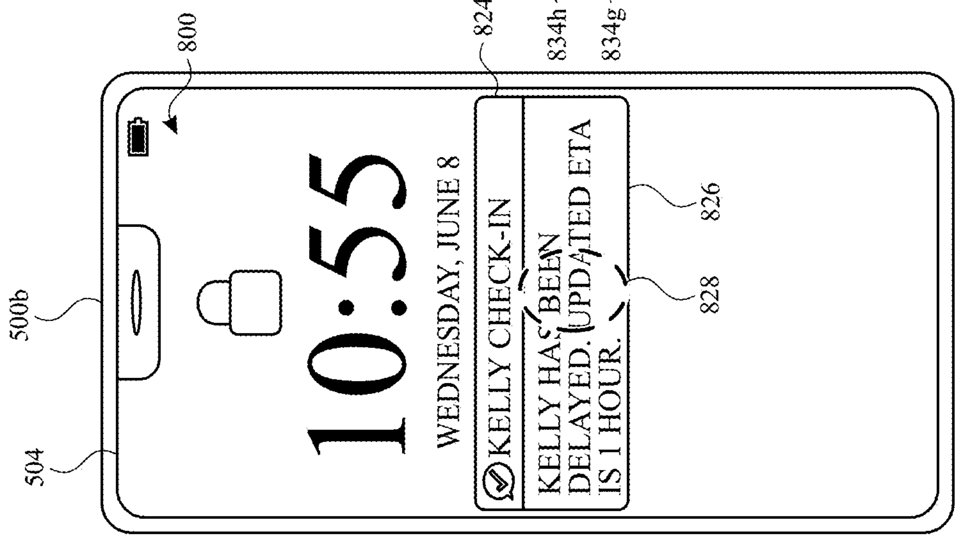
Figure 8D:
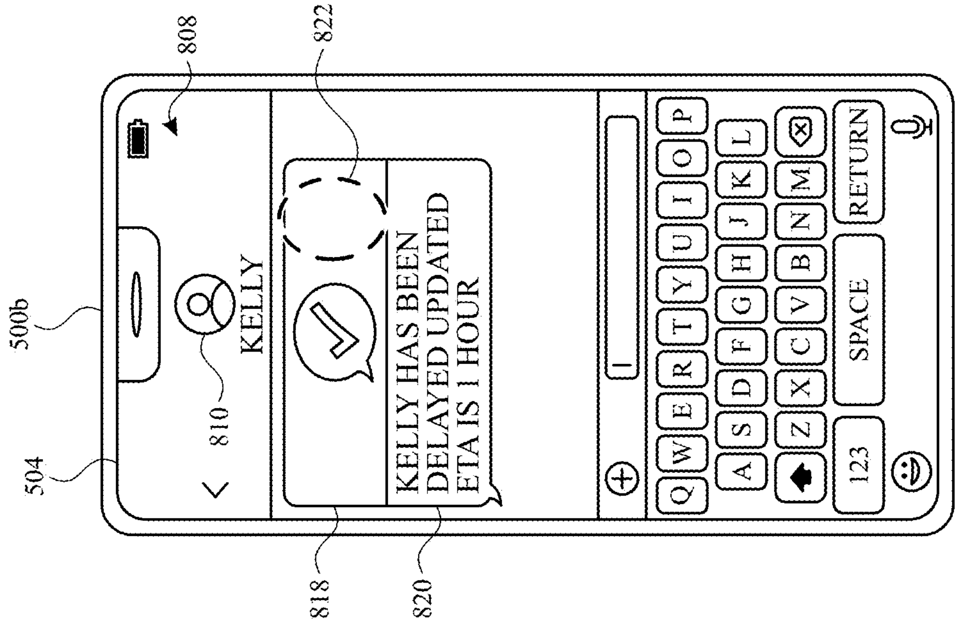

FIG. 8D illustrates the messaging user interface 808 with user interface object 818. In some embodiments, in response to what is illustrated in FIG. 6F wherein an input is received by device 500*a* to extend the check in interaction by an hour, device 500*b* displays user interface object 818 in place of user interface object 812 in the messaging user interface 808. For example, object 812 is no longer displayed and object 818 is displayed instead. In some embodiments, user interface object 818 includes text 820 that indicates that device 500*a* will have a delayed arrival time to a destination location. In some embodiments, and as shown in FIG. 8D, text 820 includes an updated estimated time of arrival of device 500*a*. In some embodiments, in the case of a timer-based check in, text 820 indicates that device 500*a* extended the timer by a given time (e.g., 1 hour). In some embodiments, text 820 indicates other status updates, with reference to method 700. For example, if emergency services has been called such as in FIG. 6J, text 820 updates to indicate that emergency services has been called.

FIG. 8E illustrates a user interface object 824 with text 826 displayed on the lock screen user interface 800 by device 500*b*. In some embodiments, user interface object 824 replaces user interface object 802 on the lock screen user interface 800 similar to how object 818 replaces object 812 in the messaging user interface 808. In some embodiments, user interface object 824 illustrates that there has been a change in status of the check in interaction (e.g., device 500*a* has been delayed). In some embodiments, user interface object 824 includes text 826 describing the change in status and/or an updated estimated time of completion of the check in interaction. In some embodiments, text 826 describes an updated arrival time when the check in interaction is a location-based check in interaction. In some embodiments, in response to an emergency status update, such as when device 500*a* triggers emergency services being called in FIG. 6J, text 826 indicates that emergency services has been called.

FIG. 8D includes an input with contact 822 on user interface object 818 and FIG. 8E includes an input with contact 828 on user interface object 824. Both inputs optionally result in device 500*b* displaying an expanded check in user interface 830, shown in FIG. 8F. In some embodiments, the expanded check in user interface 830 includes selectable option 832 that when selected closes the user interface 830 and redisplays the previously displayed user interface (e.g., the lock screen user interface 800 or the messaging user interface 808). In some embodiments, the expanded check in user interface 830 includes a plurality of user interface objects 834*a-i* analogous to the user interface objects 616*a-i* shown in FIG. 6B. In some embodiments, object 834*a* indicates the expected time of completion of the check in interaction. In some embodiments, object 834*b* is a visual representation of a map. In some embodiments, object 834*c* is a visual representation of the current location of device 500*a* located on object 834*b*. In some embodiments, object 834*g* indicates a route traveled by device 500*a* during the check in interaction up to the present time. In some embodiments, object 834*h* indicates a last location of activity from a different device associated with the user of device 500*a*, such the location at which a smart watch associated with the user of device 500*a* was last removed from the wrist of the user. In some embodiments, other activities may include the last login to a tablet associated with the user and/or the last upload of data from a smart watch of the user to a phone of the user. In some embodiments, object 834*i* indicates the last location of activity from device 500*a* (e.g., a device unlock, a physical movement, and/or a usage of an application). In some embodiments, object 834*d* indicates the address or approximate address of the current location of device 500*a*. In some embodiments, object 834*e* indicates information about the device that transmitted the check in interaction (e.g., device 500*a*), such as battery level, and/or network connectivity, as discussed with reference to method 900. In some embodiments, object 834*f* indicates information (e.g., battery level and/or internet connectivity) about other devices associated with the user of device 500*a* (e.g., a shared device account), such as a smart watch. In some embodiments, the user interface 830 is not limited to listing two devices associated with the user of device 500*a*. For example, there are optionally 1, 5, or 10 devices listed.

In some embodiments, an input selecting user interface object 812 in FIG. 8B also results in displaying the expanded check in user interface 830, as shown in FIG. 8F. However, in this embodiment, the expanded check in user interface 830 optionally includes text that states "You will be notified when Kelly arrives home" rather than the text that indicates a delay ("Kelly has not arrived home as expected"). Additionally, in some embodiments, options 834*b-d* are not displayed unless option 616*i* of FIG. 6C is selected. Additionally, in some embodiments, options 834*e-f* are displayed only when the status of the check in interaction has changed (e.g., delayed status and/or emergency status).

Figure 8H:
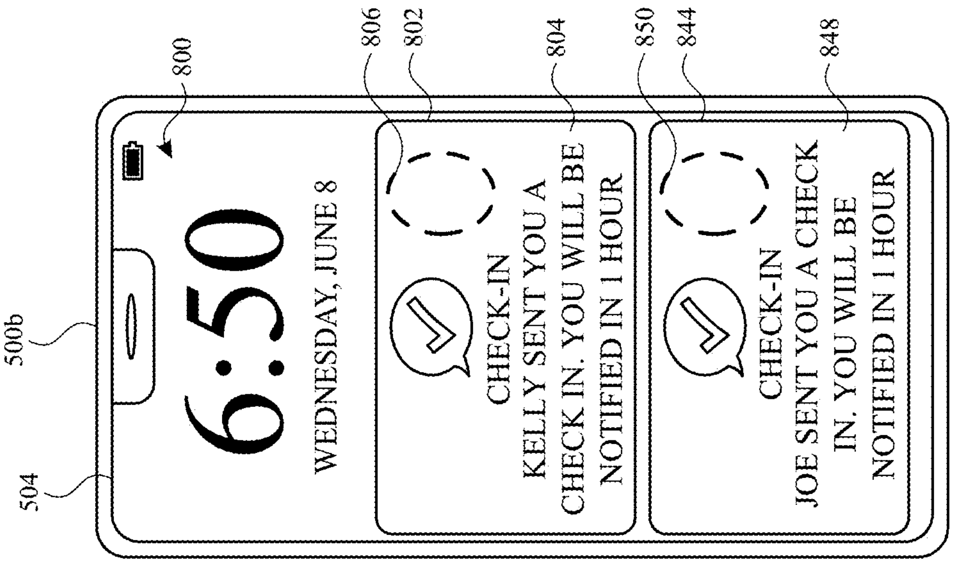
Figure 8G:
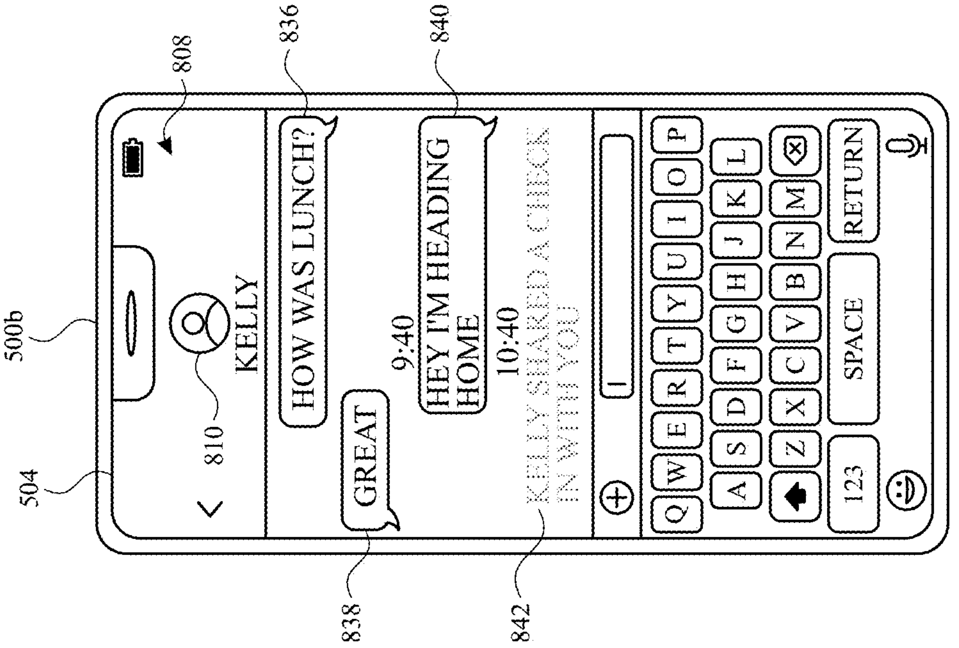

FIG. 8G illustrates an embodiment of a completed check in interaction. FIG. 8G is analogous to FIG. 6N and shows the messaging conversation in the messaging user interface 808 from the perspective of device 500*b* rather than the perspective of device 500*a*. The messaging user interface 808 in FIG. 8G includes a first user interface object 836 (or representation) of a first message that was added to the messaging conversation from a device associated with Jill (e.g., device 500*b*), a second user interface object 838 (or representation) of a second message that was added to the messaging conversation from a device associated with Kelly, and a third user interface object 840 (or representation) of a third message that was also added to the messaging conversation from the device associated with Jill. In some embodiments, the device 500*b* displays the first user interface object 836, in messaging user interface 808, in response to device 500*b* receiving an indication that the device associated with Jill has added the first message to the messaging conversation that included the text "How was lunch?". In some embodiments, the device 500*b* displays the second user interface object 838, in messaging user interface 808, in response to device 500*b* receiving an indication that the device associated with Kelly has added the second message that included the text "Great" to the messaging conversation. In some embodiments, the device 500*b* displays the third user interface object 840, in messaging user interface 808, in response to device 500*b* receiving an indication that the device associated with Kelly has added the third message to the messaging conversation that included the text "Hey, I'm heading home".

In some embodiments, the user interface object 818, shown in FIG. 8D and/or the user interface object 812, shown in FIG. 8B, are replaced with static text 842 at the end of the check in interaction, which includes the text "Kelly shared a check in with you", such as shown in FIG. 8G. In some embodiments, static text 842 indicates that a check in interaction has occurred and/or been initiated between the devices (e.g., device 500*a* and device 500*b*) of the messaging conversation. In some embodiments, the static text 842 has one or more characteristics of static text 680 of FIG. 6N. For example, the static text is not selectable to view additional information. At the end of the check in interaction, the current location of device 500*a* is optionally no longer shared with device 500*b*.

FIG. 8H is an illustration of device 500*b* with multiple active check in interactions with different devices/users (e.g., device 500*b* is a recipient of such multiple active check in interactions), as described with reference to method 900. In some embodiments, user interface objects such as object 818 are displayed, by device 500*b*, in respective messaging conversations with the respective sender. In some embodiments, while displaying object 802 including text 804 as described with reference to FIG. 8A, device 500*b* receives a second check in interaction from Joe. A user interface object 844 with text 848 describing the termination criteria and estimated time of completion for Joe's check in interaction is displayed on the lock screen user interface 800 by device 500*b*, along with Kelly's check in interaction, as described with reference to method 900. In some embodiments, device 500*b* receives a selection input from contact 806 on user interface object 802, as described in further detail in FIG. 8A. In response to the input, the device 500*b* displays a messaging user interface 808 including a messaging conversation between a contact, Kelly (the sender of the check in interaction), and a user of the electronic device 500*b*, Jill, as described in FIG. 8B. In some embodiments, device 500*b* receives a selection input from contact 850 on user interface object 844, similar to contact 806 as described in FIG. 8A. In response to the input, the device 500*b* displays a messaging user interface 808 including a messaging conversation between a contact, Joe (the sender of the check in interaction), and a user of the electronic device 500*b*, Jill, similar to as described in FIG. 8B between Jill and Kelly. In some embodiments, the objects 802 and 844 display live updates to the estimated time of completion as described in FIG. 8C and in method 900.

Figure 8I:
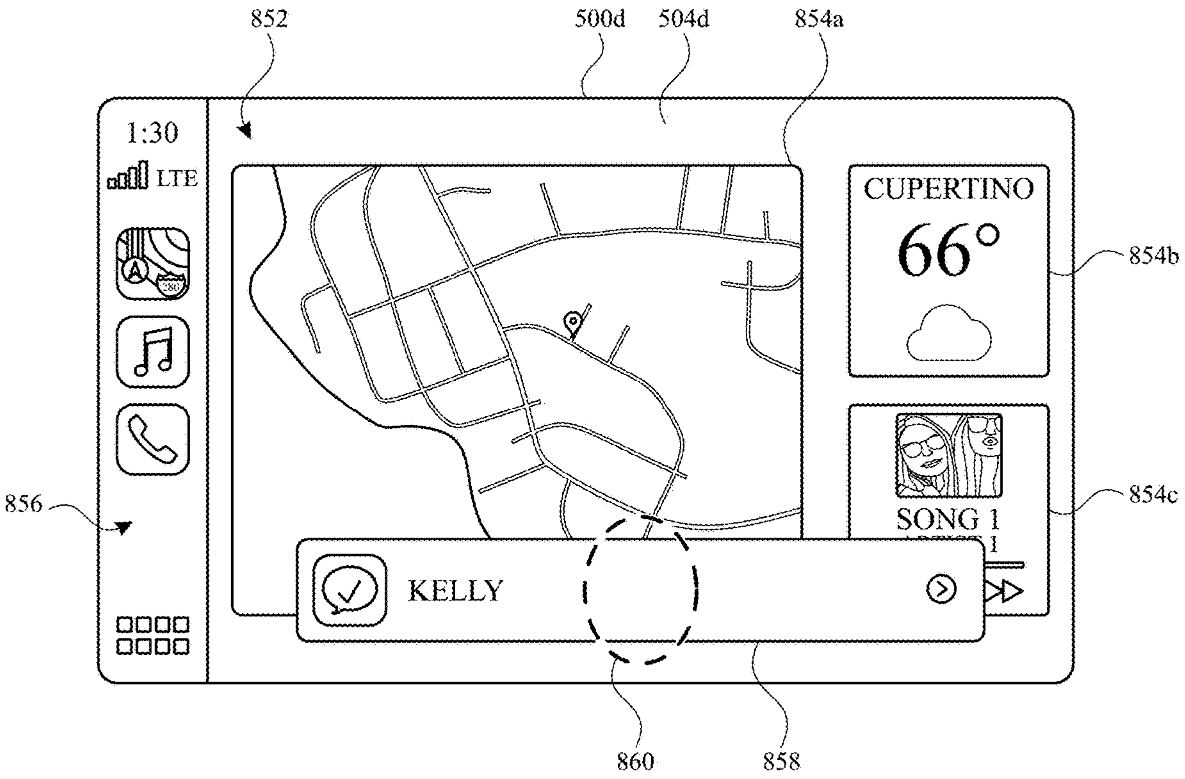

In some embodiments, the device 500*b* is in communication with a device 500*d*. Device 500*d* optionally includes a display generation component 504*d*, as shown in FIG. 8I. In some embodiments, device 500*d* and display generation component 504*d* have one or more characteristics of device 500*c* and display generation component 504*c*, respectively. In some embodiments, device 500*b* is connected to the device 500*d* wirelessly or with wires. For example, and as described in method 700 and method 900, the device 500*a* is connected to device 500*c* using Bluetooth, USB-C, USB-A, or other forms of connection. In some embodiments, the device 500*d* is a vehicle infotainment device. In some embodiments, the display generation component 504*c* is a hardware components (e.g., including electrical components) capable of receiving display data and displaying a user interface. In some embodiments, examples of the display generation component 504*c* include a touch screen display, a monitor, a television, a projector, an integrated, discrete, or external display device, or any other suitable display device that is in communication with device 500*c*. In some embodiments, the display generation component 504*c* includes one or more of the features described with reference to method 700 and method 900.

In some embodiments, device 500*b* transmits data relating to applications, user interfaces, and the check in interaction to be displayed on device 500*d*, as described in FIG. 6O and methods 700 and 900. As shown in FIG. 8I, the device 500*c* displays a user interface 852 corresponding to user interface 682 described in FIG. 6O. In some embodiments, user interface elements 854*a* through 854*c* corresponds to and have one or more characteristics of user interface elements 684*a* through 684*c* in FIG. 6O. In some embodiments, navigation bar 856 corresponds to and has one or more characteristics of navigation bar 686 described in FIG. 6O.

In some embodiments, in response to device 500*b* receiving an indication that check in status of the device 500*a* and/or the first user account is updated (e.g., delayed, terminated, or emergency detected), as described in FIGS. 8D and 8E and in method 900, the device 500*b* displays indication 858 overlaid on user interface 852, shown in FIG. 8I. In some embodiments, indication 858 is displayed over any user interface of any application on device 500*d*. In some embodiments, the indication 858 includes a description of the sender of the check in interaction ("Kelly"). In some embodiments, the indication 858 includes an icon indicating that it is an indication of the check in interaction, as shown in FIG. 8I. In some embodiments, the indication 858 includes an avatar representing the sender of the check in interaction (e.g., device 500*a* and/or first user account).

In some embodiments, device 500*d* detects a user input (e.g., contact 860 directed to indication 858 in FIG. 8I) corresponding to a request to expand the indication, shown in FIG. 8I. In response to the user input directed to select indication 858 in FIG. 8I, the device 500*d* displays an expanded indication 862, shown in FIG. 8J.

Figure 8J:
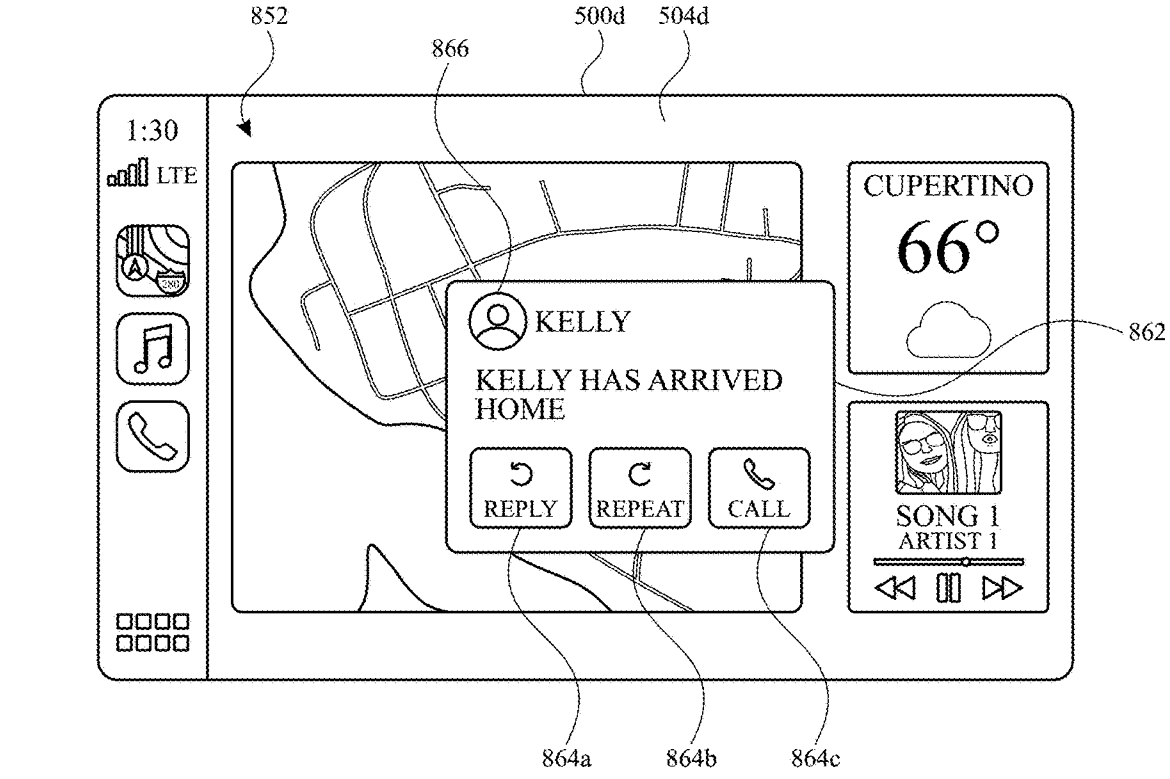
Figure 9A:
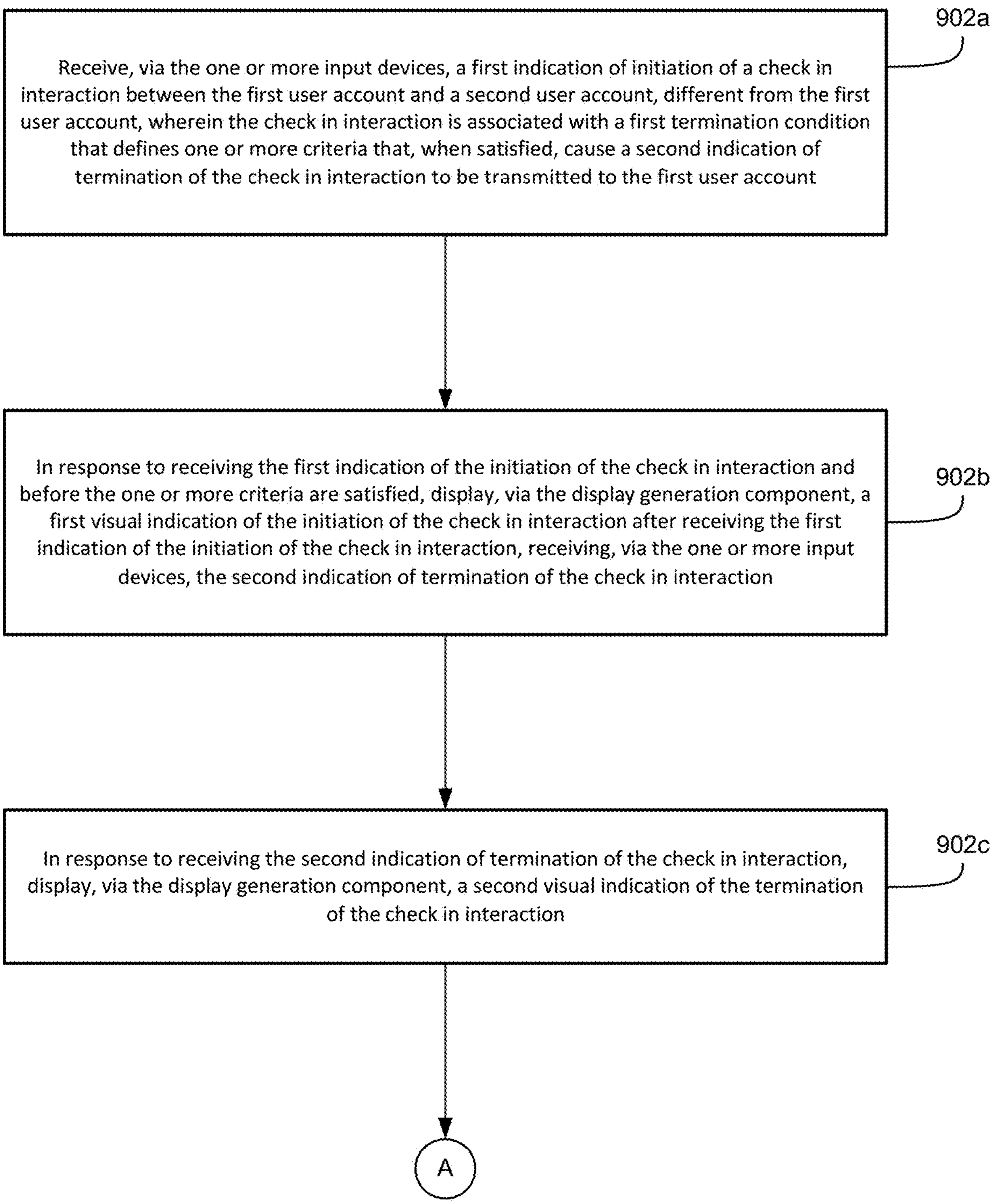
FIGS. 9A-9G is a flow diagram illustrating a method in which an electronic device displays a check in interaction communication feature in accordance with some embodiments of the disclosure.
Figure 9B:
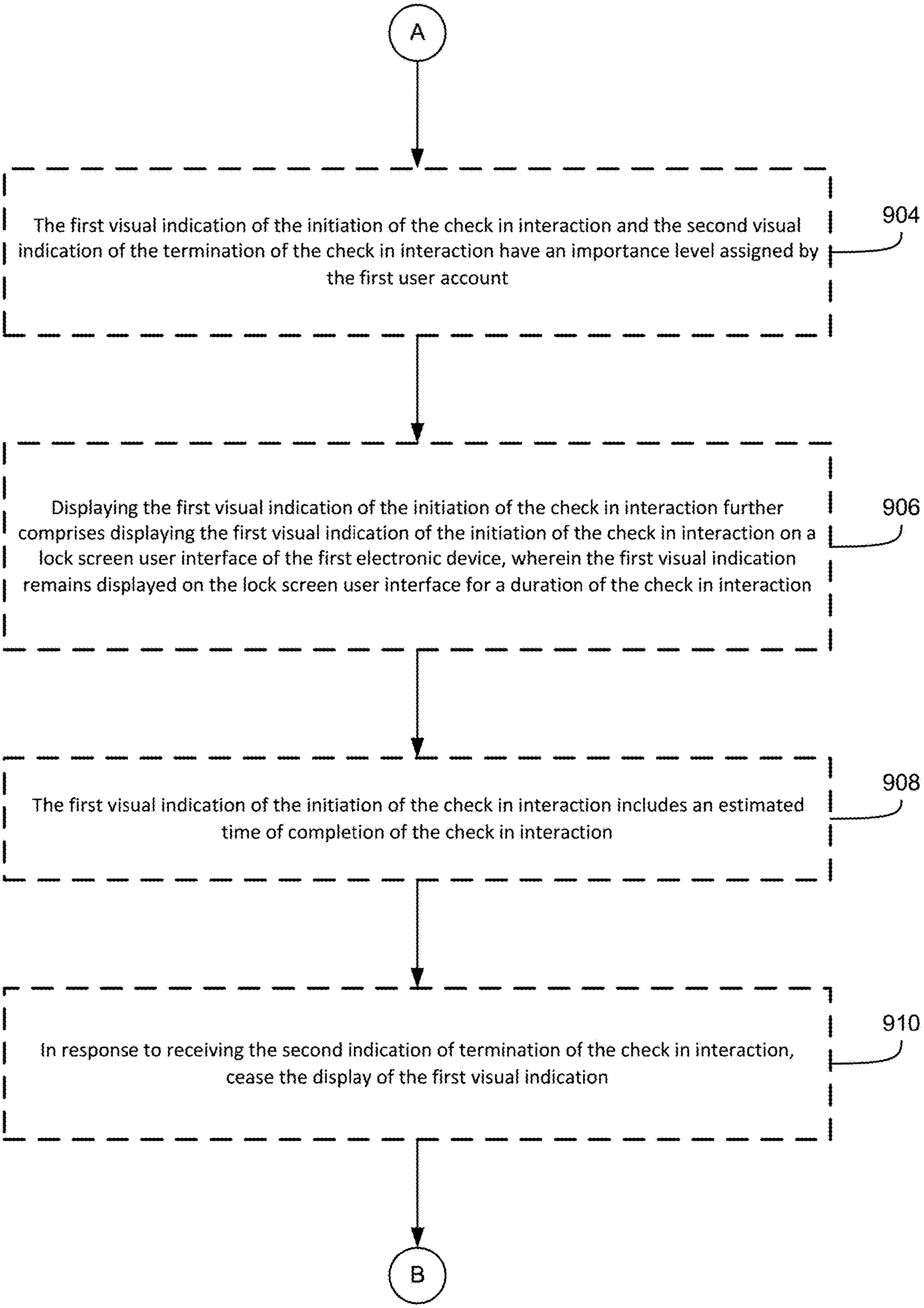
Figure 9C:
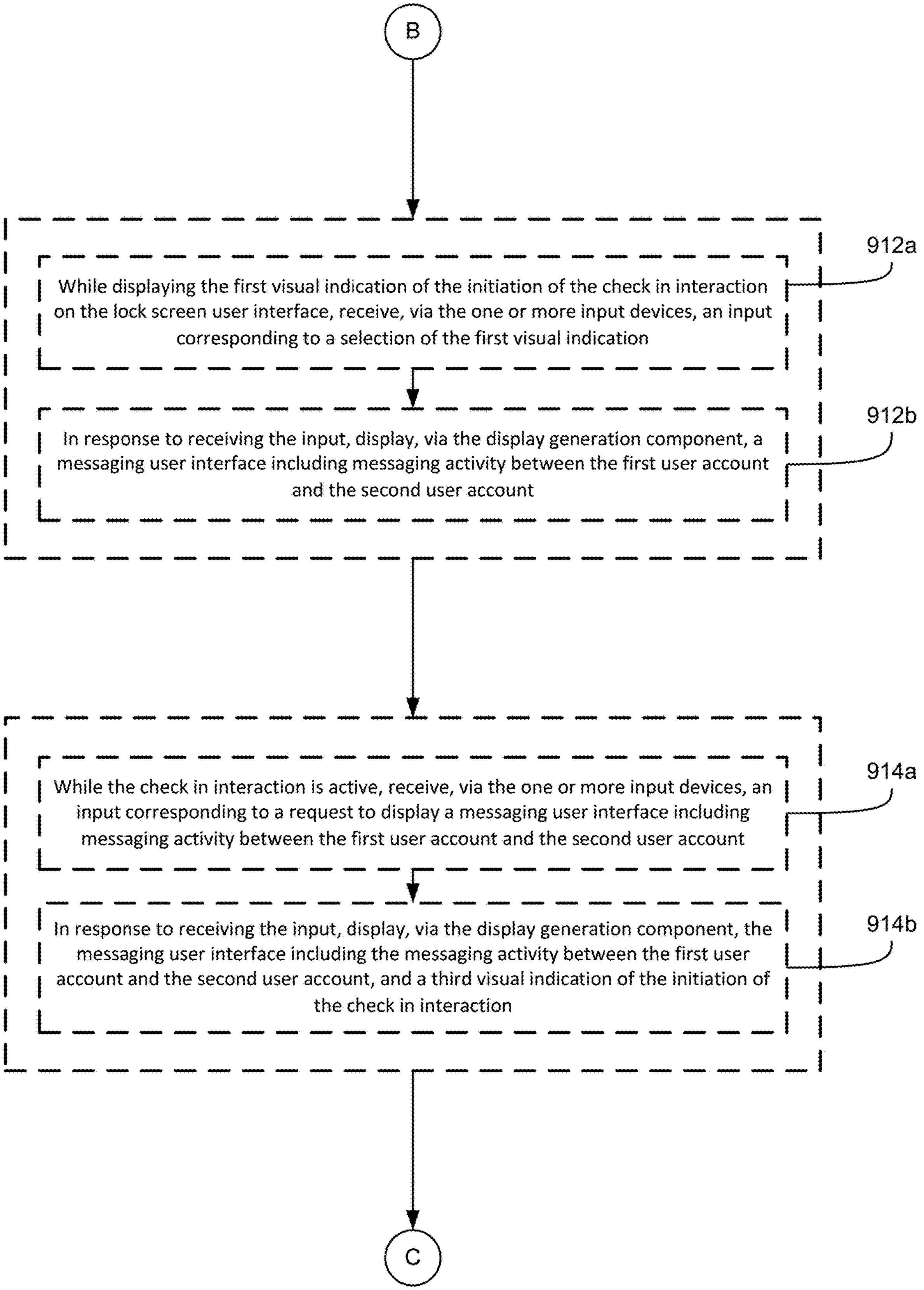
Figure 9D:
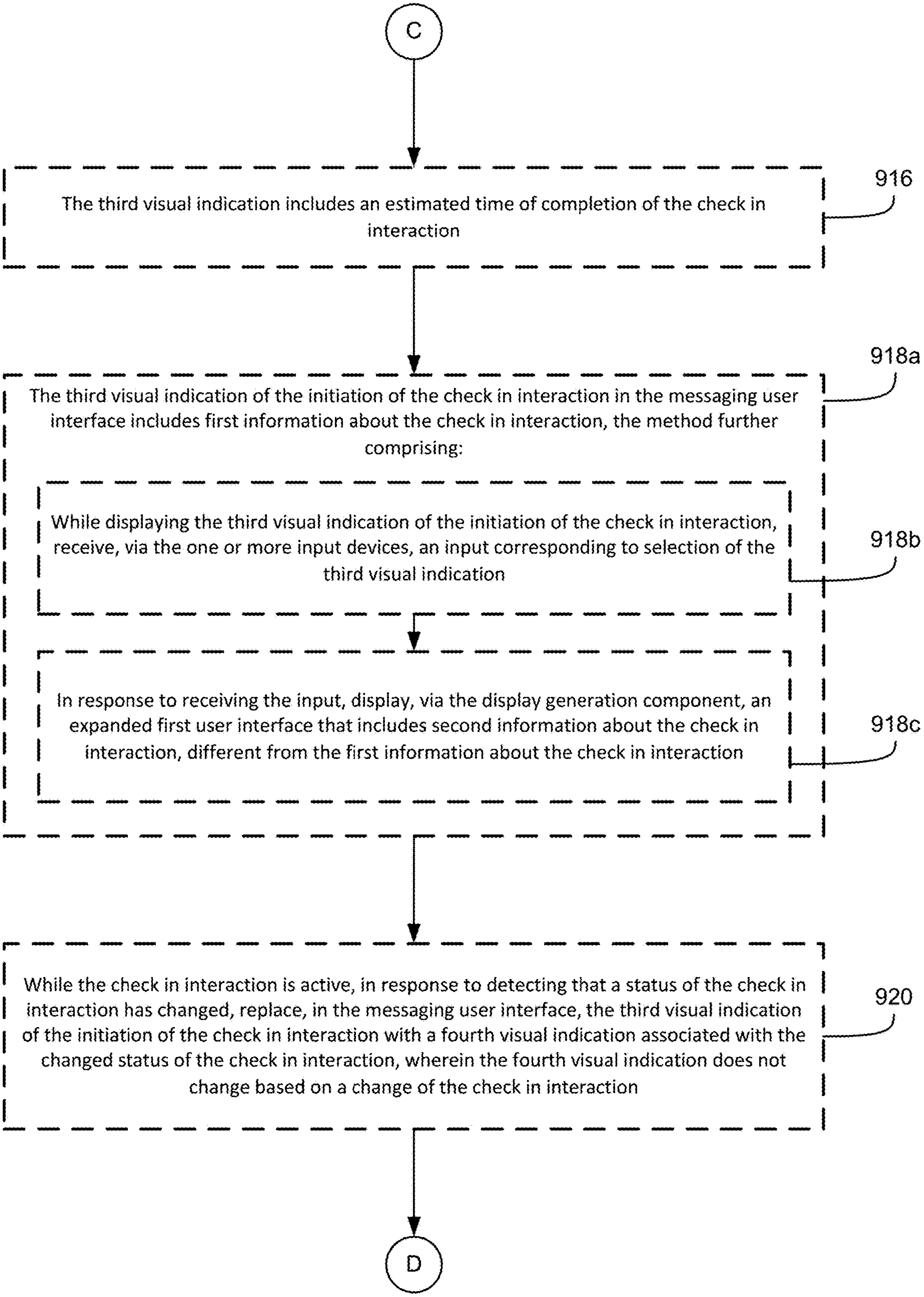
Figure 9E:
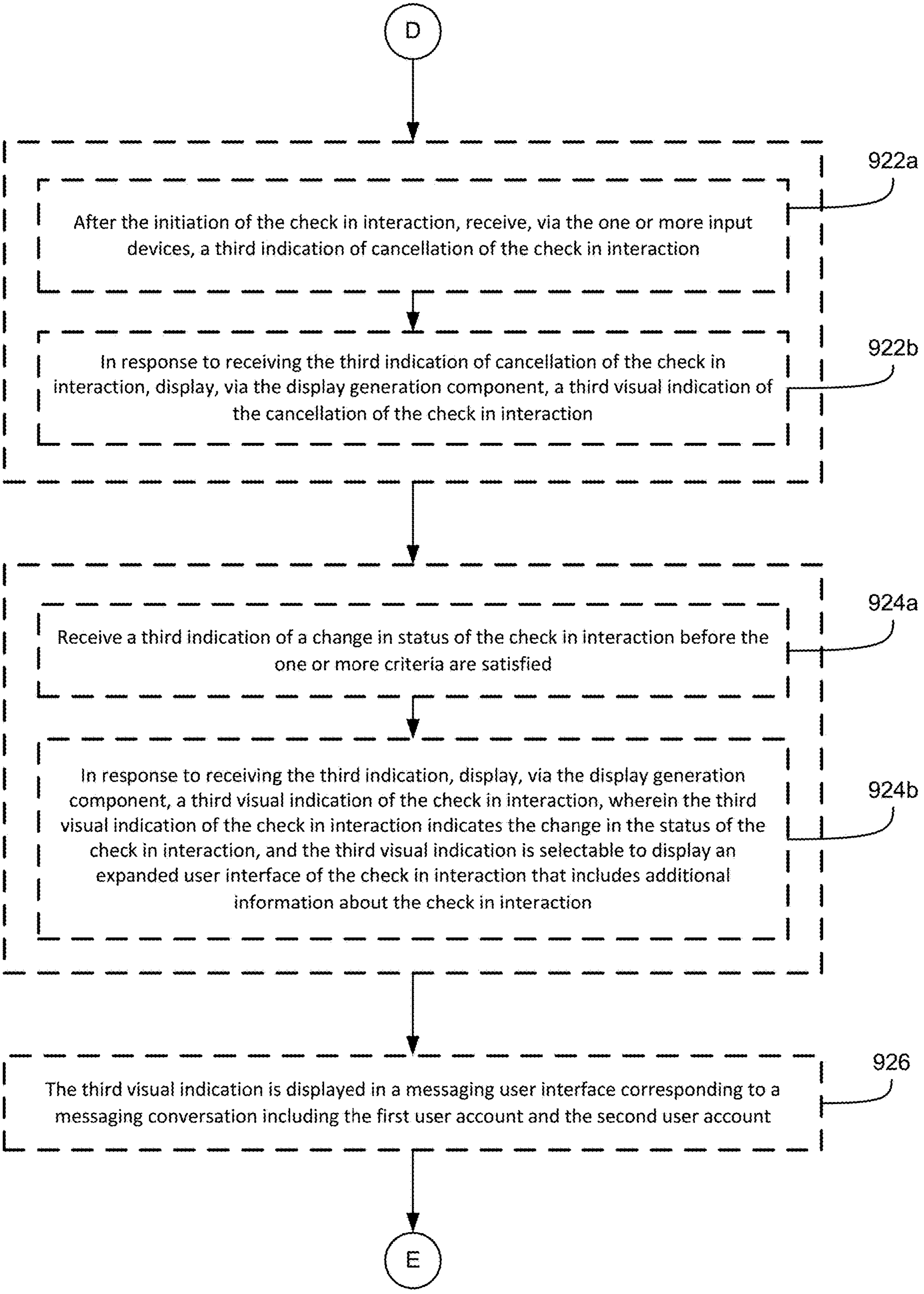
Figure 9F:
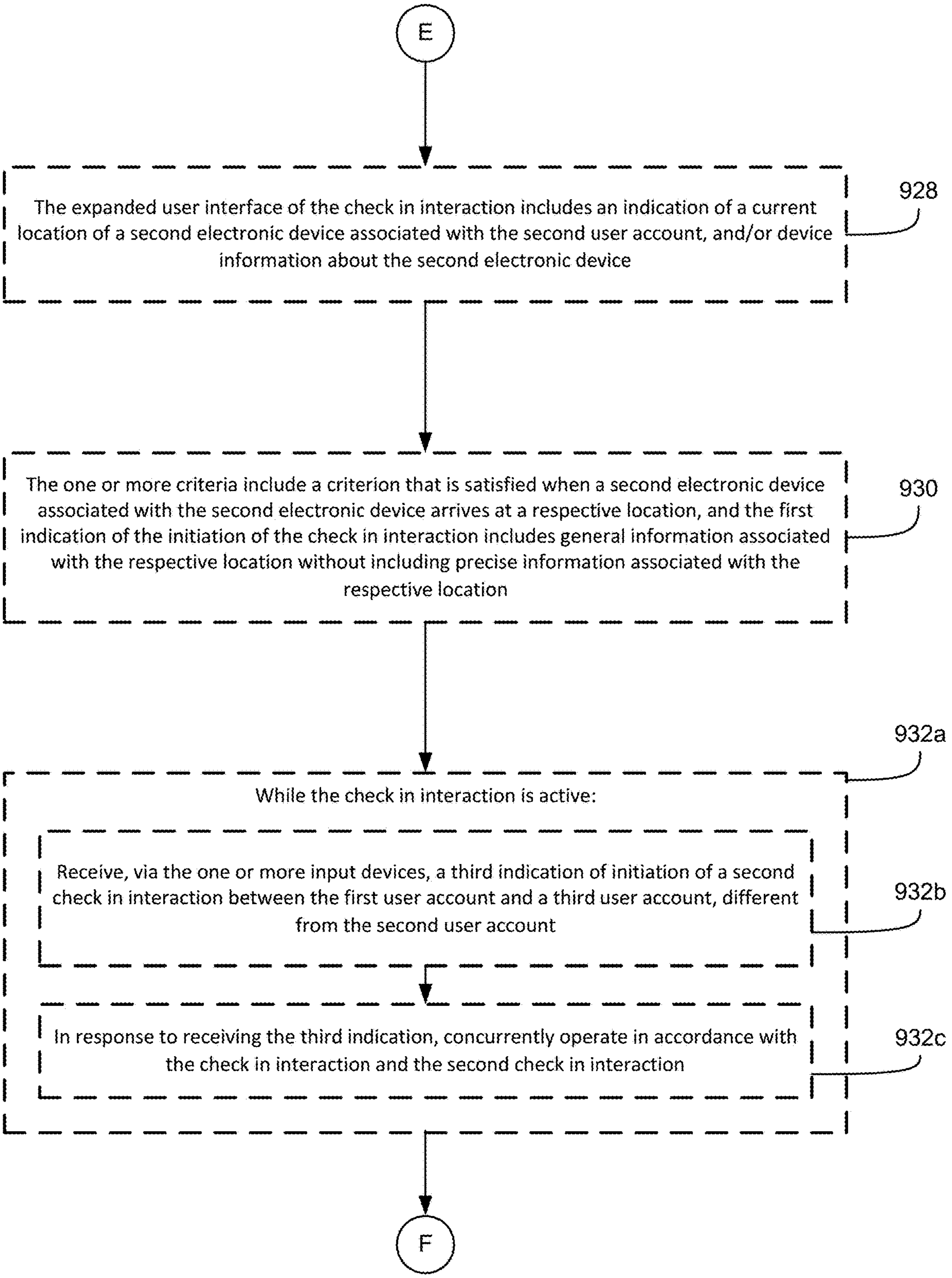
Figure 9G:
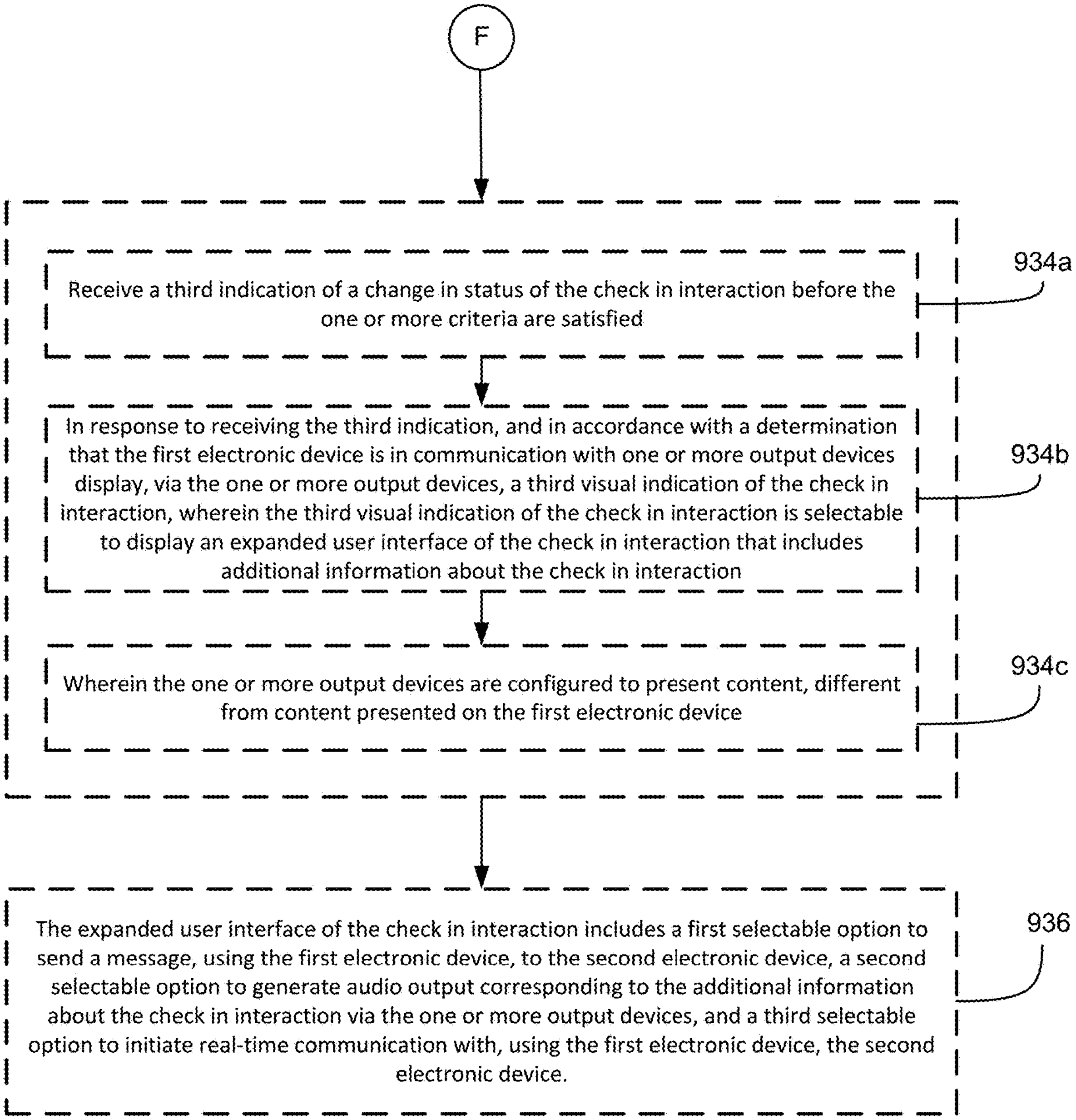

In some embodiments, the expanded indication 862, shown in FIG. 8J, provides more details about the update to the check in interaction. In some embodiments, the expanded indication 862 includes text indicating that the sender of the check in interaction has arrived at their destination ("Kelly has arrived home"). In some embodiments, the expanded indication 862 includes a representation 866 of the sender of the check in interaction (e.g., an avatar and/or text). In some embodiments, the text presented on the expanded indication 862 can also be presented by an audio output device (e.g., a speaker) on or connected to device 500*d*. In some embodiments, a voice assistant presents the text on the expanded indication 862. In some embodiments, while device 500*d* displays indication 858 and/or expanded indication 862, device 500*b* also displays user interface objects indicating an update in the status of the check in interaction on the lock screen user interface 800 and/or the messaging user interface 808, as described above. For example, if the sender of the check in interaction has been delayed, device 500*b* displays user interface object 824 on the lock screen user interface 800, shown in FIG. 8E, while device 500*d* displays indication 858 and/or expanded indication 862 indicating that the sender of the check in interaction has been delayed.

In some embodiments, expanded indication 862 also includes a plurality of selectable options 864*a* through 864*c*, shown in FIG. 8J. In some embodiments, in response to an input on selectable option 864*a*, device 500*d* initiates display of a user interface of the messaging application on device 500*d* and/or on device 500*b* (which is connected to device 500*d*) so that the user of device 500*b* and/or device 500*d* can send a message to the sender of the check in interaction. In some embodiments, the user of device 500*b* and/or device 500*d* can send a message using speech (e.g., a voice assistant) or text. In some embodiments, in response to an input on selectable option 864*b*, device 500*d* repeats the text displayed on expanded indication 862 using the audio output device (e.g., using a voice assistant). In some embodiments, in response to an input on selectable option 864*c*, device 500*d* initiates display of a user interface of a phone application on device 500*b* and/or device 500*d* to initiate a phone call with the sender of the check in interaction (e.g., device 500*a* and/or first user account).

FIGS. 9A-9G is a flow diagram illustrating a method in which an electronic device displays a check in interaction communication feature in accordance with some embodiments of the disclosure. The method 900 is optionally performed at first and/or electronic devices such as device 100, device 300, or device 500 as described above with reference to FIGS. 1A-1B, 2-3, 4A-4B and 5A-5C. Some operations in method 900 are, optionally combined and/or order of some operations is, optionally, changed.

As described below, the method 900 provides ways in which an electronic device presents a communication feature. Presenting the communication feature in response to receiving an indication of a communication allows for quick and efficient access to relevant content without the need for additional inputs thereby reducing erroneous inputs to the electronic device.

In some embodiments, method 900 is performed at a first electronic device in communication with a display generation component and one or more input devices, wherein the first electronic device (e.g., device 500*b* shown in FIG. 8A) is associated with a first user account (e.g., the first user account is associated with Jill, as described in FIG. 8B). In some embodiments, the first electronic device has one or more characteristics of the first electronic device described with reference to method 700. In some embodiments, the display generation component has one or more characteristics of the display generation component described with reference to method 700. In some embodiments, the first user account has one or more characteristics of the first user account described with reference to method 700. In some embodiments, the first user account is associated with a first user. The first electronic device optionally corresponds to the second electronic device in method 700. The first user account optionally corresponds to the second user account in method 700.

In some embodiments, the first electronic device receives (902*a*), via the one or more input devices, a first indication of initiation of a check in interaction between the first user account and a second user account, such as corresponding to user interface object 802 in FIG. 8A and/or user interface object 812 in FIG. 8B sent from Kelly to Jill, different from the first user account, wherein the check in interaction is associated with a first termination condition, such as shown in text 804 in FIG. 8A and/or text 814 in FIG. 8B (e.g., the second electronic device has arrived at a second location different than its original location (e.g., defined by the termination condition) or an input is received at the second electronic device when a preset timer expires (e.g., as defined by the termination condition)) that defines one or more criteria that, when satisfied, cause a second indication of termination of the check in interaction to be transmitted to the first user account, such as corresponding to the static text 842 in FIG. 8G (e.g., such as described with reference to method 700). The second electronic device optionally corresponds to the first electronic device in method 700. The second user account optionally corresponds to the first user account in method 700.

In some embodiments, in response to receiving the first indication of the initiation of the check in interaction and before the one or more criteria are satisfied, the first electronic device displays (902*b*), via the display generation component, a first visual indication of the initiation of the check in interaction, such as user interface object 802 in FIG. 8A and/or user interface object 812 in FIG. 8B (e.g., a notification on a lock screen of the first electronic device or other user interface of the first electronic device, optionally other than a messaging user interface and/or a message, from the second user account, in a messaging application of the first electronic device). In some embodiments, the second user account corresponds to the first user account described with reference to method 700. In some embodiments, the second user account is associated with a second user and a second electronic device. In some embodiments, the first user account and the second user account have previously interacted. For example, the second user account is saved as a first contact in the first electronic device, and/or vice versa. In some embodiments, the first visual indication of the initiation includes a first visual appearance. In some embodiments, the first visual appearance includes a plurality of text fields or other information, wherein the information may include text or other representation describing or identifying the user account transmitting the first indication of initiation and a termination condition, as described below. The first visual appearance optionally includes a check in icon and/or an icon or representation describing or identifying the second user account. In some embodiments, the first visual indication of the initiation is a user interface that includes a display of the termination condition and/or the one or more criteria. In some embodiments, the first visual indication of the initiation of the check in interaction indicates a user account transmitting the first indication of the initiation (e.g., the second user account) and/or a description of a location at which the second indication of termination is triggered. In some embodiments, the first visual indication of the initiation of the check in interaction includes a time at which a second indication of termination will be transmitted.

In some embodiments, after receiving the first indication of the initiation of the check in interaction, the first electronic device receives (902*c*), via the one or more input devices, the second indication of termination of the check in interaction, such an indication transmitted from a second electronic device (e.g., device 500*a* of FIG. 6A). (e.g., such as described in method 700). In some embodiments, the second indication of termination of the check in interaction is received by the first electronic device once the second electronic device satisfies a termination condition (e.g., arriving at the specified location). In some embodiments, the second indication of termination includes a reason for termination (e.g., a description of the first termination condition and/or an indication that the first termination condition has been satisfied).

In some embodiments, in response to receiving the second indication of termination of the check in interaction, the first electronic device displays, via the display generation component, a second visual indication of the termination of the check in interaction, such as static text 842 in FIG. 8G. In some embodiments, the second visual indication of termination of the check in interaction includes a second visual appearance, different from the first visual appearance. For example, the second visual appearance includes text or other information describing the second indication of termination and/or icons describing or identifying the second user account. In some embodiments, the second visual indication of termination of the check in interaction includes a display indicating that the termination condition and/or the one or more first criteria are satisfied. In some embodiments, the second visual indication of termination of the check in interaction is displayed on a lock screen of the first electronic device or other user interface of the first electronic device, optionally other than a messaging user interface and/or in the messaging application of the first electronic device. In some embodiments, a third visual indication of non-termination of the check in interaction is displayed if the one or more criteria are not met. For example, if the termination condition is not met (e.g., the second electronic device is has not arrived at the second location and/or an input is not detected at the second electronic device at the expiration of the preset timer, such as described with reference to method 700), the first electronic device receives a third indication of non-termination of the check in interaction from the second electronic device and/or second user account and/or server in communication with the first electronic device and/or the second electronic device. The third visual indication of non-termination of the check in interaction optionally includes one or more characteristics of the first visual indication and the second visual indication, as discussed above. For example, the third visual indication is displayed on the lock screen or other user interface of the first electronic device, optionally other than a messaging user interface or in the messaging application of the first electronic device. In some embodiments, the third visual indication or the second visual indication replaces the first visual indication in the user interface in which the first visual indication was displayed. Displaying an indication for a check in interaction from a second user account provides quick and efficient access to relevant content regarding the second user account and/or the check in without the need for additional inputs and thereby reduces erroneous inputs to the first electronic device.

In some embodiments, the first visual indication of the initiation of the check in interaction and the second visual indication of the termination of the check in interaction have an importance level (e.g., critical, normal, or low) assigned by the first user account (904), such as if user interface object 802 in FIG. 8A included a visual representation of a critical importance level (e.g., an exclamation point). The importance level optionally affects a visual appearance of the first visual indication and/or the second visual indication. For example, for a critical importance level, the visual appearance optionally includes bolded text, red coloring, and/or exclamation points. In some embodiments, the first visual indication and/or the second visual indication with a critical importance level have higher priority than visual indications with a lower priority level. For example, the first electronic device optionally displays the first visual indication and/or the second visual indication before and/or in place of other visual indications with lower importance levels. In some embodiments, a critical importance level visual indication bypasses settings set on the first electronic device to cease displaying visual indications (e.g., in do not disturb mode). Assigning importance levels to different visual indications allows computing resources to be allocated properly therefore decreasing improper usage of computing power and avoids user inputs needed to dismiss notifications that should not otherwise be displayed.

In some embodiments, displaying the first visual indication of the initiation of the check in interaction further comprises displaying the first visual indication of the initiation of the check in interaction on a lock screen user interface of the first electronic device (906), wherein the first visual indication remains displayed on the lock screen user interface for a duration of the check in interaction, such as user interface object 802 in FIG. 8A. In some embodiments, displaying the first visual indication of the initiation of the check in interaction on a lock screen user interface has one or more characteristics of the first visual indication of the check in interaction on a lock screen user interface as described in method 700. In some embodiments, if the first visual indication of the initiation does not have a critical importance level, it does not remain displayed on the lock screen user interface for the duration of the check in interaction. Displaying the first visual indication on the lock screen user interface for the duration of the check in interaction provides feedback about the check in interaction, thereby reducing the number of inputs needed to retrieve additional information relating to the check in interaction.

In some embodiments, the first visual indication of the initiation of the check in interaction includes an estimated time of completion of the check in interaction (908), such as shown in text 804 in FIG. 8A which is updated as time passes, as shown by text 816 in FIG. 8C. In some embodiments, the estimated time of completion is an estimated time of arrival of the second electronic device to a destination location, as described in method 700. In some embodiments, the estimated time of completion is the estimated time of completion of a timer (e.g., such as a time duration as described in method 700). In some embodiments, the indication of the time of completion is dynamic (e.g., updates as the estimated time of completion changes). For example, the second electronic device transmits an update to the indication of the time of completion every 1 min, 15 minutes, 30 minutes, or 1 hour. Displaying an estimated time of completion on the first visual indication provides feedback about the check in interaction, thereby reducing the number of inputs needed to retrieve additional information relating to the check in interaction.

In some embodiments, in response to receiving the second indication of termination of the check in interaction, the first electronic device ceases (910) the display of the first visual indication, such as if user interface object 802 ceases to be displayed after receiving the second indication of termination. In some embodiments, the second indication of termination of the check in interaction is transmitted as a result of the one or more criteria being satisfied. In some embodiments, displaying the first visual indication includes displaying a visual indication of a first status and/or a second status, as described in method 700. Ceasing the display of the first visual indication on the lock screen user interface in response to receiving the second indication of termination provides feedback about the check in interaction, thereby reducing the number of inputs needed to retrieve additional information relating to the check in interaction and reduces the inputs needed to manually cease the display of the indication of termination when it is no longer relevant.

In some embodiments, while displaying the first visual indication of the initiation of the check in interaction on the lock screen user interface, the first electronic device receives (912*a*), via the one or more input devices, an input corresponding to a selection of the first visual indication, such as with contact 806 on user interface object 802 shown in FIG. 8A. The input optionally has one or more characteristics of the input described in method 700.

In some embodiments, in response to receiving the input, the first electronic device displays (912*b*), via the display generation component, a messaging user interface including messaging activity between the first user account and the second user account, such user interface object 812 shown in FIG. 8B in messaging user interface 808 and first user interface object 836, second user interface object 838, and third user interface object 840 in FIG. 8G. In some embodiments, the messaging user interface including the messaging activity has one or more characteristics of the messaging user interface described in method 700. Providing access to the messaging user interface using the first visual indication simplifies the interaction between the user and the electronic device by reducing the number of inputs needed to view the messaging user interface, which reduces power usage and improves battery life of the electronic device.

In some embodiments, while the check in interaction is active, the first electronic device receives (914*a*), via the one or more input devices, an input corresponding to a request to display a messaging user interface including messaging activity between the first user account and the second user account, such as with a contact directed towards a messaging application and/or with contact 806 on user interface object 802 in FIG. 8A. The input optionally has one or more characteristics of the input described above. In some embodiments, the messaging user interface including the messaging activity has one or more characteristics of the messaging user interface described in method 700.

In some embodiments, in response to receiving the input, the first electronic device displays (914*b*), via the display generation component, the messaging user interface including the messaging activity between the first user account and the second user account, such as first user interface object 836, second user interface object 838, and third user interface object 840 in FIG. 8G, and a third visual indication of the initiation of the check in interaction, such as user interface object 812 shown in FIG. 8B. In some embodiments, the third visual indication has one or more characteristics of the visual indication described in method 700. Displaying a visual indication of the initiation of the check in interaction in a messaging user interface reduces the number of inputs needed to retrieve information about the check in interaction and places the visual indication at an efficient location where messaging between the participants in the check in occurs.

In some embodiments, the third visual indication includes an estimated time of completion of the check in interaction (916), such as shown by text 814 in FIG. 8B. In some embodiments, the estimated time of completion has one or more characteristics of the estimated time of completion described above. Displaying a visual indication of the initiation of the check in interaction with the estimated time of completion of the check in interaction in a messaging user interface reduces the number of inputs needed to retrieve information about the check in interaction.

In some embodiments, the third visual indication of the initiation of the check in interaction in the messaging user interface includes first information (e.g., an estimated time of completion and/or a description of the second user account and/or a description of one or more termination conditions of the check in interaction) about the check in interaction (918*a*), such as shown by text 814 in FIG. 8B.

In some embodiments, while displaying the third visual indication of the initiation of the check in interaction, the first electronic device receives (918*b*), via the one or more input devices, an input corresponding to selection of the third visual indication, such with contact 822 shown in FIG. 8D. The input optionally has one or more characteristics of the input described in method 700.

In some embodiments, in response to receiving the input, the first electronic device displays (918*c*), via the display generation component, an expanded first user interface, such as expanded user interface 830 shown in FIG. 8F, that includes second information about the check in interaction, different from the first information about the check in interaction, such as information found in user interface objects 834*a-i*. The second information optionally has one or more characteristics of the information displayed in the expanded user interface, such as the expanded first user interface as described in method 700. In some embodiments, the second information includes information about the estimated time of completion, the first termination condition, a current location of the second electronic device, and/or device information about devices associated with the second user account (e.g., the second electronic device, and/or other devices such as watches, computers, and/or tablets). In some embodiments, the second information is inclusive of the first information and includes more information than the first information. In some embodiments, the third visual indication does not include the second information. Presenting the second information in the expanded user interface for the check in interaction simplifies the interaction between the user and the electronic device by reducing the number of inputs needed to view more information and avoids erroneous inputs related viewing more information about the check in interaction, which reduces power usage and improves battery life of the electronic device.

In some embodiments, while the check in interaction is active, in response to detecting that a status of the check in interaction has changed, the first electronic device replaces (920), in the messaging user interface, the third visual indication of the initiation of the check in interaction with a fourth visual indication associated with the changed status of the check in interaction, wherein the fourth visual indication does not change based on a change of the check in interaction, such as user interface object 818 replacing user interface object 812 in FIG. 8D. In some embodiments, the fourth visual indication is displayed by (e.g., above, below, to the left of, or to the right of) the third visual indication. In some embodiments, the fourth visual indication has one or more characteristics of the second visual indication as discussed with reference to method 700. Replacing the third visual indication with a fourth visual indication with a different visual appearance in response to a changed status provides feedback about the check in interaction, thereby reducing the number of inputs needed to retrieve additional information relating to the check in interaction.

Figure 7A:
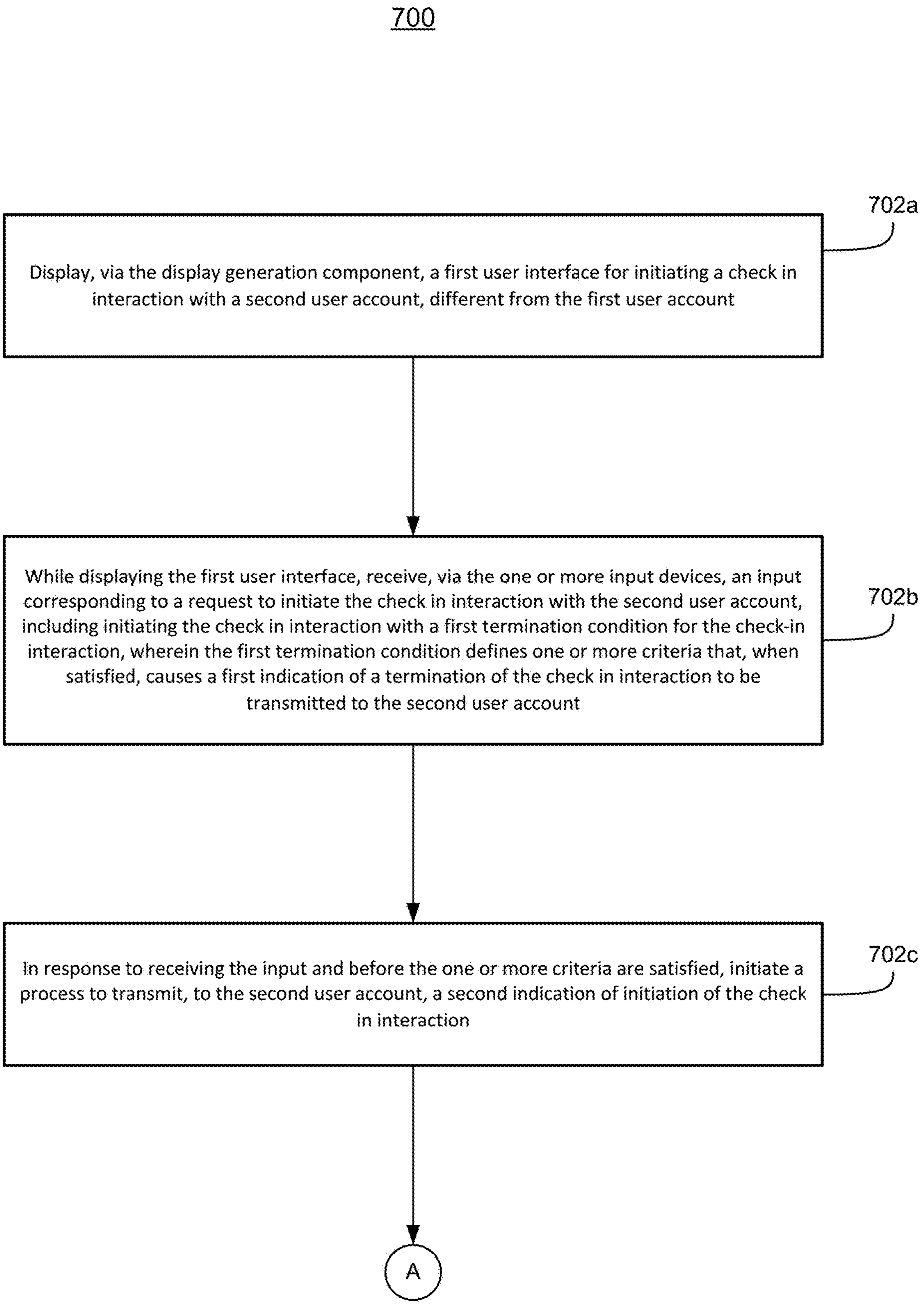
FIGS. 7A-7J is a flow diagram illustrating a method in which an electronic device displays and transmits a check in interaction communication in accordance with some embodiments of the disclosure.
Figure 7B:
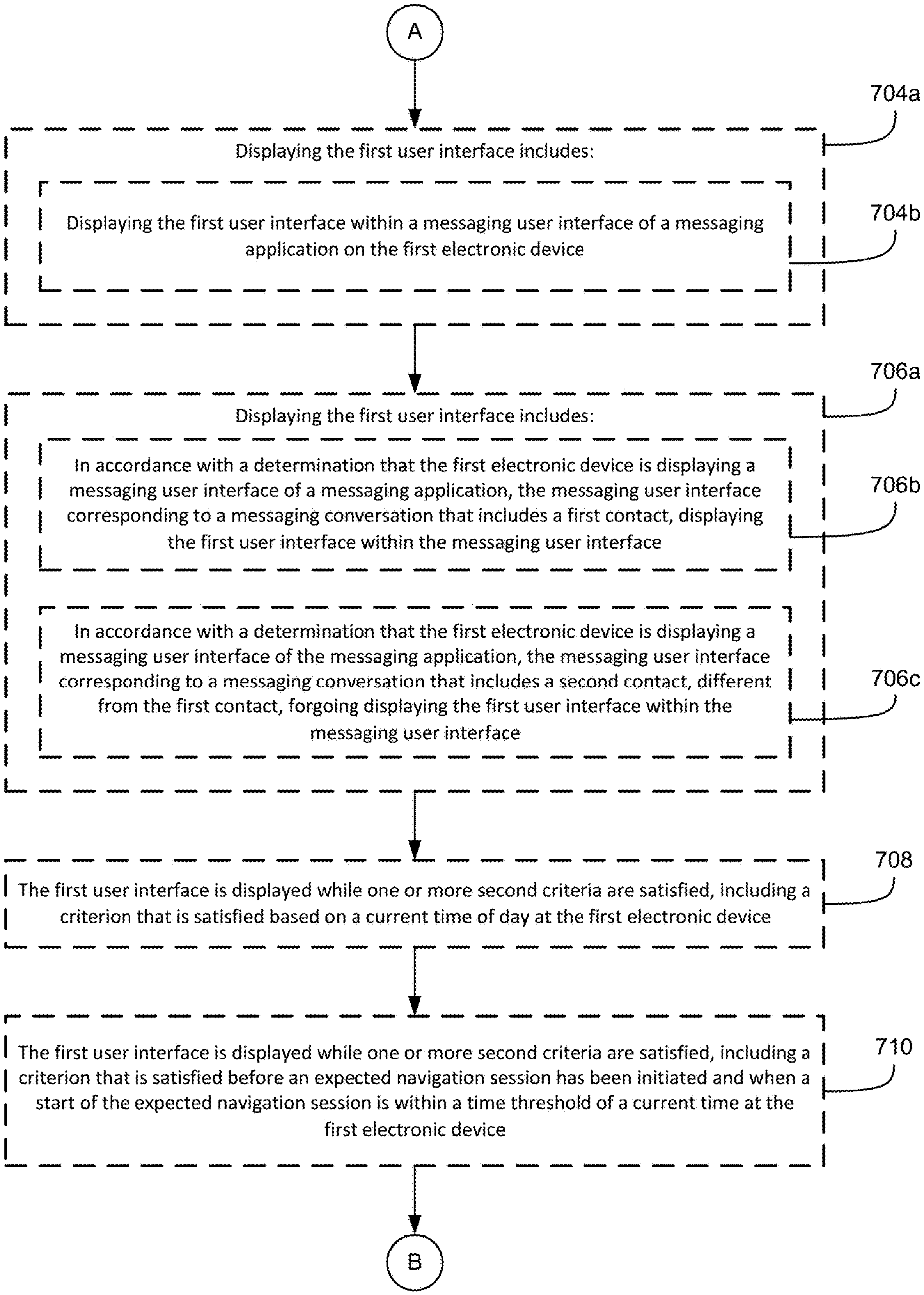
Figure 7C:
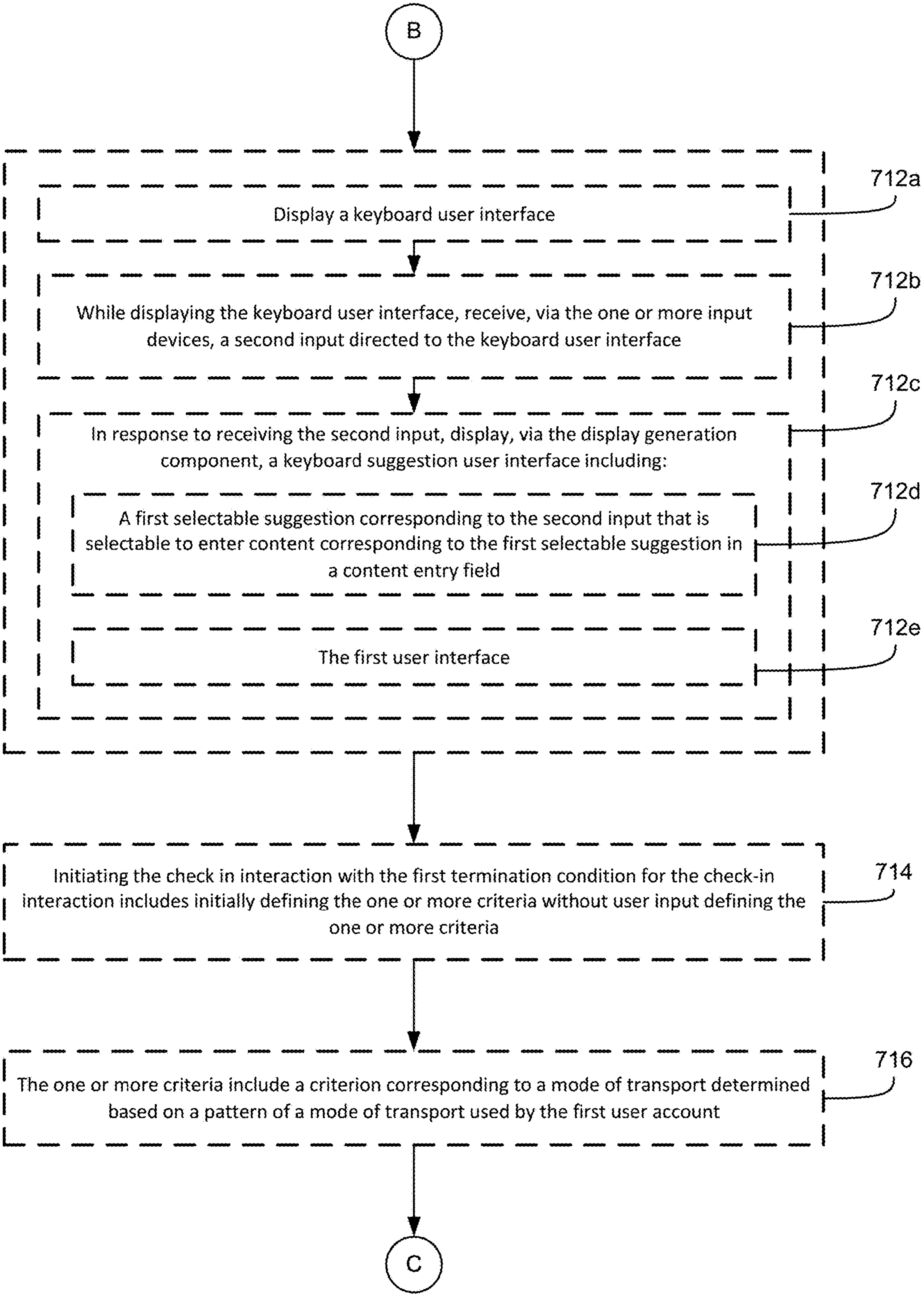
Figure 7D:
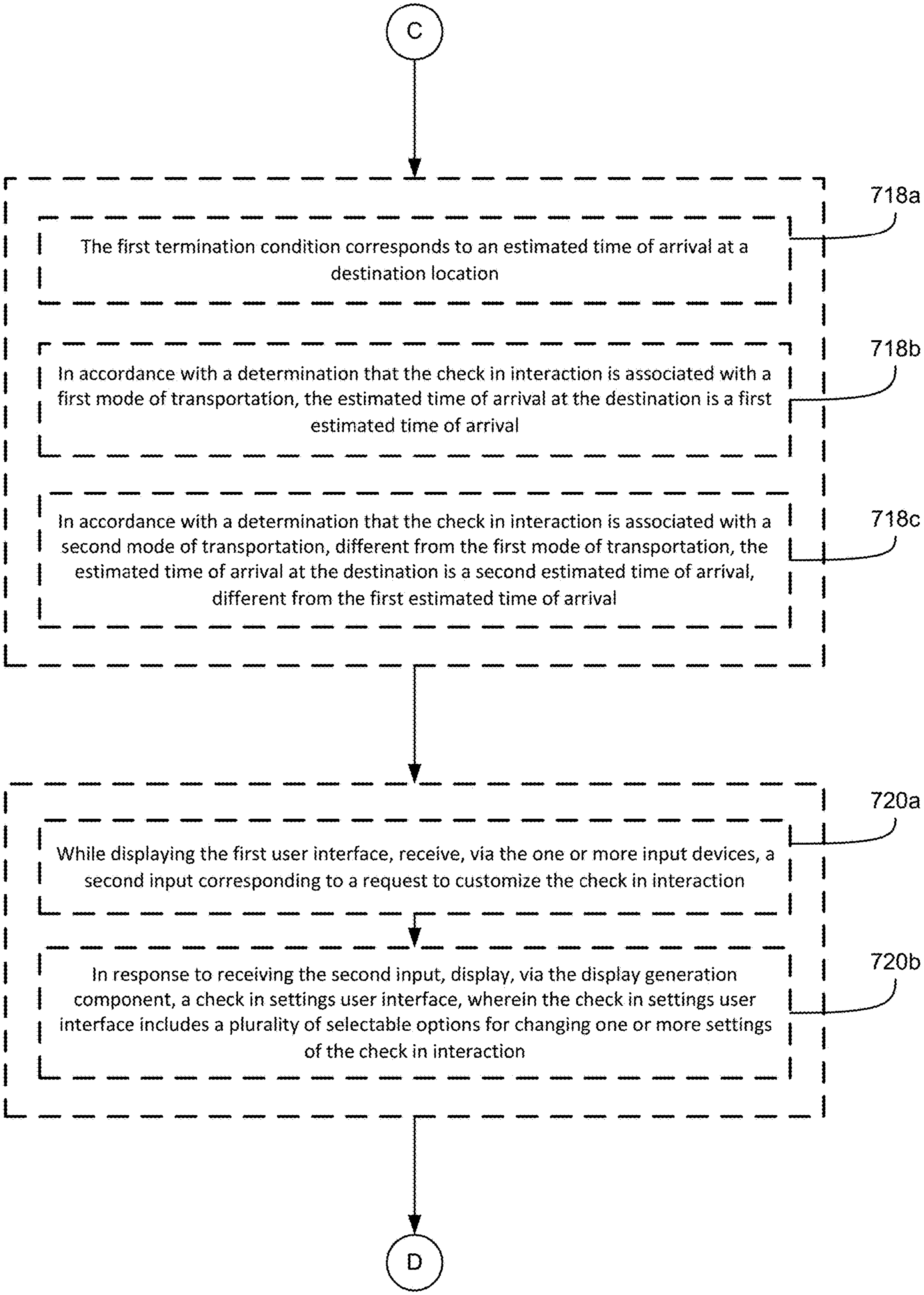
Figure 7E:
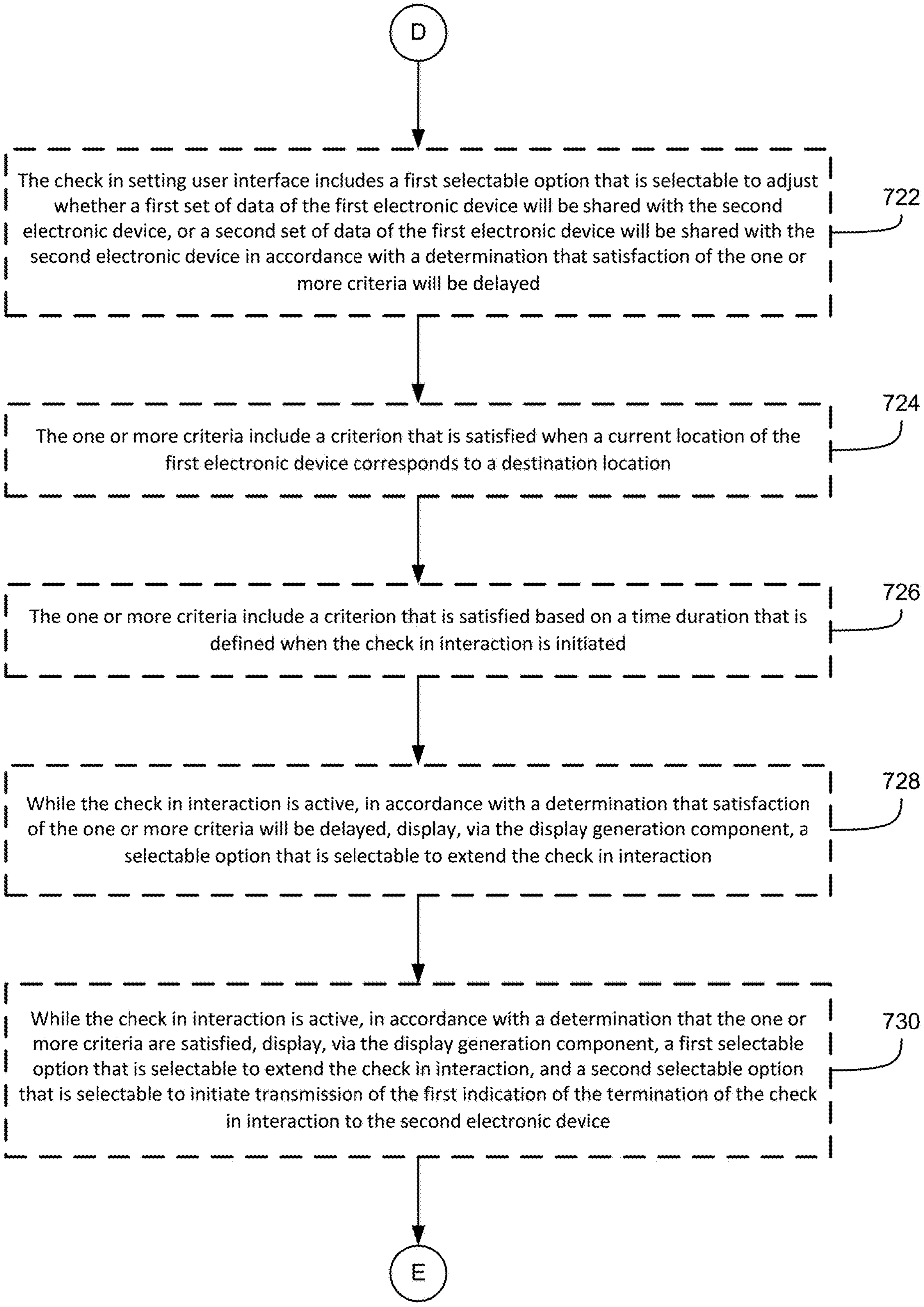
Figure 7F:
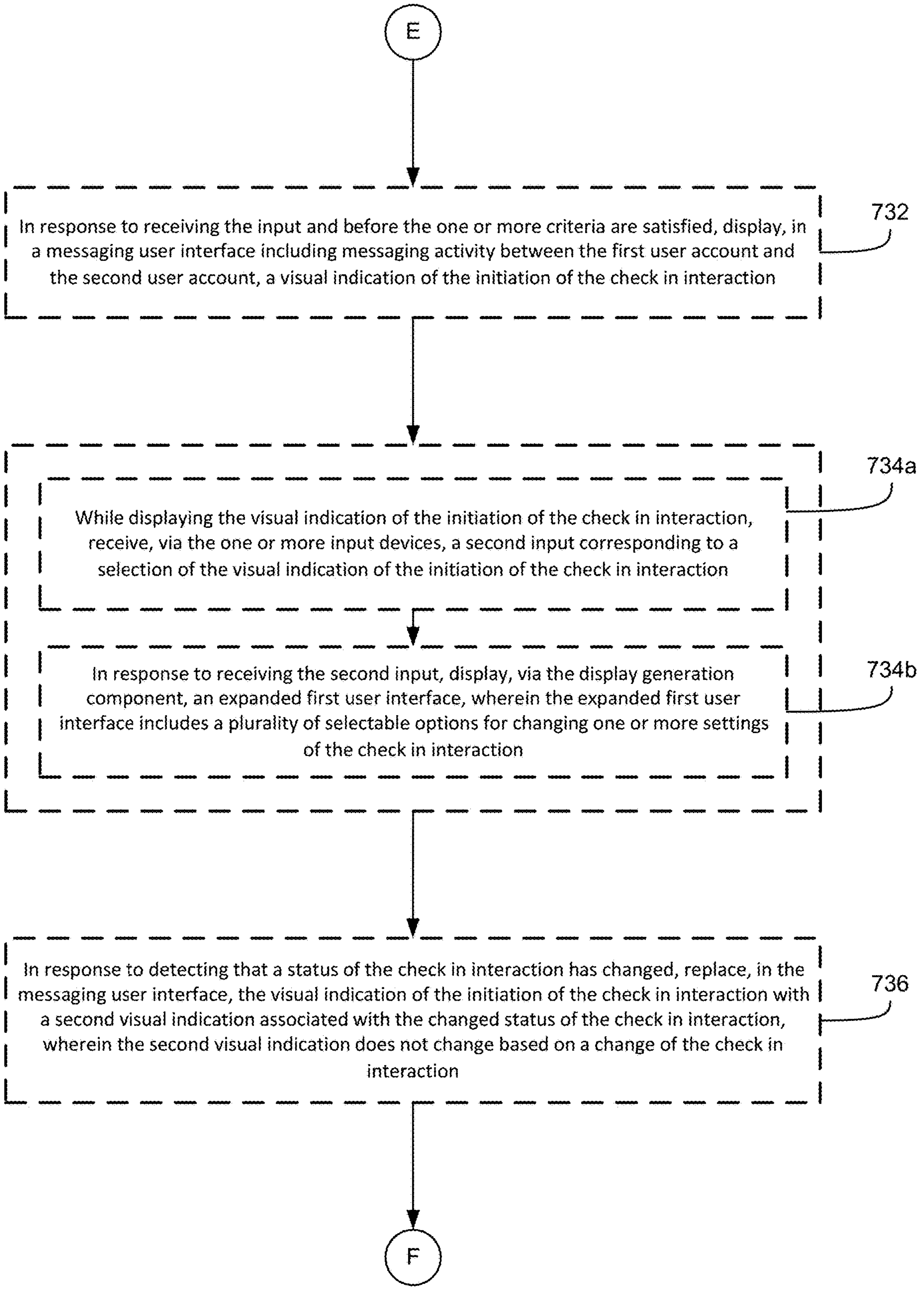
Figure 7G:
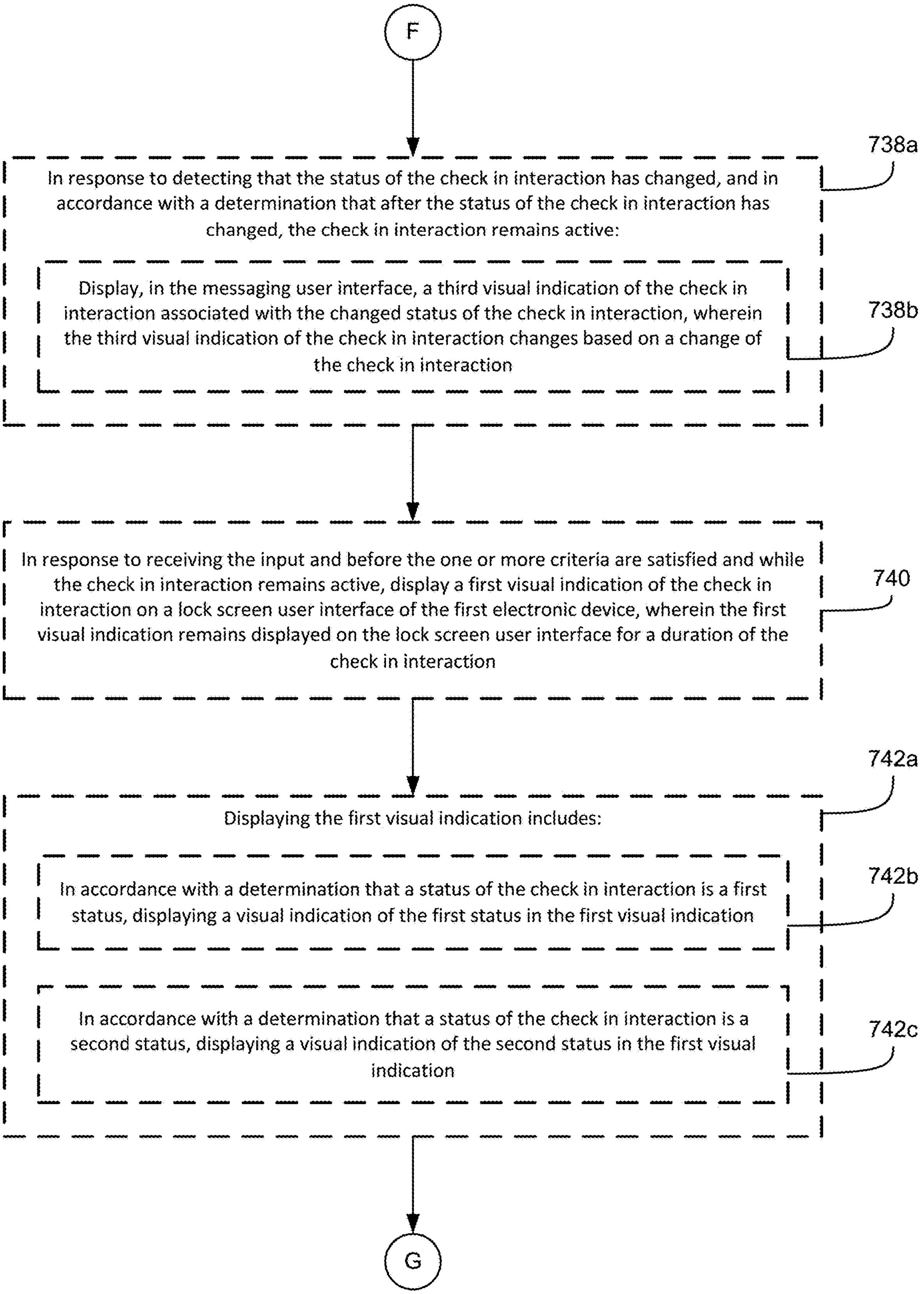
Figure 7H:
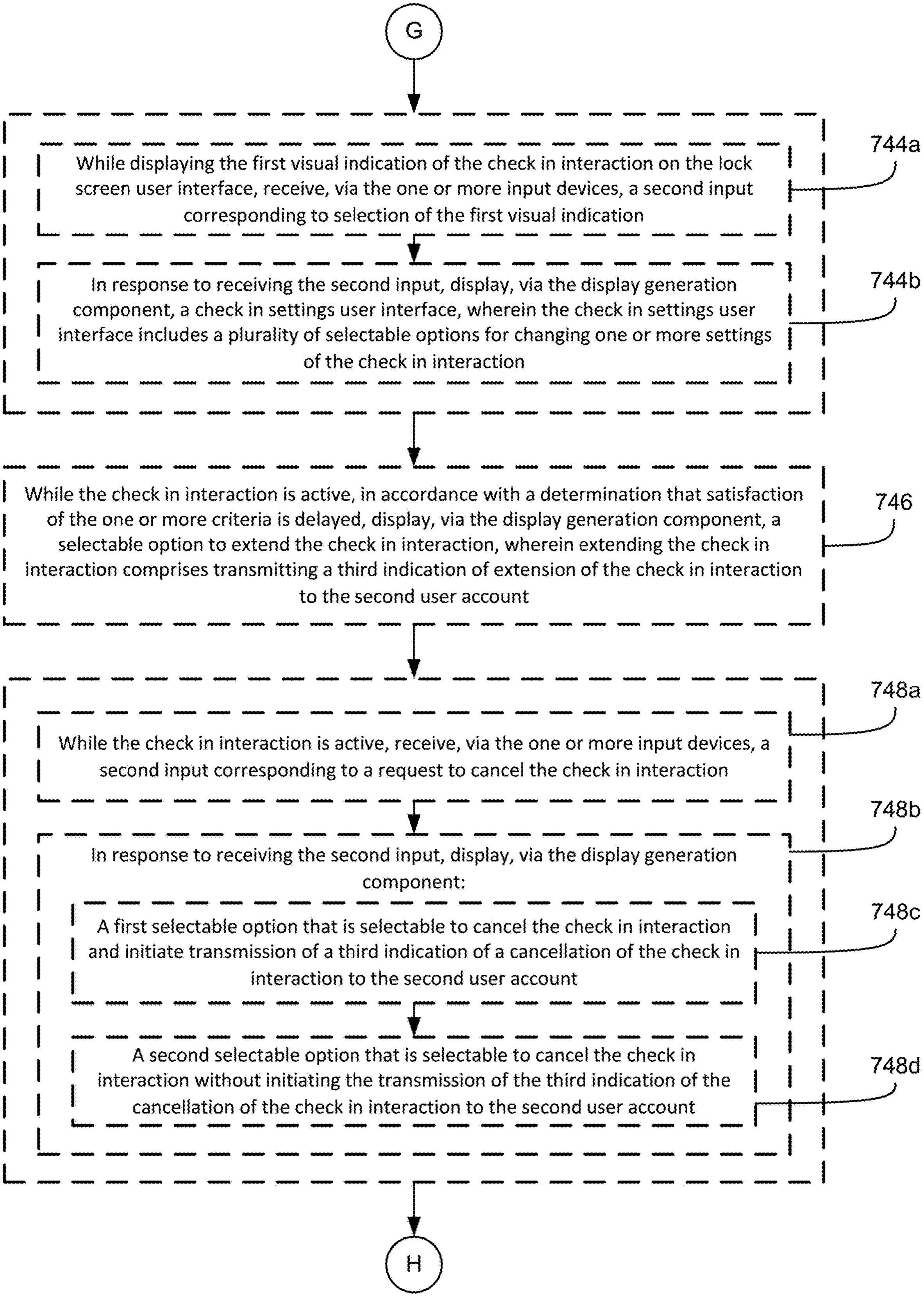
Figure 7I:
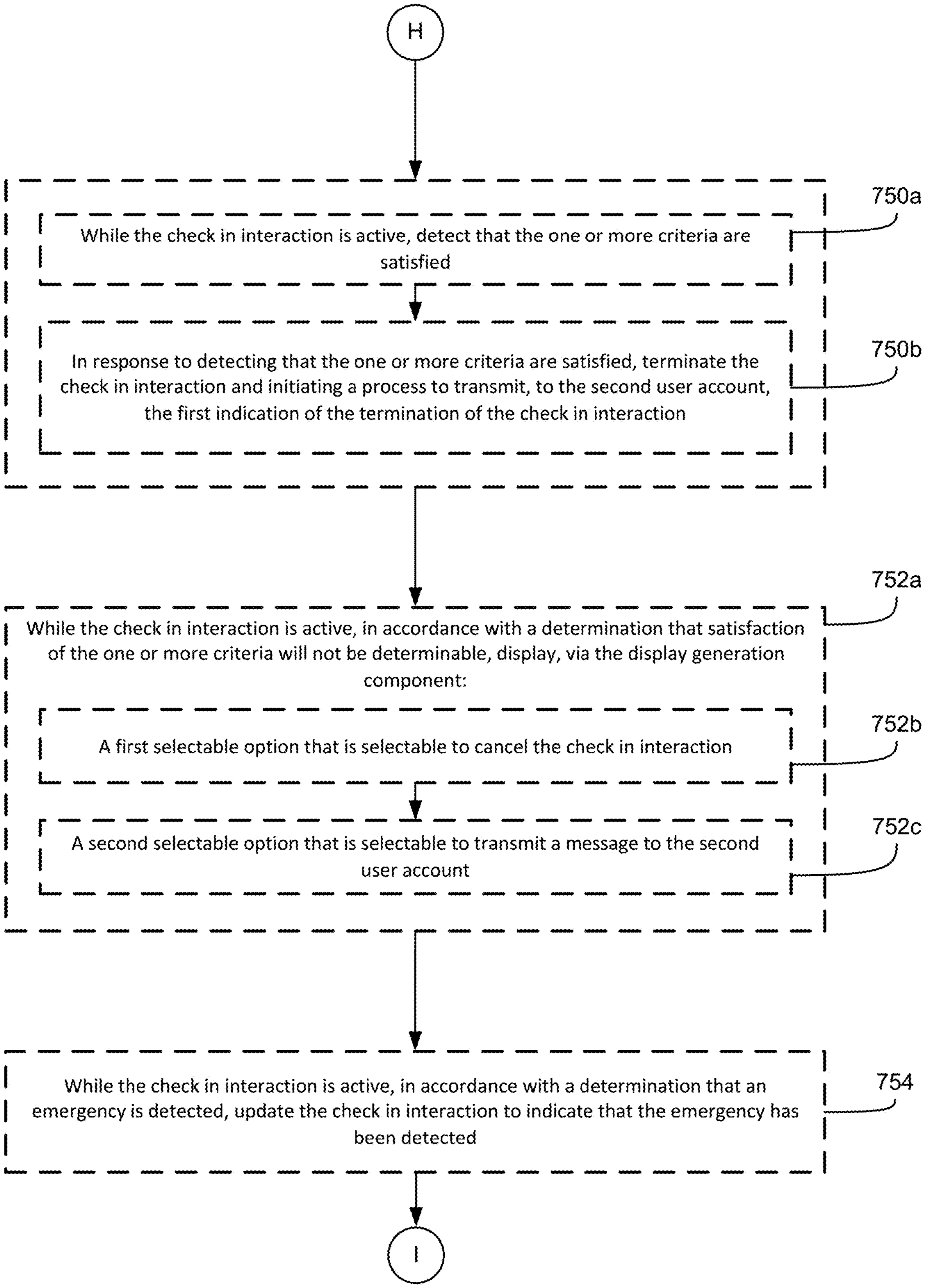
Figure 7J:
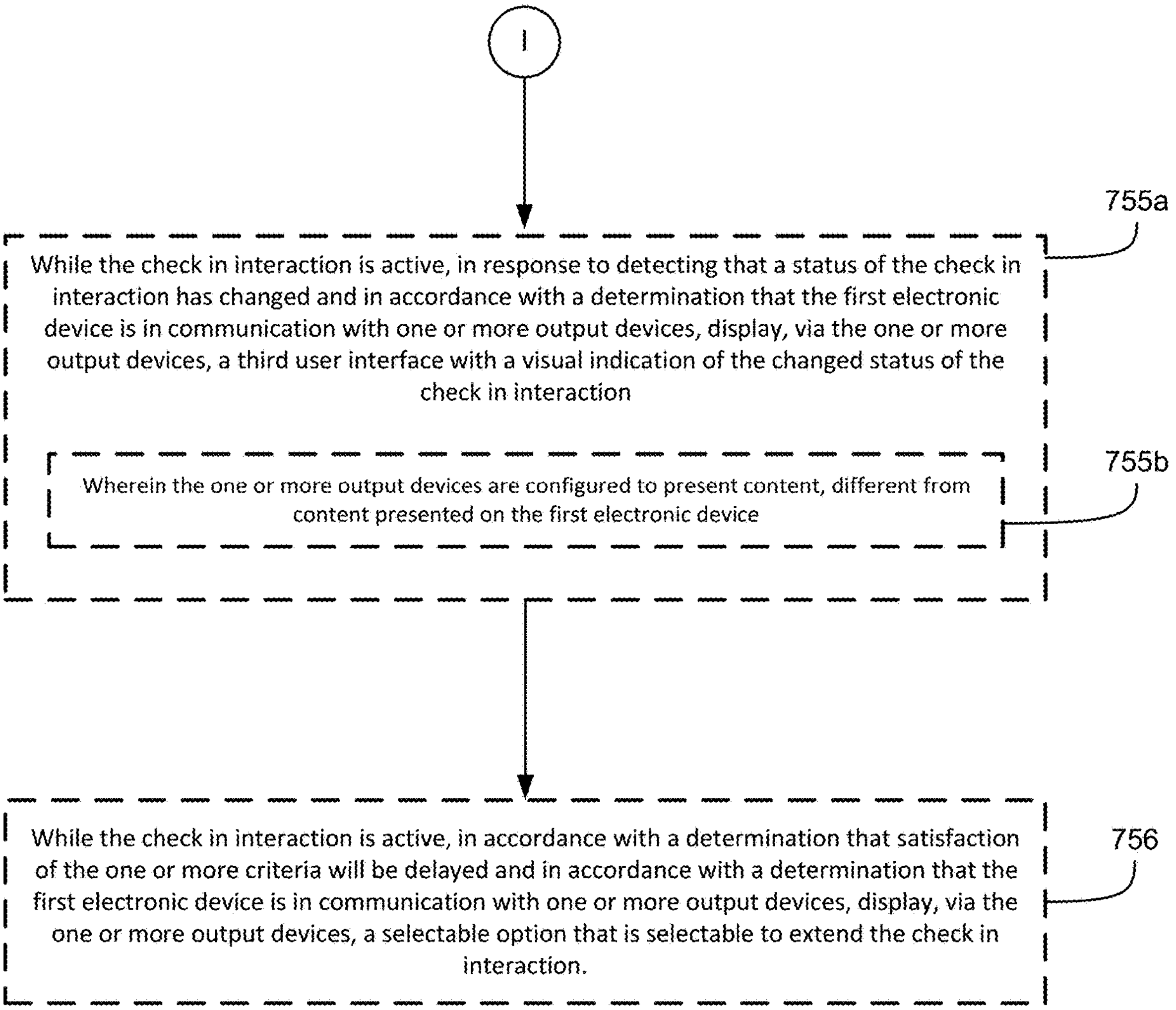

In some embodiments, after the initiation of the check in interaction (and optionally while the check in interaction is active), the first electronic device receives (922*a*), via the one or more input devices, a third indication of cancellation of the check in interaction, such as if device 500*a* described in FIG. 7A-7N cancels the check in interaction. In some embodiments, the first electronic device receives the third indication of cancellation as a result of the second electronic device cancelling the check in interaction and initiating the transmission of the third indication of cancellation, such as described in method 700.

In some embodiments, in response to receiving the third indication of cancellation of the check in interaction, the first electronic device displays (922*b*), via the display generation component, a third visual indication of the cancellation of the check in interaction, such as if user interface object 812 in FIG. 8B is replaced with another user interface object describing the cancellation of the check in interaction. In some embodiments, the third visual indication of the cancellation is displayed in the messaging user interface and/or on the lock screen user interface. In some embodiments, the third visual indication of the cancellation includes a textual description of the cancellation. For example, the textual description optionally includes text describing that the check in interaction is canceled, when the check in was canceled, why the check in was canceled (e.g., the second user account canceled the check in interaction) the check in, and who canceled it (e.g., the first user account/the first electronic device). In some embodiments, in response to receiving the third indication of cancellation, the first visual indication (and/or all other visual indications) of initiation ceases to be displayed. In some embodiments, no additional visual indications are displayed. Displaying a third visual indication of the cancellation in response to receiving the third indication of cancellation reduces the number of inputs needed to retrieve information about the cancellation of the check in interaction.

In some embodiments, the first electronic device receives (924*a*) a third indication of a change in status of the check in interaction before the one or more criteria are satisfied, such as if device 500*a* in FIG. 6A-6P is delayed. In some embodiments, receiving the third indication is a result of an emergency or a delay detected on the second electronic device. In some embodiments, the third indication of the change in status has one or more characteristics of the third visual indication as described in method 700.

In some embodiments, in response to receiving the third indication, the first electronic device displays (924*b*), via the display generation component, a third visual indication of the check in interaction, such as user interface object 818 in FIG. 8D and/or user interface object 824 in FIG. 8*e*, wherein the third visual indication of the check in interaction indicates the change in the status of the check in interaction, such as shown by text 820 in FIG. 8D and/or text 826 in FIG. 8E, and the third visual indication is selectable to display an expanded user interface of the check in interaction that includes additional information about the check in interaction, such as user interface 830 in FIG. 8F. The third visual indication of the check in interaction is optionally displayed on a lock screen user interface, a messaging user interface, and/or a notifications user interface. In some embodiments, the third visual indication has one or more characteristics of the third visual indication of method 700. In some embodiments, the expanded user interface of the check in, as discussed above, displays an indication of a current location and/or device information of the second electronic device as a result of receiving the third indication. In some embodiments, the third visual indication includes text describing what the change in status is (e.g., a cancellation, delay, emergency, or termination), when the change in status was detected (e.g., a time), why the change in status occurred (e.g., the second electronic device is delayed), and who initiated the check in interaction (e.g., the second user account). Displaying a third visual indication of the change in status in response to receiving the third indication of change in status reduces the number of inputs needed to retrieve information about the check in interaction.

In some embodiments, the third visual indication is displayed in a messaging user interface corresponding to a messaging conversation including the first user account and the second user account (926), such as user interface object 818 in messaging user interface 808 in FIG. 8D. In some embodiments, the third visual indication has one or more characteristics of the visual indication in method 700. In some embodiments, the third visual indication includes an indication of a delay or an emergency with respect to the check in interaction. The third visual indication optionally includes an updated estimated time of completion of the check in interaction. Displaying the third visual indication of the check in interaction chronologically in the messaging activity instead of persistently in the messaging activity reduces the resources needed to display the visual indication of the check in interaction, thereby improving interaction between the user and the electronic device, which reduces power usage and improves battery life of the electronic device In some embodiments, the expanded user interface of the check in interaction includes an indication of a current location of a second electronic device associated with the second user account (928), such as user interface object 834*c* in FIG. 8F, and/or device information about the second electronic device, such as user interface objects 834*b-i* in FIG. 8F. In some embodiments, the current location of the second electronic device is shown on a visual representation of a map. In some embodiments, the current location is shown as a textual representation of the current location (e.g., an address). In some embodiments, the device information includes information about the device's cellular signal strength and/or battery level information. In some embodiments, the device information includes such similar and/or same information about other devices associated with the first user account. In some embodiments, the expanded user interface includes a recent usage of the second electronic device and other devices associate with the second user account (e.g., a time and/or date of a recent usage). In some embodiments, the expanded user interface includes previous locations of the second electronic device (e.g., a full route traveled while the check in interaction is active), a location of the last unlock of the second electronic device, and a location of a last activity of other devices associated with the second user account (e.g., a location of a watch removal). Presenting an expanded user interface for the check in interaction simplifies the interaction between the user and the electronic device by reducing the number of inputs needed to view more information and avoids erroneous inputs related viewing more information about the check in interaction, which reduces power usage and improves battery life of the electronic device and provides visual feedback about potential causes for the change in status.

In some embodiments, the one or more criteria include a criterion that is satisfied when a second electronic device associated with the second electronic device arrives at a respective location, and the first indication of the initiation of the check in interaction includes general information associated with the respective location without including precise information associated with the respective location (930), such as if text 814 in FIG. 8B includes general information about the respective location. In some embodiments, if the change in status of the check in interaction is not detected, a current location of the second electronic device is not shared with the first electronic device. In some embodiments, the first indication of the initiation of the check in interaction does not include street addresses, coordinates, or other precise information. For example, the first indication of the initiation of the check in includes descriptive locations such as home, work, a city name (e.g., Palo Alto), and/or the logical descriptor of the destination of the check in interaction (e.g., "gym") rather than specific addresses and/or coordinates. Providing general information associated with the respective location improves privacy and/or security of the initiator of the check in interaction.

In some embodiments, while the check in interaction is active (932*a*), the first electronic device receives (932*b*), via the one or more input devices, a third indication of initiation of a second check in interaction (different from the check in interaction) between the first user account and a third user account, different from the second user account, such as user interface object 844 shown in FIG. 8H. In some embodiments, the third user account is associated with a third electronic device and a third user. In some embodiments, the third indication of initiation of the second check in interaction has one or more characteristics of the first indication of the initiation of the check in interaction between the first user account and the second user account.

In some embodiments, in response to receiving the third indication, the first electronic device concurrently operates (932*c*) in accordance with the check in interaction and the second check in interaction, such as if device 500*b* displays visual indications of check in interactions in the respective messaging conversations of the messaging user interface 808 shown in FIG. 8B. In some embodiments, concurrently operating includes displaying visual indications of initiation, termination, cancellations, and/or other visual indications, or performing any of the operations as discussed in methods 700 and/or 900, except with respect to the second user account and the third user account. Receiving multiple indications of initiation for different check in interactions allows the electronic device to quickly and efficiently provide the user with information about multiple check in interactions, which improves interactions between the user and the electronic device.

In some embodiments, the first electronic device receives (934*a*) a third indication of a change in status of the check in interaction before the one or more criteria are satisfied, such as if device 500*a* described in FIGS. 7A-7N has a change in status. In some embodiments, the third indication of the change in status of the check in interaction is received from the second electronic device. In some embodiments, the change in status of the check in interaction has one or more characteristics of the change in status described above.

In some embodiments, in response to receiving the third indication, and in accordance with a determination that the first electronic device is in communication with one or more output devices, such as device 500*d* shown in FIG. 8I, the electronic device displays (934*b*), via the one or more output devices, a third visual indication of the check in interaction, wherein the third visual indication of the check in interaction, such as indication 858 in FIG. 8I, is selectable to display an expanded user interface of the check in interaction that includes additional information about the check in interaction. For example, contact 860 directed to indication 858 in FIG. 8I, which results in device 500*d* displaying expanded indication 862 in FIG. 8J. In some embodiments, the third visual indication includes a visual and/or textual description of the check in interaction and the sender of the check in interaction. For example, the third visual indication optionally shows an avatar and/or name of the second user account. The third visual indication optionally shows an icon of the check in interaction. In some embodiments, the third visual indication is selectable to display an expanded user interface with visual and/or textual description of the check in interaction and the sender of the check in interaction with greater detail. For example, the expanded user interface includes text describing what the change in status is (e.g., a cancellation, delay, emergency, or termination), when the change in status was detected (e.g., a time), why the change in status occurred (e.g., the second electronic device is delayed), and who initiated the check in interaction (e.g., the second user account). In some embodiments, the expanded user interface and/or the third visual indication do not include a visual indication of and/or selectable option to display the current location of the second electronic device and/or second user account.

In some embodiments, the one or more output devices are configured to present content, different from content presented on the first electronic device (934*c*), such as user interface elements 854*a* through 854*c* shown in FIG. 8I. In some embodiments, the first electronic device presents content related to the check in interaction (e.g., change in status) using the messaging application and/or lock screen user interface, as described above. In some embodiments, the one or more output devices are configured to present content about the check in interaction in ways as described above. In some embodiments, the one or more output devices have one or more characteristics of the one or more output devices described in method 700. Displaying a third visual indication of the change in status in response to receiving the third indication of change in status reduces the number of inputs needed to retrieve information about the check in interaction.

In some embodiments, the expanded user interface of the check in interaction includes a first selectable option to send a message, such as selectable option 864*a* in FIG. 8J, using the first electronic device, to the second electronic device, a second selectable option to generate audio output corresponding to the additional information about the check in interaction via the one or more output devices, such as selectable option 864*b* in FIG. 8J, and a third selectable option to initiate real-time communication with, using the first electronic device, the second electronic device (936), such as selectable option 864*c* in FIG. 8J. In some embodiments, in response to selecting the first selectable option, a messaging user interface associated with the messaging application is displayed on the one or more output devices. Data corresponding to the messaging application is transmitted from the first electronic device to the one or more output devices. In some embodiments, the message to the second user account can be sent using the first electronic device or the one or more output devices. In some embodiments, a user of the first electronic device can provide a voice input to a voice assistant to transcribe and transmit a message to the second user account. In some embodiments, in response to selecting the third visual indication, the first electronic device generates audio output corresponding to the additional information about the check in interaction via the one or more output devices. In some embodiments, the audio output is provided by the voice assistant of the first electronic device and/or the one or more output devices. In some embodiments, the second selectable option repeats the audio generated by the first electronic device (e.g., by the voice assistant). In some embodiments, the third selectable option is selectable to indicate a phone call with the second electronic device. In some embodiments, the first electronic device uses the one or more output devices to present the phone call. Displaying the three selectable options on the expanded user interface reduces the number of inputs needed to perform the actions of the selectable options thereby reducing power usage and improving battery life of the electronic device.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9G. For example, the operation of the electronic device to present a communication feature described above with reference to method 900 optionally has one or more of the characteristics of the presentation of and transmission of a communication described herein with reference to other methods described herein (e.g., method 700). Additionally, the check in interaction described with reference to method 900 has one or more characteristics of the check in interaction described with reference to method 700. For brevity, these details are not repeated here.

The operations in the information processing methods described above are, optionally, implemented by running one or more functional modules in an information processing apparatus such as general-purpose processors (e.g., a as described with respect to FIG. 1A-1B, 3, 5A-5J) or application specific chips. Further, the operations described above with reference to FIGS. 9A-9G are, optionally, implemented by components depicted in FIGS. 1A-1B. For example, receiving operation 902*a* and 902*c*, and/or displaying operation 902*b* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is capturing and displaying content and location information. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, capturing and transmitting content can enable the user to view the content at a later time. Accordingly, use of such personal information data enables users to use electronic devices to view content. Further, other uses for personal information data that benefit the user are also contemplated by the present disclosure. For instance, location data may be used to enhance communications between devices.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to "opt in" or "opt out" of participation in the collection of personal information data during registration for services or anytime thereafter. In another example, users can select not to enable location services in a specific application (e.g., first application and/or second application). In addition to providing "opt in" and "opt out" options, the present disclosure contemplates providing notifications relating to the access or use of personal information. For instance, a user may be notified upon initiating content collection that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an electronic device transmits communications without associating the content with location data.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a first electronic device in communication with a display generation component and one or more input devices, wherein the first electronic device is associated with a first user account:

displaying, via the display generation component, a first user interface for initiating a check in interaction with a second user account, different from the first user account, wherein the first user interface is displayed within a messaging user interface of a messaging application;

while displaying the first user interface, receiving, via the one or more input devices, an input corresponding to a request to initiate the check in interaction with the second user account, including initiating the check in interaction with a first termination condition for the check in interaction, wherein the first termination condition defines one or more criteria that, when satisfied, causes a first indication of a termination of the check in interaction to be transmitted to the second user account; and in response to receiving the input and before the one or more criteria are satisfied, initiating a process to transmit, to the second user account, a second indication of initiation of the check in interaction.

2. The method of claim 1, wherein:

in accordance with a determination that the messaging user interface corresponds to a messaging conversation that includes a first contact, displaying the first user interface within the messaging user interface corresponding to the messaging conversation that includes the first contact; and in accordance with a determination that the messaging user interface corresponds to a messaging conversation that includes a second contact, different from the first contact, forgoing displaying the first user interface within the messaging user interface corresponding to the messaging conversation that includes the second contact.

3. The method of claim 1, wherein the first user interface is displayed while one or more second criteria are satisfied, including a criterion that is satisfied based on a current time of day at the first electronic device.

4. The method of claim 1, wherein the first user interface is displayed while one or more second criteria are satisfied, including a criterion that is satisfied before an expected navigation session has been initiated and when a start of the expected navigation session is within a time threshold of a current time at the first electronic device.

5. The method of claim 1, further comprising:

displaying a keyboard user interface;

while displaying the keyboard user interface, receiving, via the one or more input devices, a second input directed to the keyboard user interface; and in response to receiving the second input, displaying, via the display generation component, a keyboard suggestion user interface including:

a first selectable suggestion corresponding to the second input that is selectable to enter content corresponding to the first selectable suggestion in a content entry field; and the first user interface.

6. The method of claim 1, wherein initiating the check in interaction with the first termination condition for the check in interaction includes initially defining the one or more criteria without user input defining the one or more criteria.

7. The method of claim 6, wherein the one or more criteria include a criterion corresponding to a mode of transport determined based on a pattern of a mode of transport used by the first user account.

8. The method of claim 1, wherein the first termination condition corresponds to an estimated time of arrival at a destination location;

in accordance with a determination that the check in interaction is associated with a first mode of transportation, the estimated time of arrival at the destination location is a first estimated time of arrival; and in accordance with a determination that the check in interaction is associated with a second mode of transportation, different from the first mode of transportation, the estimated time of arrival at the destination location is a second estimated time of arrival, different from the first estimated time of arrival.

9. The method of claim 1, further comprising:

while displaying the first user interface, receiving, via the one or more input devices, a second input corresponding to a request to customize the check in interaction; and in response to receiving the second input, displaying, via the display generation component, a check in settings user interface, wherein the check in settings user interface includes a plurality of selectable options for changing one or more settings of the check in interaction.

10. The method of claim 9, wherein the check in setting user interface includes a first selectable option that is selectable to adjust whether a first set of data of the first electronic device will be shared with a second electronic device, or a second set of data of the first electronic device will be shared with the second electronic device in accordance with a determination that satisfaction of the one or more criteria will be delayed.

11. The method of claim 1, wherein the one or more criteria include a criterion that is satisfied when a current location of the first electronic device corresponds to a destination location.

12. The method of claim 1, wherein the one or more criteria include a criterion that is satisfied based on a time duration that is defined when the check in interaction is initiated.

13. The method of claim 11, further comprising:

while the check in interaction is active, in accordance with a determination that satisfaction of the one or more criteria will be delayed, displaying, via the display generation component, a selectable option that is selectable to extend the check in interaction.

14. The method of claim 12, further comprising:

while the check in interaction is active, in accordance with a determination that the one or more criteria are satisfied, displaying, via the display generation component, a first selectable option that is selectable to extend the check in interaction, and a second selectable option that is selectable to initiate transmission of the first indication of the termination of the check in interaction to a second electronic device.

15. The method of claim 1, further comprising:

in response to receiving the input and before the one or more criteria are satisfied, displaying, in the messaging user interface including messaging activity between the first user account and the second user account, a visual indication of the initiation of the check in interaction.

16. The method of claim 15, further comprising:

while displaying the visual indication of the initiation of the check in interaction, receiving, via the one or more input devices, a second input corresponding to a selection of the visual indication of the initiation of the check in interaction; and in response to receiving the second input, displaying, via the display generation component, an expanded first user interface, wherein the expanded first user interface includes a plurality of selectable options for changing one or more settings of the check in interaction.

17. The method of claim 15, further comprising:

in response to detecting that a status of the check in interaction has changed, replacing, in the messaging user interface, the visual indication of the initiation of the check in interaction with a second visual indication associated with a changed status of the check in interaction, wherein the second visual indication does not change based on a change of the check in interaction.

18. The method of claim 15, further comprising:

in response to detecting that a status of the check in interaction has changed, and in accordance with a determination that after the status of the check in interaction has changed, the check in interaction remains active:

displaying, in the messaging user interface, a third visual indication of the check in interaction associated with the changed status of the check in interaction, wherein the third visual indication of the check in interaction changes based on a change of the check in interaction.

19. The method of claim 1, further comprising in response to receiving the input and before the one or more criteria are satisfied and while the check in interaction remains active, displaying a first visual indication of the check in interaction on a lock screen user interface of the first electronic device, wherein the first visual indication remains displayed on the lock screen user interface for a duration of the check in interaction.

20. The method of claim 19, wherein displaying the first visual indication includes:

in accordance with a determination that a status of the check in interaction is a first status, displaying a visual indication of the first status in the first visual indication; and in accordance with a determination that a status of the check in interaction is a second status, displaying a visual indication of the second status in the first visual indication.

21. The method of claim 19, wherein the method further comprises:

while displaying the first visual indication of the check in interaction on the lock screen user interface, receiving, via the one or more input devices, a second input corresponding to selection of the first visual indication; and in response to receiving the second input, displaying, via the display generation component, a check in settings user interface, wherein the check in settings user interface includes a plurality of selectable options for changing one or more settings of the check in interaction.

22. The method of claim 1, further comprising:

while the check in interaction is active, in accordance with a determination that satisfaction of the one or more criteria is delayed, displaying, via the display generation component, a selectable option to extend the check in interaction, wherein extending the check in interaction comprises transmitting a third indication of extension of the check in interaction to the second user account.

23. The method of claim 1, further comprising:

while the check in interaction is active, receiving, via the one or more input devices, a second input corresponding to a request to cancel the check in interaction; and in response to receiving the second input, displaying, via the display generation component:

a first selectable option that is selectable to cancel the check in interaction and initiate transmission of a third indication of a cancellation of the check in interaction to the second user account; and a second selectable option that is selectable to cancel the check in interaction without initiating the transmission of the third indication of the cancellation of the check in interaction to the second user account.

24. The method of claim 1, further comprising:

while the check in interaction is active, detecting that the one or more criteria are satisfied; and in response to detecting that the one or more criteria are satisfied, terminating the check in interaction and initiating a process to transmit, to the second user account, the first indication of the termination of the check in interaction.

25. The method of claim 1, further comprising:

while the check in interaction is active, in accordance with a determination that satisfaction of the one or more criteria will not be determinable, displaying, via the display generation component:

a first selectable option that is selectable to cancel the check in interaction; and a second selectable option that is selectable to transmit a message to the second user account.

26. The method of claim 1, further comprising:

while the check in interaction is active, in accordance with a determination that an emergency is detected, updating the check in interaction to indicate that the emergency has been detected.

27. The method of claim 1, further comprising:

while the check in interaction is active, in response to detecting that a status of the check in interaction has changed and in accordance with a determination that the first electronic device is in communication with one or more output devices, displaying, via the one or more output devices, a third user interface with a visual indication of the changed status of the check in interaction;

wherein the one or more output devices are configured to present content, different from content presented on the first electronic device.

28. The method of claim 27, further comprising:

while the check in interaction is active, in accordance with a determination that satisfaction of the one or more criteria will be delayed and in accordance with a determination that the first electronic device is in communication with one or more output devices, displaying, via the one or more output devices, a selectable option that is selectable to extend the check in interaction.

29. A first electronic device that is in communication with a display generation component and one or more input devices, the first electronic device comprising:

one or more processors;

memory; and one or more programs, wherein the one or more programs are stored in the memory and configured to be executed by the one or more processors, the one or more programs including instructions for:

displaying, via the display generation component, a first user interface for initiating a check in interaction with a second user account, different from a first user account, wherein the first user interface is displayed within a messaging user interface of a messaging application;

while displaying the first user interface, receiving, via the one or more input devices, an input corresponding to a request to initiate the check in interaction with the second user account, including initiating the check in interaction with a first termination condition for the check in interaction, wherein the first termination condition defines one or more criteria that, when satisfied, causes a first indication of a termination of the check in interaction to be transmitted to the second user account; and in response to receiving the input and before the one or more criteria are satisfied, initiating a process to transmit, to the second user account, a second indication of initiation of the check in interaction.

30. The first electronic device of claim 29, wherein displaying the first user interface includes:

in accordance with a determination that-the messaging user interface corresponds to a messaging conversation that includes a first contact, displaying the first user interface within the messaging user interface corresponding to the messaging conversation that includes the first contact; and in accordance with a determination that the messaging user interface corresponds to a messaging conversation that includes a second contact, different from the first contact, forgoing displaying the first user interface within the messaging user interface corresponding to the messaging conversation that includes the second contact.

31. The first electronic device of claim 29, wherein the first user interface is displayed while one or more second criteria are satisfied, including a criterion that is satisfied based on a current time of day at the first electronic device.

32. The first electronic device of claim 29, wherein the first user interface is displayed while one or more second criteria are satisfied, including a criterion that is satisfied before an expected navigation session has been initiated and when a start of the expected navigation session is within a time threshold of a current time at the first electronic device.

33. The first electronic device of claim 29, wherein the one or more programs further including instructions for:

displaying a keyboard user interface;

while displaying the keyboard user interface, receiving, via the one or more input devices, a second input directed to the keyboard user interface; and in response to receiving the second input, displaying, via the display generation component, a keyboard suggestion user interface including:

a first selectable suggestion corresponding to the second input that is selectable to enter content corresponding to the first selectable suggestion in a content entry field; and the first user interface.

34. The first electronic device of claim 29, wherein the first termination condition corresponds to an estimated time of arrival at a destination location;

in accordance with a determination that the check in interaction is associated with a first mode of transportation, the estimated time of arrival at the destination location is a first estimated time of arrival; and in accordance with a determination that the check in interaction is associated with a second mode of transportation, different from the first mode of transportation, the estimated time of arrival at the destination location is a second estimated time of arrival, different from the first estimated time of arrival.

35. The first electronic device of claim 29, wherein the one or more programs further including instructions for:

while displaying the first user interface, receiving, via the one or more input devices, a second input corresponding to a request to customize the check in interaction; and in response to receiving the second input, displaying, via the display generation component, a check in settings user interface, wherein the check in settings user interface includes a plurality of selectable options for changing one or more settings of the check in interaction.

36. The first electronic device of claim 29, wherein the one or more criteria include a criterion that is satisfied when a current location of the first electronic device corresponds to a destination location.

37. The first electronic device of claim 29, wherein the one or more criteria include a criterion that is satisfied based on a time duration that is defined when the check in interaction is initiated.

38. The first electronic device of claim 29, wherein the one or more programs further including instructions for:

in response to receiving the input and before the one or more criteria are satisfied, displaying, in the messaging user interface including messaging activity between the first user account and the second user account, a visual indication of the initiation of the check in interaction.

39. The first electronic device of claim 29, wherein the one or more programs further including instructions for:

in response to receiving the input and before the one or more criteria are satisfied and while the check in interaction remains active, displaying a first visual indication of the check in interaction on a lock screen user interface of the first electronic device, wherein the first visual indication remains displayed on the lock screen user interface for a duration of the check in interaction.

40. The first electronic device of claim 29, wherein the one or more programs further including instructions for:

while the check in interaction is active, in accordance with a determination that satisfaction of the one or more criteria is delayed, displaying, via the display generation component, a selectable option to extend the check in interaction, wherein extending the check in interaction comprises transmitting a third indication of extension of the check in interaction to the second user account.

41. The first electronic device of claim 29, wherein the one or more programs further including instructions for:

while the check in interaction is active, receiving, via the one or more input devices, a second input corresponding to a request to cancel the check in interaction; and in response to receiving the second input, displaying, via the display generation component:

a first selectable option that is selectable to cancel the check in interaction and initiate transmission of a third indication of a cancellation of the check in interaction to the second user account; and a second selectable option that is selectable to cancel the check in interaction without initiating the transmission of the third indication of the cancellation of the check in interaction to the second user account.

42. The first electronic device of claim 29, wherein the one or more programs further including instructions for:

while the check in interaction is active, detecting that the one or more criteria are satisfied; and in response to detecting that the one or more criteria are satisfied, terminating the check in interaction and initiating a process to transmit, to the second user account, the first indication of the termination of the check in interaction.

43. The first electronic device of claim 29, wherein the one or more programs further including instructions for:

while the check in interaction is active, in accordance with a determination that satisfaction of the one or more criteria will not be determinable, displaying, via the display generation component:

a first selectable option that is selectable to cancel the check in interaction; and a second selectable option that is selectable to transmit a message to the second user account.

44. The first electronic device of claim 29, wherein the one or more programs further including instructions for:

while the check in interaction is active, in accordance with a determination that an emergency is detected, updating the check in interaction to indicate that the emergency has been detected.

45. The first electronic device of claim 29, wherein the one or more programs further including instructions for:

while the check in interaction is active, in response to detecting that a status of the check in interaction has changed and in accordance with a determination that the first electronic device is in communication with one or more output devices, displaying, via the one or more output devices, a third user interface with a visual indication of the changed status of the check in interaction;

wherein the one or more output devices are configured to present content, different from content presented on the first electronic device.

46. A non-transitory computer readable storage medium storing one or more programs, the one or more programs comprising instructions, which when executed by one or more processors of a first electronic device, cause the first electronic device to perform a method comprising:

displaying, via a display generation component, a first user interface for initiating a check in interaction with a second user account, different from a first user account, wherein the first user interface is displayed within a messaging user interface of a messaging application;

while displaying the first user interface, receiving, via one or more input devices, an input corresponding to a request to initiate the check in interaction with the second user account, including initiating the check in interaction with a first termination condition for the check in interaction, wherein the first termination condition defines one or more criteria that, when satisfied, causes a first indication of a termination of the check in interaction to be transmitted to the second user account; and in response to receiving the input and before the one or more criteria are satisfied, initiating a process to transmit, to the second user account, a second indication of initiation of the check in interaction.

47. The non-transitory computer readable storage medium of claim 46, wherein displaying the first user interface includes:

in accordance with a determination that-the messaging user interface corresponds to a messaging conversation that includes a first contact, displaying the first user interface within the messaging user interface corresponding to the messaging conversation that includes the first contact; and in accordance with a determination that the messaging user interface corresponds to a messaging conversation that includes a second contact, different from the first contact, forgoing displaying the first user interface within the messaging user interface corresponding to the messaging conversation that includes the second contact.

48. The non-transitory computer readable storage medium of claim 46, wherein the first user interface is displayed while one or more second criteria are satisfied, including a criterion that is satisfied based on a current time of day at the first electronic device.

49. The non-transitory computer readable storage medium of claim 46, wherein the first user interface is displayed while one or more second criteria are satisfied, including a criterion that is satisfied before an expected navigation session has been initiated and when a start of the expected navigation session is within a time threshold of a current time at the first electronic device.

50. The non-transitory computer readable storage medium of claim 46, the method further comprising:

displaying a keyboard user interface;

while displaying the keyboard user interface, receiving, via the one or more input devices, a second input directed to the keyboard user interface; and in response to receiving the second input, displaying, via the display generation component, a keyboard suggestion user interface including:

a first selectable suggestion corresponding to the second input that is selectable to enter content corresponding to the first selectable suggestion in a content entry field; and the first user interface.

51. The non-transitory computer readable storage medium of claim 46, wherein the first termination condition corresponds to an estimated time of arrival at a destination location;

in accordance with a determination that the check in interaction is associated with a first mode of transportation, the estimated time of arrival at the destination location is a first estimated time of arrival; and in accordance with a determination that the check in interaction is associated with a second mode of transportation, different from the first mode of transportation, the estimated time of arrival at the destination location is a second estimated time of arrival, different from the first estimated time of arrival.

52. The non-transitory computer readable storage medium of claim 46, the method further comprising:

while displaying the first user interface, receiving, via the one or more input devices, a second input corresponding to a request to customize the check in interaction; and in response to receiving the second input, displaying, via the display generation component, a check in settings user interface, wherein the check in settings user interface includes a plurality of selectable options for changing one or more settings of the check in interaction.

53. The non-transitory computer readable storage medium of claim 46, wherein the one or more criteria include a criterion that is satisfied when a current location of the first electronic device corresponds to a destination location.

54. The non-transitory computer readable storage medium of claim 46, wherein the one or more criteria include a criterion that is satisfied based on a time duration that is defined when the check in interaction is initiated.

55. The non-transitory computer readable storage medium of claim 46, the method further comprising:

in response to receiving the input and before the one or more criteria are satisfied, displaying, in the messaging user interface including messaging activity between the first user account and the second user account, a visual indication of the initiation of the check in interaction.

56. The non-transitory computer readable storage medium of claim 46, the method further comprising:

in response to receiving the input and before the one or more criteria are satisfied and while the check in interaction remains active, displaying a first visual indication of the check in interaction on a lock screen user interface of the first electronic device, wherein the first visual indication remains displayed on the lock screen user interface for a duration of the check in interaction.

57. The non-transitory computer readable storage medium of claim 46, wherein the method further comprising:

while the check in interaction is active, in accordance with a determination that satisfaction of the one or more criteria is delayed, displaying, via the display generation component, a selectable option to extend the check in interaction, wherein extending the check in interaction comprises transmitting a third indication of extension of the check in interaction to the second user account.

58. The non-transitory computer readable storage medium of claim 46, wherein the method further comprising:

while the check in interaction is active, receiving, via the one or more input devices, a second input corresponding to a request to cancel the check in interaction; and in response to receiving the second input, displaying, via the display generation component:

a first selectable option that is selectable to cancel the check in interaction and initiate transmission of a third indication of a cancellation of the check in interaction to the second user account; and a second selectable option that is selectable to cancel the check in interaction without initiating the transmission of the third indication of the cancellation of the check in interaction to the second user account.

59. The non-transitory computer readable storage medium of claim 46, wherein the method further comprising:

while the check in interaction is active, detecting that the one or more criteria are satisfied; and in response to detecting that the one or more criteria are satisfied, terminating the check in interaction and initiating a process to transmit, to the second user account, the first indication of the termination of the check in interaction.

60. The non-transitory computer readable storage medium of claim 46, wherein the method further comprising:

while the check in interaction is active, in accordance with a determination that satisfaction of the one or more criteria will not be determinable, displaying, via the display generation component:

a first selectable option that is selectable to cancel the check in interaction; and a second selectable option that is selectable to transmit a message to the second user account.

61. The non-transitory computer readable storage medium of claim 46, wherein the method further comprising:

while the check in interaction is active, in accordance with a determination that an emergency is detected, updating the check in interaction to indicate that the emergency has been detected.

62. The non-transitory computer readable storage medium of claim 46, wherein the method further comprising:

while the check in interaction is active, in response to detecting that a status of the check in interaction has changed and in accordance with a determination that the first electronic device is in communication with one or more output devices, displaying, via the one or more output devices, a third user interface with a visual indication of the changed status of the check in interaction;

wherein the one or more output devices are configured to present content, different from content presented on the first electronic device.

* * * * *